US012061040B2

(12) United States Patent
Zhu et al.

(10) Patent No.: US 12,061,040 B2
(45) **Date of Patent: *Aug. 13, 2024**

(54) EMBEDDED REFRIGERATOR

(71) Applicants: QINGDAO HAIER REFRIGERATOR CO., LTD., Qingdao (CN); HAIER SMART HOME CO., LTD., Qingdao (CN)

(72) Inventors: Xiaobing Zhu, Qingdao (CN); Enpin Xia, Qingdao (CN); Kang Li, Qingdao (CN)

(73) Assignees: QINGDAO HAIER REFRIGERATOR CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 137 days.

This patent is subject to a terminal disclaimer.

(21) Appl. No.: 17/638,805

(22) PCT Filed: Aug. 27, 2020

(86) PCT No.: PCT/CN2020/111633

§ 371 (c)(1),
(2) Date: Feb. 25, 2022

(87) PCT Pub. No.: WO2021/037117

PCT Pub. Date: Mar. 4, 2021

(65) Prior Publication Data

US 2022/0325940 A1 Oct. 13, 2022

(30) Foreign Application Priority Data

Aug. 28, 2019 (CN) ......................... 201910803425.9
Aug. 28, 2019 (CN) ......................... 201910803434.8

(Continued)

(51) Int. Cl.
*F25D 23/02* (2006.01)
*E05D 3/18* (2006.01)

(52) U.S. Cl.
CPC ............. *F25D 23/028* (2013.01); *E05D 3/18* (2013.01); *E05Y 2900/31* (2013.01); *F25D 2323/021* (2013.01); *F25D 2323/024* (2013.01)

(58) Field of Classification Search
CPC ............. F25D 23/028; F25D 2323/024; F25D 2323/021; F25D 23/10; E05D 3/18;

(Continued)

(56) References Cited

U.S. PATENT DOCUMENTS 1,075,130 A * 10/1913 Streberger ................ E05D 3/18 5/47
1,832,174 A * 11/1931 Zahner ...................... E05D 3/18 49/401

(Continued)

FOREIGN PATENT DOCUMENTS

AU 431315 B 12/1972
CN 201155900 Y 11/2008

(Continued)

*Primary Examiner* — Hiwot E Tefera
(74) *Attorney, Agent, or Firm* — Cheng-Ju Chiang

(57) ABSTRACT

An embedded refrigerator which includes a cabinet, a door, and a hinge assembly, the hinge assembly includes a first hinge part, a second hinge part and a switching assembly; when the door is in an opening process, the first hinge part moves relative to the switching assembly, and then, the second hinge part moves relative to the switching assembly; the hinge assembly drives the door to rotate in situ relative to the cabinet, and then drives the door to continuously rotate in situ relative to the cabinet. The refrigerator can increase an opening-closing freedom degree of the door, and various motion tracks may be generated to adapt to various application scenarios.

17 Claims, 54 Drawing Sheets

(30) Foreign Application Priority Data

| | | |
|---|---|---|
| Aug. 28, 2019 | (CN) | 201910803437.1 |
| Aug. 28, 2019 | (CN) | 201910804444.3 |
| Mar. 16, 2020 | (CN) | 202010179561.8 |
| Jul. 3, 2020 | (CN) | 202010637425.9 |

(58) Field of Classification Search

CPC ......... E05D 7/0407; E05D 5/14; E05D 7/081; E05D 5/046; E05D 5/10; E05D 5/12; E05D 11/06; E05D 7/085; E05D 7/084; E05D 3/14; E05Y 2900/31; E05F 5/06

See application file for complete search history.

(56) References Cited

U.S. PATENT DOCUMENTS

| | | | | | |
|---|---|---|---|---|---|
| 2,793,387 | A * | 5/1957 | Odell | E05D 3/18 16/358 |
| 2,867,839 | A | 1/1959 | Squire | |
| 3,001,225 | A * | 9/1961 | Squire | E05F 1/1276 16/358 |
| 3,065,498 | A | 11/1962 | Johnson | |
| 3,083,403 | A | 4/1963 | Van Noord | |
| 3,201,821 | A | 8/1965 | Ruckstuhl | |
| 4,151,681 | A | 5/1979 | Roberts | |
| 4,609,234 | A | 9/1986 | Naniwa et al. | |
| 5,158,503 | A * | 10/1992 | Mitchell | E05D 3/12 16/302 |
| 5,265,954 | A | 11/1993 | Keil | |
| 9,380,863 | B2 * | 7/2016 | Sakanoue | B60N 3/004 |
| 9,863,691 | B2 * | 1/2018 | Kikuchi | E05D 3/022 |
| 9,995,528 | B1 * | 6/2018 | Ebrom | H04N 23/64 |
| 10,876,333 | B2 * | 12/2020 | Zhang | F25D 23/028 |
| 2003/0132689 | A1 * | 7/2003 | Shin | E05D 3/18 312/405 |
| 2010/0043472 | A1 * | 2/2010 | Iguchi | A47F 3/0426 62/255 |
| 2012/0025686 | A1 * | 2/2012 | Darney | E05D 3/18 312/405 |
| 2015/0135761 | A1 * | 5/2015 | Jang | F25D 21/04 62/441 |
| 2016/0252291 | A1 * | 9/2016 | Kikuchi | F25D 23/028 312/405 |
| 2019/0186183 | A1 * | 6/2019 | He | E05D 5/04 |

FOREIGN PATENT DOCUMENTS

| | | | | |
|---|---|---|---|---|
| CN | 101501288 | A | 8/2009 | |
| CN | 102062510 | A | 5/2011 | |
| CN | 201954901 | U | 8/2011 | |
| CN | 104265103 | A | 1/2015 | |
| CN | 105546911 | A | 5/2016 | |
| CN | 105588398 | A | 5/2016 | |
| CN | 107288463 | A * | 10/2017 | E05D 11/06 |
| CN | 206600959 | U | 10/2017 | |
| CN | 107630610 | A | 1/2018 | |
| CN | 107883661 | A | 4/2018 | |
| CN | 107883662 | A | 4/2018 | |
| CN | 108106312 | A | 6/2018 | |
| CN | 108253711 | A | 7/2018 | |
| CN | 108286860 | A | 7/2018 | |
| CN | 108302856 | A | 7/2018 | |
| CN | 108468488 | A | 8/2018 | |
| CN | 108661470 | A | 10/2018 | |
| CN | 108868422 | A | 11/2018 | |
| CN | 109470000 | A | 3/2019 | |
| CN | 109470019 | A | 3/2019 | |
| CN | 208605065 | U | 3/2019 | |
| CN | 110068185 | A | 7/2019 | |
| CN | 110068186 | A | 7/2019 | |
| DE | 102011116573 | A1 | 4/2012 | |
| DE | 102006025815 | B4 | 9/2013 | |
| EP | 3026375 | A1 | 6/2016 | |
| EP | 2960411 | B1 | 8/2019 | |
| GB | 2128244 | B | 11/1985 | |
| JP | 2000-18812 | A | 1/2000 | |
| JP | 2005146625 | A * | 6/2005 | |
| JP | 2005-299314 | A | 10/2005 | |
| JP | 2009-114710 | A | 5/2009 | |
| JP | 2013-7193 | A | 1/2013 | |
| JP | 2013-91900 | A | 5/2013 | |
| JP | 2013-256829 | A | 12/2013 | |
| JP | 6062164 | B2 | 1/2017 | |
| KR | 10-2010-0054353 | A | 5/2010 | |
| KR | 10-2010-0107161 | A | 10/2010 | |
| WO | 2006/098591 | A1 | 9/2006 | |

* cited by examiner

EMBEDDED REFRIGERATOR

The present application is a 35 U.S.C. § 371 National Phase conversion of International (PCT) Patent Application No. PCT/CN2020/111633, filed on Aug. 27, 2020, which claims priority to Chinese Patent Application No. 201910803434.8, entitled "Embedded Refrigerator", filed on Aug. 28, 2019, Chinese Patent Application No. 201910803425.9, entitled "Embedded Side-By-Side Refrigerator", filed on Aug. 28, 2019, Chinese Patent Application No. 201910803437.1, entitled "Embedded Multi-door Refrigerator", filed on Aug. 28, 2019, Chinese Patent Application No. 201910804444.3, entitled "Embedded Refrigerator", filed on Aug. 28, 2019, Chinese Patent Application No. 202010179561.8, entitled "Embedded Refrigerator", filed on Mar. 16, 2020, Chinese Patent Application No. 202010637425.9, entitled "Embedded Refrigerator With Variable Rotation Axis", filed on Jul. 3, 2020, the disclosures of which are incorporated herein by reference in their entirety. The PCT International Patent Application was filed and published in Chinese.

TECHNICAL FIELD

The present invention relates to the field of household appliance technologies, and in particular, to an embedded refrigerator.

BACKGROUND

Usually, a refrigerator and a door move relatively by means of a fixed hinge part, thus greatly limiting an opening-closing freedom degree of the door; that is, a motion track of the door is unable to be freely controlled to adapt to different application scenarios.

For example, in recent years, with progress of society and an improvement of people's living standard, placement positions and modes of the refrigerators in homes are more and more emphasized by common users, and for current home decoration styles, part of the homes pursue style integration, the refrigerator is required to be placed in a cupboard to form a so-called embedded refrigerator device, which may adapt to home integration, smart home, or the like; the refrigerator is called an embedded refrigerator, and the current refrigerator is difficult to adapt to the embedded application scenario.

In view of this, the existing refrigerator is necessary to be improved to solve the above-mentioned problem.

SUMMARY

An object of the present invention is to provide an embedded refrigerator, which may effectively increase an opening-closing freedom degree of a door.

To implement one of the above inventive objectives, an embodiment of the present invention provides an embedded refrigerator, including: a cabinet, a door for opening and closing the cabinet, and a hinge assembly for connecting the cabinet and the door, the cabinet includes an accommodating chamber and a pivoting side connected with the hinge assembly, the hinge assembly includes a first hinge part, a second hinge part and a switching assembly connected with the first hinge part and the second hinge part; when the door is in an opening process, the first hinge part moves relative to the switching assembly, and then, the second hinge part moves relative to the switching assembly; the hinge assembly drives the door to rotate in situ relative to the cabinet, then drives the door to move from the pivoting side towards the accommodating chamber, and then drives the door to continuously rotate in situ relative to the cabinet.

As a further improvement of an embodiment of the present invention, the door is provided with a first fitting portion, the cabinet is provided with a second fitting portion, the first fitting portion and the second fitting portion are engaged with each other when the door is in a closed state, and when the door is opened from the closed state to a first opening angle, the door rotates in situ relative to the cabinet, so as to drive the first fitting portion to be disengaged from the second fitting portion.

As a further improvement of an embodiment of the present invention, the door includes a first door and a second door, the first door and the second door are pivotally connected with the cabinet and arranged side by side in a horizontal direction, the refrigerator further includes a vertical beam movably connected to a side of the first door close to the second door, the first fitting portion is provided at the vertical beam, and when the door is in the closed state, the vertical beam extends to the second door; when the door is opened from the closed state to the first opening angle, the door rotates in situ relative to the cabinet, such that the vertical beam rotates towards a side close to the accommodating chamber, a first folding angle is formed between the first door and the vertical beam, and then, the vertical beam and the first door are kept relatively static.

As a further improvement of an embodiment of the present invention, the first fitting portion is configured as a bump protruding upwards from the vertical beam, the second fitting portion is configured as a groove with a notch, and the bump enters or leaves the groove through the notch.

As a further improvement of an embodiment of the present invention, the first hinge part is fixed to the cabinet, the second hinge part is fixed to the door, and the switching assembly includes a first fitting part and a second fitting part; when the door is opened from the closed state to the first opening angle, the first hinge part and the first fitting part move relatively to drive the door to rotate in situ relative to the cabinet, the first hinge part and the first fitting part then move relatively to drive the door to move from the pivoting side towards the accommodating chamber, and the second fitting part limits the second hinge part; when the door is continuously opened from the first opening angle to a second opening angle, the second hinge part is released from the limit of the second fitting part, and the first fitting part limits the first hinge part; when the door is continuously opened from the second opening angle to a maximum opening angle, the second hinge part and the second fitting part move relatively to drive the door to continuously rotate in situ.

As a further improvement of an embodiment of the present invention, the first hinge part is fixed to the cabinet, the second hinge part is fixed to the door, and the switching assembly includes a first fitting part and a second fitting part; when the door is opened from the closed state to the first opening angle, the first hinge part and the first fitting part move relatively to drive the door to rotate in situ relative to the cabinet, and the second fitting part limits the second hinge part; when the door is continuously opened from the first opening angle to a second opening angle, the second hinge part is released from the limit of the second fitting part, and the first fitting part limits the first hinge part; when the door is continuously opened from the second opening angle to a maximum opening angle, the second hinge part and the second fitting part move relatively to drive the door to move from the pivoting side towards the accommodating chamber, and then, the second hinge part and the second fitting part move relatively to drive the door to continuously rotate in situ.

As a further improvement of an embodiment of the present invention, the switching assembly includes a first switching part and a second switching part which are fitted with each other; when the door is opened from the closed state to the first opening angle or continuously opened from the second opening angle to the maximum opening angle, the first switching part and the second switching part are relatively stationary, and when the door is continuously opened from the first opening angle to the second opening angle, the first switching part moves relative to the second switching part, such that the second hinge part is released from the limit of the second fitting part, and the first fitting part limits the first hinge part.

As a further improvement of an embodiment of the present invention, the first hinge part and the first fitting part move relatively by a first shaft set and a first groove set which are fitted with each other, and the second hinge part and the second fitting part move relatively by a second shaft set and a second groove set which are fitted with each other; the first shaft set includes a first shaft and a second shaft, the first groove set includes a first groove fitted with the first shaft and a second groove fitted with the second shaft, the second shaft set includes a third shaft and a fourth shaft, and the second groove set includes a third groove fitted with the third shaft and a fourth groove fitted with the fourth shaft.

As a further improvement of an embodiment of the present invention, the first hinge part includes the first shaft and the second shaft, the first fitting part includes the first groove and the second groove, the second fitting part includes the third shaft and the fourth shaft, and the second hinge part includes the third groove and the fourth groove.

As a further improvement of an embodiment of the present invention, the first groove includes a first upper groove located at the first switching part and a first lower groove located at the second switching part, the first upper groove includes a first upper free section, and the first lower groove includes a first lower free section; the second groove includes a second upper groove located at the first switching part and a second lower groove located at the second switching part, the second upper groove includes a second upper free section, the second lower groove includes a second lower free section, the third groove includes a third free section, the fourth groove includes a fourth free section, the first groove set includes a locking section, and the second groove set includes a limiting section; when the door is opened from the closed state to the first opening angle, the first switching part and the second switching part are relatively stationary, the first upper free section and the first lower free section are overlapped to form a first free section, the second upper free section and the second lower free section are overlapped to form a second free section, the first shaft moves at the first free section, the second shaft moves at the second free section, and the third shaft and/or the fourth shaft are/is limited at the limiting section, such that the switching assembly limits the second hinge part; when the door is continuously opened from the first opening angle to the second opening angle, the first switching part and the second switching part move relatively, such that the fourth shaft is separated from the limiting section, and the first shaft and/or the second shaft are/is limited at the locking section, such that the switching assembly limits the first hinge part; when the door is continuously opened from the second opening angle to the maximum opening angle, the third shaft moves in the third free section, and the fourth shaft moves at the fourth free section.

As a further improvement of an embodiment of the present invention, the locking sections include a first upper locking section located at the first upper groove, a first lower locking section located at the first lower groove, a second upper locking section located at the second upper groove, and a second lower locking section located at the second lower groove, and the limiting section includes a fourth limiting section located at the fourth groove; when the door is opened from the closed state to the first opening angle, the fourth shaft is limited at the fourth limiting section; when the door is continuously opened from the first opening angle to the second opening angle, the first shaft is limited at the first upper locking section and the first lower locking section at the same time, the second shaft is limited at the second upper locking section and the second lower locking section at the same time, and the fourth shaft is separated from the fourth limiting section.

As a further improvement of an embodiment of the present invention, the first upper locking section and the first lower locking section are always staggered, and the second upper locking section and the second lower locking section are always staggered.

As a further improvement of an embodiment of the present invention, the first free section includes an initial position and a stop position which are arranged oppositely, and the second free section includes a first section and a second section which are connected; when the door is in the closed state, the first shaft is located at the initial position, and the second shaft is located at an end of the first section apart from the second section; when the door is opened from the closed state to the first opening angle, the first shaft rotates in situ at the initial position, the second shaft moves in the first section around the first shaft, the second shaft then moves in the second section to drive the first shaft to move from the initial position to the stop position, the door moves from the pivoting side towards the accommodating chamber; when the door is continuously opened from the second opening angle to the maximum opening angle, the third shaft rotates in situ in the third free section, and the fourth shaft moves in the fourth free section around the third shaft.

As a further improvement of an embodiment of the present invention, the cabinet includes an outer side surface adjacent to the hinge assembly and on an extension section of a rotation path of the door, the door includes a front wall apart from the accommodating chamber and a side wall always clamped between the front wall and the accommodating chamber, and a side edge is provided between the front wall and the side wall, a first pitch exists between a center of the first shaft and the side edge, a second pitch exists between the center of the first shaft and the front wall, a third pitch exists between the center of the first shaft and the side wall, a fourth pitch exists between a center of the third shaft and the side edge, a fifth pitch exists between the center of the third shaft and the front wall, and a sixth pitch exists between the center of the third shaft and the side wall; when the door is opened from the closed state to the first opening angle, the first pitch, the second pitch and the third pitch are all kept unchanged first, then decreased, and when the door is continuously opened from the second opening angle to the maximum opening angle, the fourth pitch, the fifth pitch and the sixth pitch are all kept unchanged.

As a further improvement of an embodiment of the present invention, the third free section includes a start position and a pivoting position which are arranged oppositely, and the fourth free section includes a moving section and a rotating section which are connected; when the door is in the closed state, the second shaft is located at an end of the second section, and the third shaft is located at the start position; when the door is opened from the closed state to the first opening angle, the first shaft rotates in situ in the first free section, the second shaft moves in the second free section around the first shaft; when the door is continuously opened from the second opening angle to the maximum opening angle, the fourth shaft moves in the moving section to drive the third shaft to move from the start position to the pivoting position, the door moves from the pivoting side towards the accommodating chamber, the third shaft then rotates in situ at the pivoting position, and the fourth shaft moves in the rotating section around the third shaft.

As a further improvement of an embodiment of the present invention, the cabinet includes an outer side surface adjacent to the hinge assembly and on an extension section of a rotation path of the door, the door includes a front wall apart from the accommodating chamber and a side wall always clamped between the front wall and the accommodating chamber, and a side edge is provided between the front wall and the side wall, a first pitch exists between a center of the first shaft and the side edge, a second pitch exists between the center of the first shaft and the front wall, a third pitch exists between the center of the first shaft and the side wall, a fourth pitch exists between a center of the third shaft and the side edge, a fifth pitch exists between the center of the third shaft and the front wall, and a sixth pitch exists between the center of the third shaft and the side wall; when the door is opened from the closed state to the first opening angle, the first pitch, the second pitch and the third pitch are all kept unchanged, and when the door is continuously opened from the second opening angle to the maximum opening angle, the fourth pitch, the fifth pitch and the sixth pitch are all decreased first and then kept unchanged.

As a further improvement of an embodiment of the present invention, the first switching part and the second switching part are fitted and connected with each other by a fifth shaft, and when the door is continuously opened from the first opening angle to the second opening angle, the first shaft moves to the locking section around the fifth shaft.

As a further improvement of an embodiment of the present invention, the first switching part is closer to the first hinge part than the second switching part.

As a further improvement of an embodiment of the present invention, the first switching part includes the third shaft, the second switching part has a through hole, the third shaft extends through the through hole to the third groove, the second switching part includes the fourth shaft, and the fourth shaft extends to the fourth groove.

As a further improvement of an embodiment of the present invention, the cabinet includes an opening and a front end surface provided around the opening, a first distance exists between the first shaft and the front end surface, and when the door is continuously opened from the second opening angle to the maximum opening angle, a second distance exists between the third shaft and the front end surface, and the second distance is greater than the first distance.

As a further improvement of an embodiment of the present invention, the refrigerator further includes an outer side surface adjacent to the hinge assembly and on an extension section of a rotation path of the door, a third distance exists between the first shaft and the outer side surface, and when the door is continuously opened from the second opening angle to the maximum opening angle, a fourth distance exists between the third shaft and the outer side surface, and the fourth distance is less than the third distance.

To implement one of the above inventive objectives, an embodiment of the present invention provides an embedded refrigerator, including: a cabinet, a door for opening and closing the cabinet, and a hinge assembly for connecting the cabinet and the door, the cabinet includes a pivoting side connected with the hinge assembly, an accommodating chamber, and a fixed beam dividing the accommodating chamber into a first compartment and a second compartment, the door includes a first door provided corresponding to the first compartment and a second door provided corresponding to the second compartment, and the hinge assembly includes a first hinge part fixed to the cabinet, a second hinge part fixed to the door and a switching assembly connected with the first hinge part and the second hinge part, the first hinge part and the first fitting part move relatively by a first shaft set and a first groove set which are fitted with each other, the first shaft set includes a first shaft and a second shaft, and the first groove set includes a first free section, a second free section and locking sections, the first free section includes an initial position and a stop position which are arranged oppositely, and the second free section includes a first section and a second section which are connected, the second hinge part and the switching assembly move relatively by a second shaft set and a second groove set which are fitted with each other, the second shaft set includes a third shaft and a fourth shaft, and the second groove set includes a third free section, a fourth free section and a limiting section, when the door is in a closed state, the first shaft is located at the initial position, the second shaft is located at an end of the first section apart from the second section, the fourth shaft is located at the limiting section, such that the switching assembly limits the second hinge part, both the first door and the second door contact the fixed beam, when the door is opened from the closed state to a first opening angle, the first shaft rotates in situ at the initial position, the second shaft moves in the first section around the first shaft, the door rotates in situ relative to the cabinet, the second shaft then moves in the second section to drive the first shaft to move from the initial position to the stop position, the door moves from the pivoting side towards the accommodating chamber, when the door is continuously opened from the first opening angle to a second opening angle, the fourth shaft is separated from the limiting section, and the first shaft and/or the second shaft are/is limited at the locking sections, such that the switching assembly limits the first hinge part, when the door is continuously opened from the second opening angle to a maximum opening angle, the third shaft rotates in situ in the third free section, and the fourth shaft moves in the fourth free section around the third shaft, the door rotates in situ relative to the cabinet.

As a further improvement of an embodiment of the present invention, the cabinet includes an outer side surface adjacent to the hinge assembly and on an extension section of a rotation path of the door, the door includes a front wall apart from the accommodating chamber and a side wall always clamped between the front wall and the accommodating chamber, and a side edge is provided between the front wall and the side wall, when the door is opened from the closed state to the first opening angle, the door moves from the pivoting side towards the accommodating chamber, such that the side edge moves to a side of the outer side surface close to the accommodating chamber.

As a further improvement of an embodiment of the present invention, the first hinge part includes the first shaft and the second shaft, the switching assembly includes a first groove with the first free section, a second groove with the second free section, the third shaft and the fourth shaft, and the second hinge part includes a third groove having the third free section and a fourth groove having the fourth free section.

As a further improvement of an embodiment of the present invention, the switching assembly includes a first switching part and a second switching part which are fitted with each other, the first groove includes a first upper groove located at the first switching part and a first lower groove located at the second switching part, and the first free section includes a first upper free section located at the first upper groove and a first lower free section located at the first lower groove, the second groove includes a second upper groove located at the first switching part and a second lower groove located at the second switching part, and the second free section includes a second upper free section located at the second upper groove and a second lower free section located at the second lower groove, when the door is opened from the closed state to the first opening angle, the first switching part and the second switching part are relatively stationary, the first upper free section and the first lower free section are overlapped to form the first free section, the second upper free section and the second lower free section are overlapped to form the second free section, when the door is continuously opened from the first opening angle to the second opening angle, the first switching part and the second switching part move relatively, such that the fourth shaft is separated from the limiting section, and the first shaft and/or the second shaft are/is limited at the locking sections, when the door is continuously opened from the second opening angle to the maximum opening angle, the first switching part and the second switching part are relatively stationary.

As a further improvement of an embodiment of the present invention, the locking sections include a first upper locking section communicated with the first upper free section, a first lower locking section communicated with the first lower free section, a second upper locking section communicated with the second upper free section, and a second lower locking section communicated with the second lower free section, when the door is continuously opened from the first opening angle to the second opening angle, the first shaft is simultaneously limited at the first upper locking section and the first lower locking section, the second shaft is simultaneously limited at the second upper locking section and the second lower locking section.

As a further improvement of an embodiment of the present invention, the first upper locking section and the first lower locking section are always staggered, and the second upper locking section and the second lower locking section are always staggered.

As a further improvement of an embodiment of the present invention, a first pitch exists between a center of the first shaft and the side edge, a second pitch exists between the center of the first shaft and the front wall, a third pitch exists between the center of the first shaft and the side wall, a fourth pitch exists between a center of the third shaft and the side edge, a fifth pitch exists between the center of the third shaft and the front wall, and a sixth pitch exists between the center of the third shaft and the side wall; when the door is opened from the closed state to the first opening angle, the first pitch, the second pitch and the third pitch are all kept unchanged first, then decreased, and when the door is continuously opened from the second opening angle to the maximum opening angle, the fourth pitch, the fifth pitch and the sixth pitch are all kept unchanged.

As a further improvement of an embodiment of the present invention, the first switching part and the second switching part are fitted and connected with each other by a fifth shaft, and when the door is continuously opened from the first opening angle to the second opening angle, the first shaft moves to the locking section around the fifth shaft.

As a further improvement of an embodiment of the present invention, the first switching part is closer to the first hinge part than the second switching part.

As a further improvement of an embodiment of the present invention, the first switching part includes the third shaft, the second switching part has a through hole, the third shaft extends through the through hole to the third groove, the second switching part includes the fourth shaft, and the fourth shaft extends to the fourth groove.

As a further improvement of an embodiment of the present invention, the cabinet includes an opening and a front end surface provided around the opening, a first distance exists between the first shaft and the front end surface, and when the door is continuously opened from the second opening angle to the maximum opening angle, a second distance exists between the third shaft and the front end surface, and the second distance is greater than the first distance.

As a further improvement of an embodiment of the present invention, the refrigerator further includes an outer side surface adjacent to the hinge assembly and on an extension section of a rotation path of the door, a third distance exists between the first shaft and the outer side surface, and when the door is continuously opened from the second opening angle to the maximum opening angle, a fourth distance exists between the third shaft and the outer side surface, and the fourth distance is less than the third distance.

To implement one of the above inventive objectives, an embodiment of the present invention provides an embedded refrigerator, including: a cabinet, a door for opening and closing the cabinet, and a hinge assembly for connecting the cabinet and the door, the cabinet includes an accommodating chamber and a pivoting side connected with the hinge assembly, the door is provided with a first fitting portion, and the cabinet is provided with a second fitting portion, and the hinge assembly includes a first hinge part fixed to the cabinet, a second hinge part fixed to the door and a switching assembly connected with the first hinge part and the second hinge part, the first hinge part and the first fitting part move relatively by a first shaft set and a first groove set which are fitted with each other, the first shaft set includes a first shaft and a second shaft, and the first groove set includes a first free section, a second free section and locking sections, the first free section includes an initial position and a stop position which are arranged oppositely, and the second free section includes a first section and a second section which are connected, the second hinge part and the switching assembly move relatively by a second shaft set and a second groove set which are fitted with each other, the second shaft set includes a third shaft and a fourth shaft, and the second groove set includes a third free section, a fourth free section and a limiting section, when the door is in a closed state, the first shaft is located at the initial position, the second shaft is located at an end of the first section apart from the second section, the fourth shaft is located at the limiting section, such that the switching assembly limits the second hinge part, and the first fitting portion and the second fitting portion are engaged with each other, when the door is opened from the closed state to a first opening angle, the first shaft rotates in situ at the initial position, the second shaft moves in the first section around the first shaft, and the first fitting portion is disengaged from the second fitting portion, the second shaft then moves in the second section to drive the first shaft to move from the initial position to the stop position, and the door moves from the pivoting side to the accommodating chamber, when the door is continuously opened from the first opening angle to a second opening angle, the fourth shaft is separated from the limiting section, and the first shaft and/or the second shaft are/is limited at the locking sections, such that the switching assembly limits the first hinge part, when the door is continuously opened from the second opening angle to a maximum opening angle, the third shaft is rotates in situ in the third free section, and the fourth shaft moves in the fourth free section around the third shaft.

As a further improvement of an embodiment of the present invention, the door includes a first door and a second door, the first door and the second door are pivotally connected with the cabinet and arranged side by side in a horizontal direction, the refrigerator further includes a vertical beam movably connected to a side of the first door close to the second door, the first fitting portion is provided at the vertical beam, and when the door is in the closed state, the vertical beam extends to the second door; when the door is opened from the closed state to the first opening angle, the door rotates in situ relative to the cabinet, such that the vertical beam rotates towards a side close to the accommodating chamber, a first folding angle is formed between the first door and the vertical beam, and then, the vertical beam and the first door are kept relatively static.

As a further improvement of an embodiment of the present invention, the cabinet includes an outer side surface adjacent to the hinge assembly and on an extension section of a rotation path of the door, the door includes a front wall apart from the accommodating chamber and a side wall always clamped between the front wall and the accommodating chamber, and a side edge is provided between the front wall and the side wall, when the door is opened from the closed state to the first opening angle, the side edge moves to a side of the outer side surface close to the accommodating chamber.

As a further improvement of an embodiment of the present invention, the first hinge part includes the first shaft and the second shaft, the switching assembly includes a first groove with the first free section, a second groove with the second free section, the third shaft and the fourth shaft, and the second hinge part includes a third groove having the third free section and a fourth groove having the fourth free section.

As a further improvement of an embodiment of the present invention, the switching assembly includes a first switching part and a second switching part which are fitted with each other, the first groove includes a first upper groove located at the first switching part and a first lower groove located at the second switching part, and the first free section includes a first upper free section located at the first upper groove and a first lower free section located at the first lower groove, the second groove includes a second upper groove located at the first switching part and a second lower groove located at the second switching part, and the second free section includes a second upper free section located at the second upper groove and a second lower free section located at the second lower groove, when the door is opened from the closed state to the first opening angle, the first switching part and the second switching part are relatively stationary, the first upper free section and the first lower free section are overlapped to form the first free section, the second upper free section and the second lower free section are overlapped to form the second free section, when the door is continuously opened from the first opening angle to the second opening angle, the first switching part and the second switching part move relatively, such that the fourth shaft is separated from the limiting section, and the first shaft and/or the second shaft are/is limited at the locking sections, when the door is continuously opened from the second opening angle to the maximum opening angle, the first switching part and the second switching part are relatively stationary.

As a further improvement of an embodiment of the present invention, the locking sections include a first upper locking section communicated with the first upper free section, a first lower locking section communicated with the first lower free section, a second upper locking section communicated with the second upper free section, and a second lower locking section communicated with the second lower free section, when the door is continuously opened from the first opening angle to the second opening angle, the first shaft is simultaneously limited at the first upper locking section and the first lower locking section, the second shaft is simultaneously limited at the second upper locking section and the second lower locking section.

As a further improvement of an embodiment of the present invention, the first upper locking section and the first lower locking section are always staggered, and the second upper locking section and the second lower locking section are always staggered.

As a further improvement of an embodiment of the present invention, a first pitch exists between a center of the first shaft and the side edge, a second pitch exists between the center of the first shaft and the front wall, a third pitch exists between the center of the first shaft and the side wall, a fourth pitch exists between a center of the third shaft and the side edge, a fifth pitch exists between the center of the third shaft and the front wall, and a sixth pitch exists between the center of the third shaft and the side wall; when the door is opened from the closed state to the first opening angle, the first pitch, the second pitch and the third pitch are all kept unchanged first, then decreased, and when the door is continuously opened from the second opening angle to the maximum opening angle, the fourth pitch, the fifth pitch and the sixth pitch are all kept unchanged.

As a further improvement of an embodiment of the present invention, the first switching part and the second switching part are fitted and connected with each other by a fifth shaft, and when the door is continuously opened from the first opening angle to the second opening angle, the first shaft moves to the locking section around the fifth shaft.

As a further improvement of an embodiment of the present invention, the first switching part is closer to the first hinge part than the second switching part.

As a further improvement of an embodiment of the present invention, the first switching part includes the third shaft, the second switching part has a through hole, the third shaft extends through the through hole to the third groove, the second switching part includes the fourth shaft, and the fourth shaft extends to the fourth groove.

As a further improvement of an embodiment of the present invention, the cabinet includes an opening and a front end surface provided around the opening, a first distance exists between the first shaft and the front end surface, and when the door is continuously opened from the second opening angle to the maximum opening angle, a second distance exists between the third shaft and the front end surface, and the second distance is greater than the first distance.

As a further improvement of an embodiment of the present invention, the refrigerator further includes an outer side surface adjacent to the hinge assembly and on an extension section of a rotation path of the door, a third distance exists between the first shaft and the outer side surface, and when the door is continuously opened from the second opening angle to the maximum opening angle, a fourth distance exists between the third shaft and the outer side surface, and the fourth distance is less than the third distance.

To implement one of the above inventive objectives, an embodiment of the present invention provides an embedded refrigerator, including: a cabinet, a door for opening and closing the cabinet, and a hinge assembly for connecting the cabinet and the door, the cabinet includes an accommodating chamber and a pivoting side connected with the hinge assembly, the hinge assembly includes a first hinge part, a second hinge part and a switching assembly connected with the first hinge part and the second hinge part; the first hinge part and the switching assembly move relatively by a first shaft and a first groove which are fitted with each other, and the first groove includes a first free section, the second hinge part and the switching assembly move relatively by a second shaft set and a second groove set which are fitted with each other; the second shaft set includes a third shaft and a fourth shaft, and the second groove set includes a third free section, a fourth free section and a limiting section, the third free section includes a start position and a pivoting position which are arranged oppositely, and the fourth free section includes a moving section and a rotating section which are connected, when the door is in a closed state, the first shaft is located at the first free section, and the fourth shaft is located at the limiting section, such that the switching assembly limits the second hinge part, and the third shaft is located at the start position, when the door is opened to a first opening angle from the closed state, the first shaft rotates in situ in the first free section to drive the door to rotate in situ relative to the cabinet, when the door is continuously opened from the first opening angle to a second opening angle, the fourth shaft is separated from the limiting section, the third shaft is kept at the start position, and the switching assembly limits the first hinge part, when the door is continuously opened from the second opening angle to a maximum opening angle, the fourth shaft moves in the moving section to drive the third shaft to move from the start position to the pivoting position, the door moves from the pivoting side towards the accommodating chamber, the third shaft then rotates in situ at the pivoting position, the fourth shaft moves in the rotating section around the third shaft, and the door continuously rotates in situ relative to the cabinet.

As a further improvement of an embodiment of the present invention, the first hinge part includes the first shaft, the switching assembly includes the first groove, the third shaft and the fourth shaft, the second hinge part includes a third groove having the third free section and a fourth groove having the fourth free section and the limiting section.

As a further improvement of an embodiment of the present invention, the switching assembly includes a first switching part and a second switching part which are fitted with each other, when the door is opened from the closed state to the first opening angle or the door is opened from the second opening angle to the maximum opening angle, the first switching part and the second switching part are relatively stationary, when the door is opened from the first opening angle to the second opening angle, the first switching part moves relative to the second switching part, such that the fourth shaft is separated from the limiting section.

As a further improvement of an embodiment of the present invention, the first hinge part includes a first limiting portion, the first switching part includes a second limiting portion, the first groove includes a first upper groove located at the first switching part and a first lower groove located at the second switching part, when the door is opened from the closed state to the first opening angle, a first free section is formed by overlapped parts of the first upper groove and the first lower groove, the first shaft moves in situ in the first free section, and the second limiting portion abuts against the first limiting portion, such that the switching assembly limits the first hinge part, when the door is continuously opened from the first opening angle to the second opening angle, the first switching part and the second switching part move relatively, such that the fourth shaft is separated from the limiting section.

As a further improvement of an embodiment of the present invention, one of the first limiting portion and the second limiting portion is configured as a bump, the other is configured as a recess, the bump includes a first limiting surface, and the recess includes a second limiting surface, when the door is in the closed state, the first limiting surface is apart from the second limiting surface, when the door is opened from the closed state to the first opening angle, the first limiting surface and the second limiting surface gradually approach until the first limiting surface abuts against the second limiting surface.

As a further improvement of an embodiment of the present invention, the recess is located on the first switching part, and the bump is located on the first hinge part.

As a further improvement of an embodiment of the present invention, an opening size of the first upper groove is matched with a size of the first shaft, and an opening size of the first lower groove is greater than the opening size of the first upper groove.

As a further improvement of an embodiment of the present invention, the first switching part includes a first stopper, the second switching part includes a second stopper fitted with the first stopper, and when the door is closed from the second opening angle to the first opening angle, the second switching part limits movement of the first switching part by fitting the second stopper with the first stopper.

As a further improvement of an embodiment of the present invention, the first switching part and the second switching part are fitted and connected with each other by a fifth shaft.

As a further improvement of an embodiment of the present invention, the first switching part is closer to the first hinge part than the second switching part.

As a further improvement of an embodiment of the present invention, the first switching part includes the third shaft, the second switching part has a through hole, the third shaft extends through the through hole to the third groove, the second switching part includes the fourth shaft, and the fourth shaft extends to the fourth groove.

As a further improvement of an embodiment of the present invention, the cabinet includes an opening and a front end surface provided around the opening, a first distance exists between the first shaft and the front end surface, and when the door is continuously opened from the second opening angle to the maximum opening angle, a second distance exists between the third shaft and the front end surface, and the second distance is greater than the first distance.

As a further improvement of an embodiment of the present invention, the a free embedded refrigerator further includes an outer side surface adjacent to the hinge assembly and on the extension section of the rotation path of the door, a third distance exists between the first shaft and the outer side surface, and when the door is continuously opened from the second opening angle to the maximum opening angle, a fourth distance exists between the third shaft and the outer side surface, and the fourth distance is less than the third distance.

As a further improvement of an embodiment of the present invention, the door includes a front wall apart from the accommodating chamber and a side wall always clamped between the front wall and the accommodating chamber, and a side edge is provided between the front wall and the side wall, a fourth pitch exists between a center of the third shaft and the side edge, a fifth pitch exists between the center of the third shaft and the front wall, and a sixth pitch exists between the center of the third shaft and the side wall; when the door is continuously opened from the second opening angle to the maximum opening angle, the fourth pitch, the fifth pitch and the sixth pitch are all decreased first, then kept unchanged.

As a further improvement of an embodiment of the present invention, the door is provided with a first fitting portion, the cabinet is provided with a second fitting portion, the first fitting portion and the second fitting portion are engaged with each other when the door is in a closed state, and when the door is opened from the closed state to the first opening angle, the hinge assembly drives the door to rotate in situ relative to the cabinet, so as to drive the first fitting portion to be disengaged from the second fitting portion.

As a further improvement of an embodiment of the present invention, the door includes a first door and a second door, the first door and the second door are pivotally connected with the cabinet and arranged side by side in a horizontal direction, the refrigerator further includes a vertical beam movably connected to a side of the first door close to the second door, the first fitting portion is provided at the vertical beam, and when the door is in the closed state, the vertical beam extends to the second door; when the door is opened from the closed state to the first opening angle, the door rotates in situ relative to the cabinet, such that the vertical beam rotates towards a side close to the accommodating chamber, a first folding angle is formed between the first door and the vertical beam, and then, the vertical beam and the first door are kept relatively static.

As a further improvement of an embodiment of the present invention, the first fitting portion is configured as a bump protruding upwards from the vertical beam, the second fitting portion is configured as a groove with a notch, and the bump enters or leaves the groove through the notch.

As a further improvement of an embodiment of the present invention, the cabinet further includes a fixed beam dividing the accommodating chamber into a first compartment and a second compartment, and the door includes a first door provided corresponding to the first compartment and a second door provided corresponding to the second compartment; when the door is in the closed state, both the first door and the second door contact the fixed beam, and when the door is opened from the closed state to the first opening angle, the door rotates in situ relative to the cabinet, so as to separate the door from the fixed beam.

As a further improvement of an embodiment of the present invention, a connection line between the start position and the pivoting position is parallel to the moving section.

As a further improvement of an embodiment of the present invention, the third free section has an oval shape, and the moving section has an arc shape.

To implement one of the above inventive objectives, an embodiment of the present invention provides an embedded refrigerator, including: a cabinet, a door for opening and closing the cabinet, and a hinge assembly for connecting the cabinet and the door, the cabinet includes an accommodating chamber and a pivoting side connected with the hinge assembly, and the hinge assembly includes a first hinge part fixed to the cabinet, a second hinge part fixed to the door and a switching assembly connected with the first hinge part and the second hinge part, and the switching assembly includes a first switching part and a second switching part which are fitted with each other; when the door is opened from a closed state to a first opening angle, the first switching part, the second switching part and the second hinge part are relatively static and move together relative to the first hinge part, and the door rotates in situ relative to the cabinet; when the door is continuously opened from the first opening angle to a second opening angle, the first switching part and the first hinge part are relatively static, the second switching part and the second hinge part are relatively static and move together relative to the first switching part, and the door moves from the pivoting side towards the accommodating chamber; when the door is continuously opened from the second opening angle to a maximum opening angle, the first hinge part, the first switching part and the second switching part are relatively static, the second hinge part moves relative to the second switching part, and the door continuously rotates in situ relative to the cabinet.

As a further improvement of an embodiment of the present invention, the first hinge part includes a first shaft, the first switching part includes a third shaft and a first upper groove, the second switching part includes a fourth shaft and a through hole, the second hinge part includes a third groove and a fourth groove, the through hole includes an initial position and a stop position which are arranged oppositely, the third groove includes a start position and a pivoting position which are arranged oppositely, and the fourth groove includes a rotation start position and a rotation stop position which are arranged oppositely; when the door is in the closed state, the first shaft extends to the first upper groove, the third shaft sequentially passes through the through hole and the third groove, the third shaft is located at the initial position and the start position, and the fourth shaft is located at the rotation start position of the fourth groove; when the door is opened from the closed state to the first opening angle, the first shaft rotates in situ in the first upper groove to drive the door to rotate in situ relative to the cabinet; when the door is continuously opened from the first opening angle to the second opening angle, the fourth shaft is kept at the rotation start position, the third shaft moves from the initial position to the stop position, the third shaft moves from the start position to the pivoting position at the same time, and the door moves from the pivoting side to the accommodating chamber; when the door is continuously opened to the maximum opening angle from the second opening angle, the third shaft is kept at the stop position and the pivoting position, the fourth shaft moves from the rotation start position to the rotation stop position, and the door continuously rotates in situ relative to the cabinet.

As a further improvement of an embodiment of the present invention, the first upper groove is circular, and the through hole and the third groove are both oval shape.

As a further improvement of an embodiment of the present invention, the fourth groove is configured as an arc groove with a circle center serving as the pivoting position of the third groove.

As a further improvement of an embodiment of the present invention, the first hinge part includes a first limiting portion, the first switching part includes a second limiting portion, one of the first limiting portion and the second limiting portion is configured as a bump, the other is configured as a recess, the bump includes a first limiting surface, and the recess includes a second limiting surface; when the door is in the closed state, the first limiting surface is apart from the second limiting surface, and when the door is opened from the closed state to the first opening angle, the first limiting surface and the second limiting surface gradually approach until the first limiting surface abuts against the second limiting surface.

As a further improvement of an embodiment of the present invention, the first hinge part includes a first engaging portion and a second engaging portion, the first switching part includes a third engaging portion, when the door is in the closed state, the third engaging portion is limited at the first engaging portion, when the door is opened from the closed state to the first opening angle, the third engaging portion is separated from the first engaging portion, and the third engaging portion and the second engaging portion gradually approach until the third engaging portion is limited at the second engaging portion.

As a further improvement of an embodiment of the present invention, both the first engaging portion and the second engaging portion are configured as recesses, and the third engaging portion includes a third elastic part and a third boss, when the door is in the closed state, the third elastic part acts on the third boss to limit the third boss at the first engaging portion, when the door is opened from the closed state to the first opening angle, a bottom surface of the first hinge part abuts against the third boss to drive the third elastic part to be compressed, and when the third boss contacts the second engaging portion, the third elastic part resets to drive the third boss to enter the second engaging portion.

As a further improvement of an embodiment of the present invention, the first switching part includes a fourth engaging portion and a fifth engaging portion, the second switching part includes a sixth engaging portion, when the door is opened from the closed state to the first opening angle, the sixth engaging portion is limited at the fourth engaging portion, when the door is continuously opened from the first opening angle to the second opening angle, the sixth engaging portion is separated from the fourth engaging portion, and sixth engaging portion and the fifth engaging portion gradually approach until the sixth engaging portion is limited at the fifth engaging portion.

As a further improvement of an embodiment of the present invention, both the fourth engaging portion and the fifth engaging portion are configured as recesses, and the sixth engaging portion includes a sixth elastic part and a sixth boss, when the door is opened from the closed state to the first opening angle, the sixth elastic part acts on the sixth boss to limit the sixth boss at the fourth engaging portion, when the door is opened from the first opening angle to the second opening angle, the second switching part moves relative to the first switching part to drive the sixth engaging portion to be disengaged from the fourth engaging portion, and a bottom surface of the first switching part close to the second switching part abuts against the sixth boss to drive the sixth elastic part to be compressed, and when the sixth boss contacts the fifth engaging portion, the sixth elastic part resets to drive the sixth boss to enter the fifth engaging portion.

As a further improvement of an embodiment of the present invention, the second switching part includes a first lower groove, the first shaft sequentially passes through the first upper groove and the first lower groove, the first lower groove includes a first end and a second end which are arranged oppositely, when the door is opened from the closed state to the first opening angle, the first shaft is kept at the first end, when the door is continuously opened from the first opening angle to the second opening angle, the first shaft moves from the first end to the second end.

As a further improvement of an embodiment of the present invention, the first lower groove is parallel to the through hole, and the first lower groove and the through hole both have oval shapes.

As a further improvement of an embodiment of the present invention, the first switching part and the second switching part are fitted with each other by a fifth shaft and a fifth groove, the fifth groove includes a third end and a fourth end which are arranged oppositely, when the door is opened from the closed state to the first opening angle, the fifth shaft is kept at the third end, when the door is continuously opened from the first opening angle to the second opening angle, the fifth shaft moves from the third end to the fourth end.

As a further improvement of an embodiment of the present invention, the fifth groove is parallel to the through hole, and the fifth groove and the through hole both have oval shapes.

As a further improvement of an embodiment of the present invention, the first switching part is closer to the first hinge part than the second switching part.

As a further improvement of an embodiment of the present invention, the cabinet includes an opening and a front end surface provided around the opening, a first distance exists between the first shaft and the front end surface, and when the door is continuously opened from the second opening angle to the maximum opening angle, a second distance exists between the third shaft and the front end surface, and the second distance is greater than the first distance.

As a further improvement of an embodiment of the present invention, the refrigerator further includes an outer side surface adjacent to the hinge assembly and on an extension section of a rotation path of the door, a third distance exists between the first shaft and the outer side surface, and when the door is continuously opened from the second opening angle to the maximum opening angle, a fourth distance exists between the third shaft and the outer side surface, and the fourth distance is less than the third distance.

As a further improvement of an embodiment of the present invention, the door includes a front wall apart from the accommodating chamber and a side wall always clamped between the front wall and the accommodating chamber, and a side edge is provided between the front wall and the side wall, a fourth pitch exists between a center of the third shaft and the side edge, a sixth pitch exists between the center of the third shaft and the side wall, when the door is continuously opened from the first opening angle to the second opening angle, the fourth pitch and the sixth pitch are all decreased.

As a further improvement of an embodiment of the present invention, a fifth pitch exists between the center of the third shaft and the front wall, when the door is continuously opened from the first opening angle to the second opening angle, the fifth pitch is increased.

As a further improvement of an embodiment of the present invention, the cabinet includes an outer side surface adjacent to the hinge assembly and on an extension section of a rotation path of the door, when the door is at the first opening angle, the initial position is away from the outer side surface than the stop position.

As a further improvement of an embodiment of the present invention, the cabinet includes an opening and a front end surface provided around the opening, when the door is at the first opening angle, the initial position is away from the front end surface than the stop position.

To implement one of the above inventive objectives, an embodiment of the present invention provides an embedded refrigerator, including: a cabinet, a door for opening and closing the cabinet, and a hinge assembly for connecting the cabinet and the door, the cabinet includes an accommodating chamber and a pivoting side connected with the hinge assembly, the hinge assembly includes a first hinge part fixed to the cabinet, a second hinge part fixed to the door and a switching assembly connected with the first hinge part and the second hinge part, the switching assembly includes a first switching part and a second switching part which are fitted with each other, the first hinge part includes a first shaft, the first switching part includes a third shaft and a first upper groove, the second switching part includes a fourth shaft and a through hole, the second hinge part includes a third groove and a fourth groove, the through hole includes an initial position and a stop position which are arranged oppositely, the third groove includes a start position and a pivoting position which are arranged oppositely, and the fourth groove includes a rotation start position and a rotation stop position which are arranged oppositely; when the door is in the closed state, the first shaft extends to the first upper groove, the third shaft sequentially passes through the through hole and the third groove, the third shaft is located at the initial position and the start position, and the fourth shaft is located at the rotation start position of the fourth groove; when the door is opened from the closed state to the first opening angle, the first shaft rotates in situ in the first upper groove to drive the door to rotate in situ relative to the cabinet; when the door is continuously opened from the first opening angle to the second opening angle, the fourth shaft is kept at the rotation start position, the third shaft moves from the initial position to the stop position, the third shaft moves from the start position to the pivoting position at the same time, and the door moves from the pivoting side to the accommodating chamber; when the door is continuously opened to the maximum opening angle from the second opening angle, the third shaft is kept at the stop position and the pivoting position, the fourth shaft moves from the rotation start position to the rotation stop position, and the door continuously rotates in situ relative to the cabinet.

Compared with a prior art, the present invention has the following beneficial effects: with the refrigerator according to an embodiment of the present invention, the opening-closing freedom degree of the door may be increased, and various motion tracks may be generated to adapt to different application scenarios.

DETAILED DESCRIPTION

Figure 1:
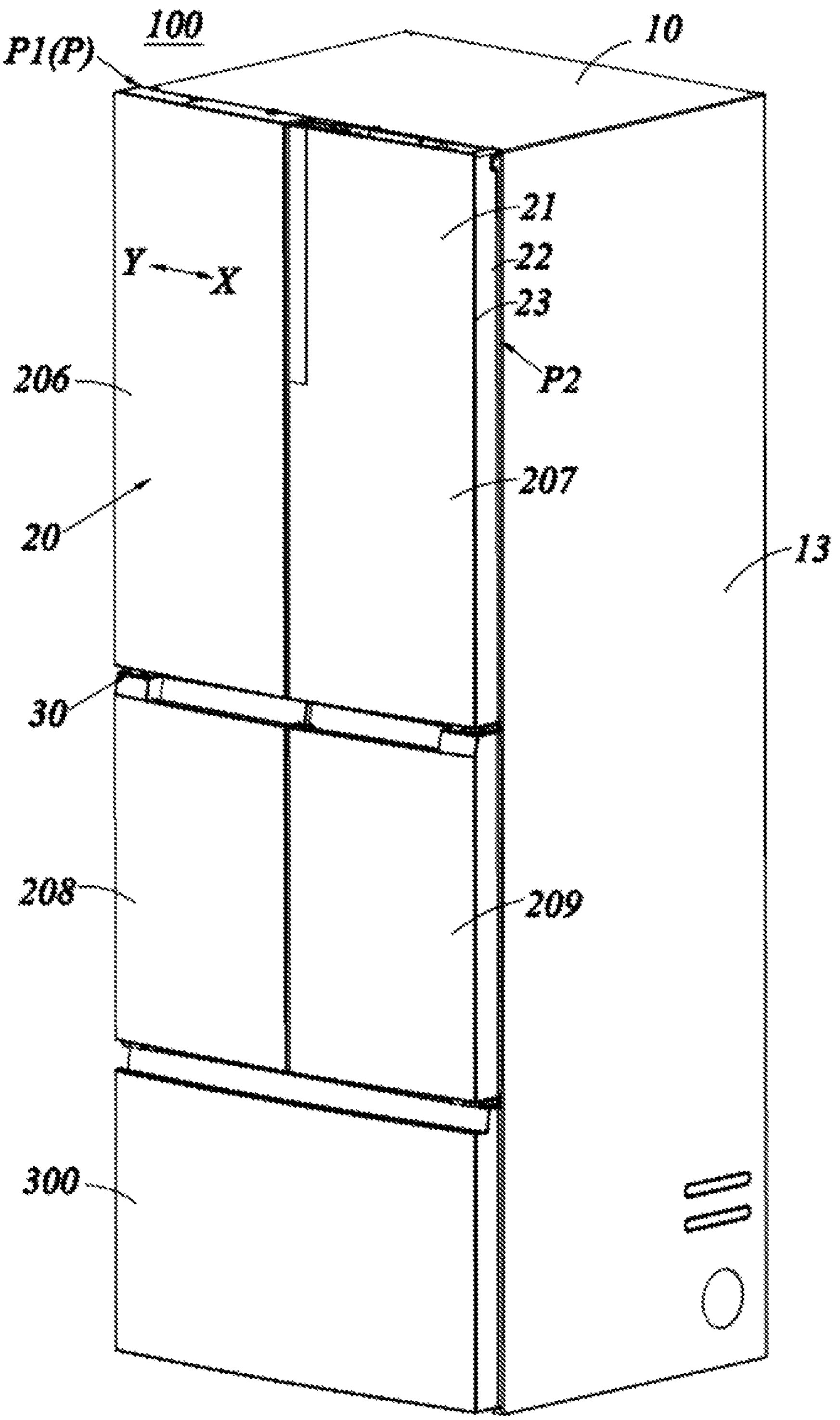
FIG. 1 is a perspective view of a multi-door refrigerator according to a first embodiment of the present invention.
Figure 2:
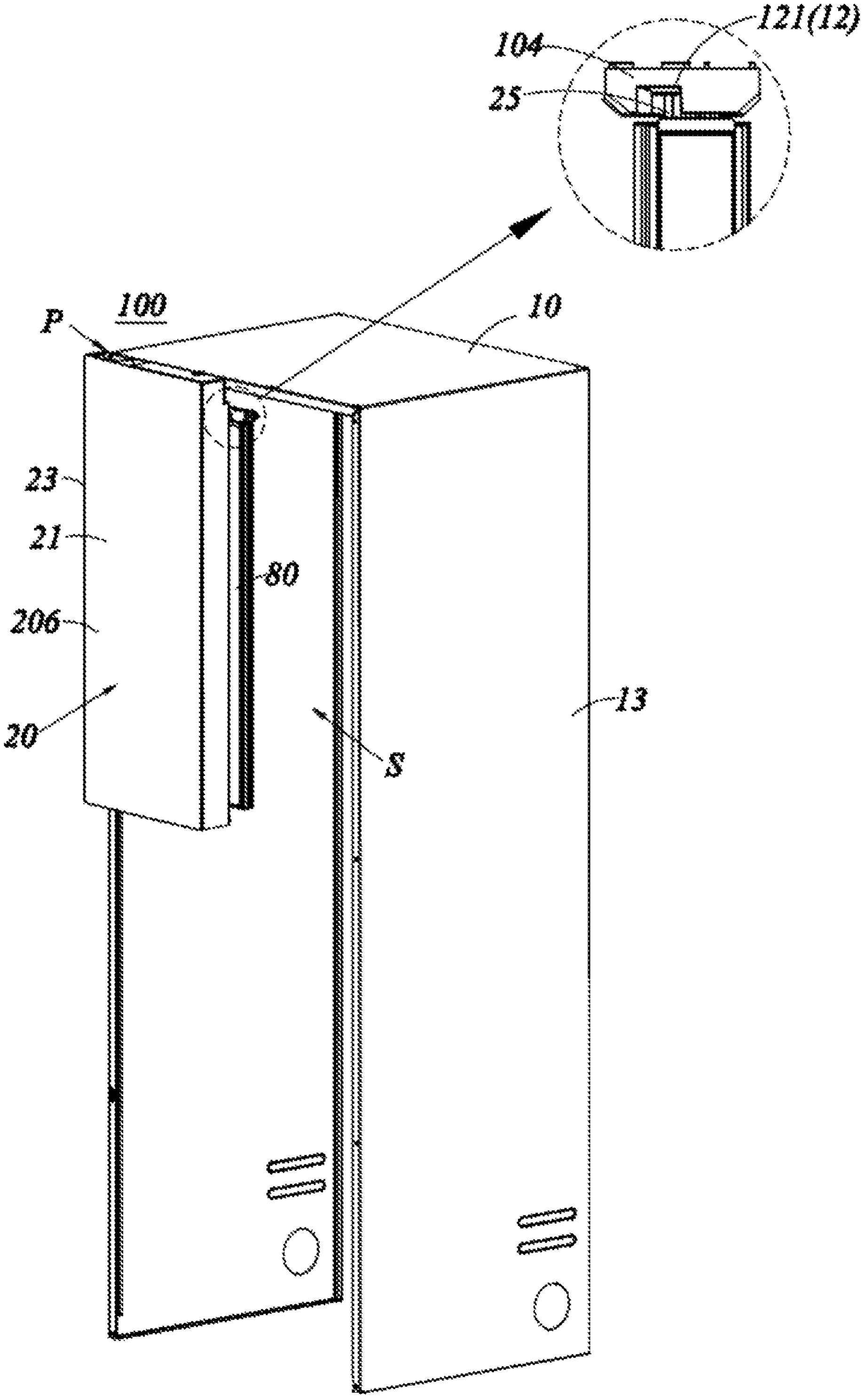
FIG. 2 is a schematic diagram of the multi-door refrigerator according to the first embodiment of the present invention in a closed state.
Figure 3:
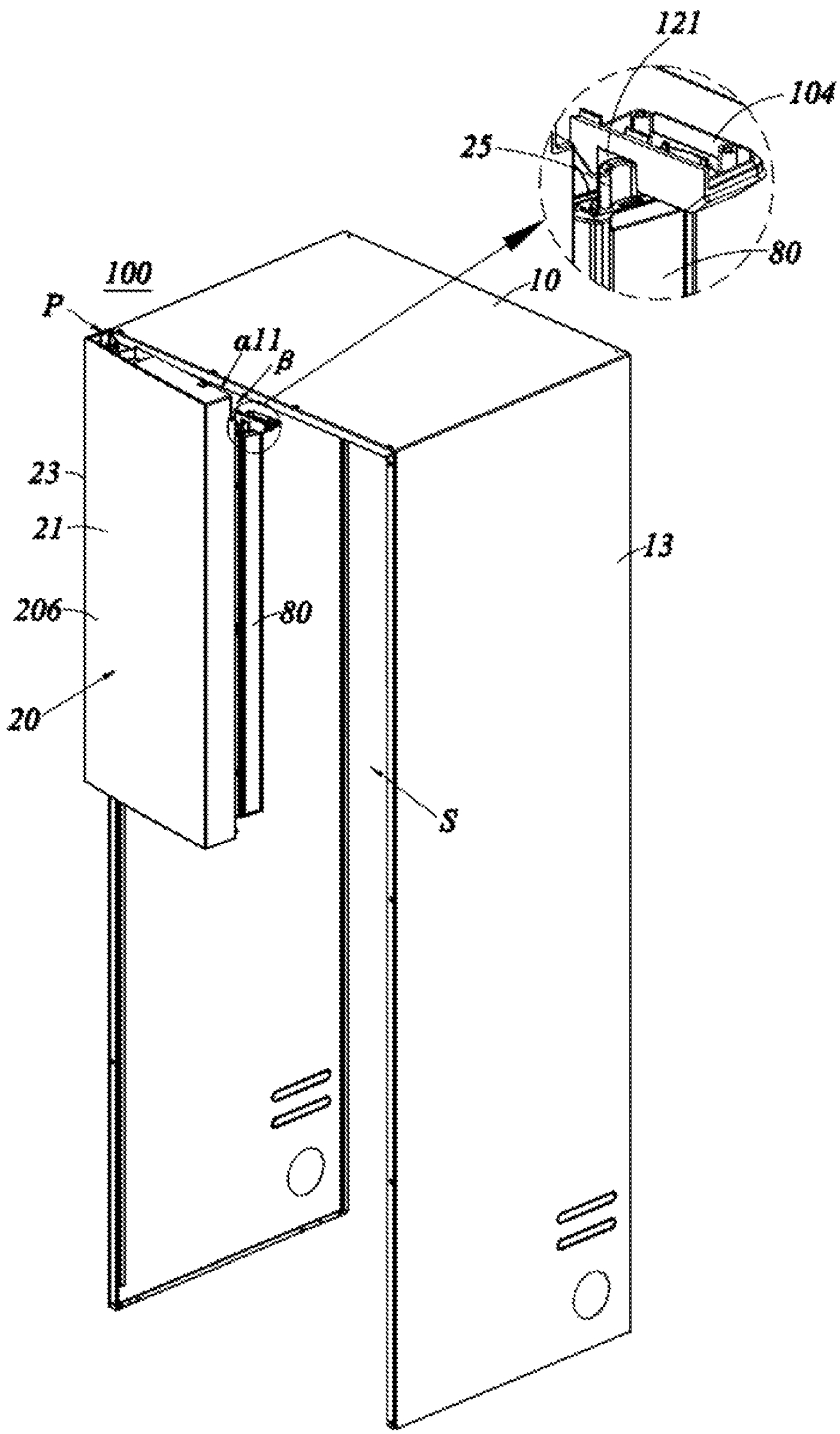
FIG. 3 is a schematic diagram of the multi-door refrigerator according to the first embodiment of the present invention opened to a first intermediate opening angle.
Figure 4:
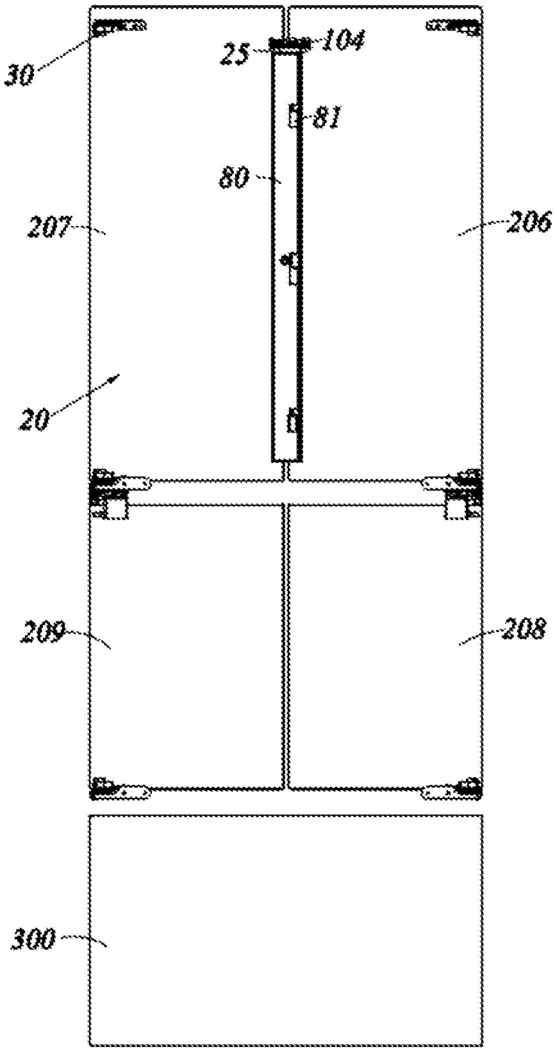
FIG. 4 is a rear view of the multi-door refrigerator according to the first embodiment of the present invention (with some elements omitted)
Figure 5:
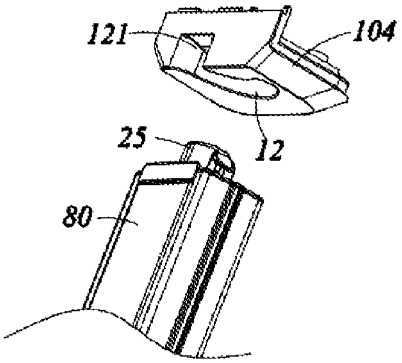
FIG. 5 is an exploded view of a first fitting portion and a second fitting portion according to the first embodiment of the present invention.
Figure 6:
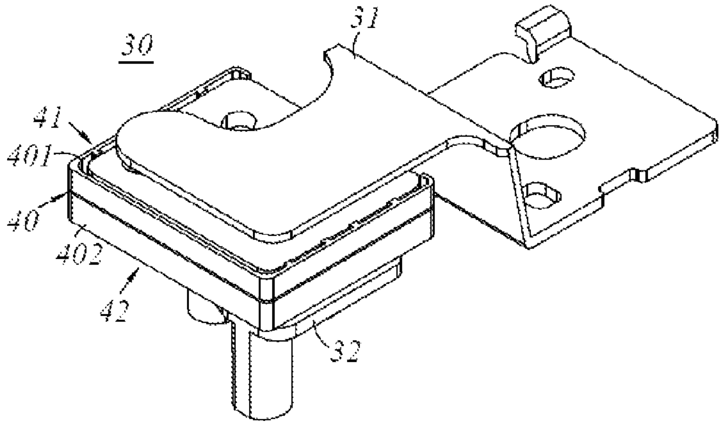
FIG. 6 is a perspective view of a hinge assembly in the first embodiment of the present invention in the closed state from a first perspective.
Figure 7:
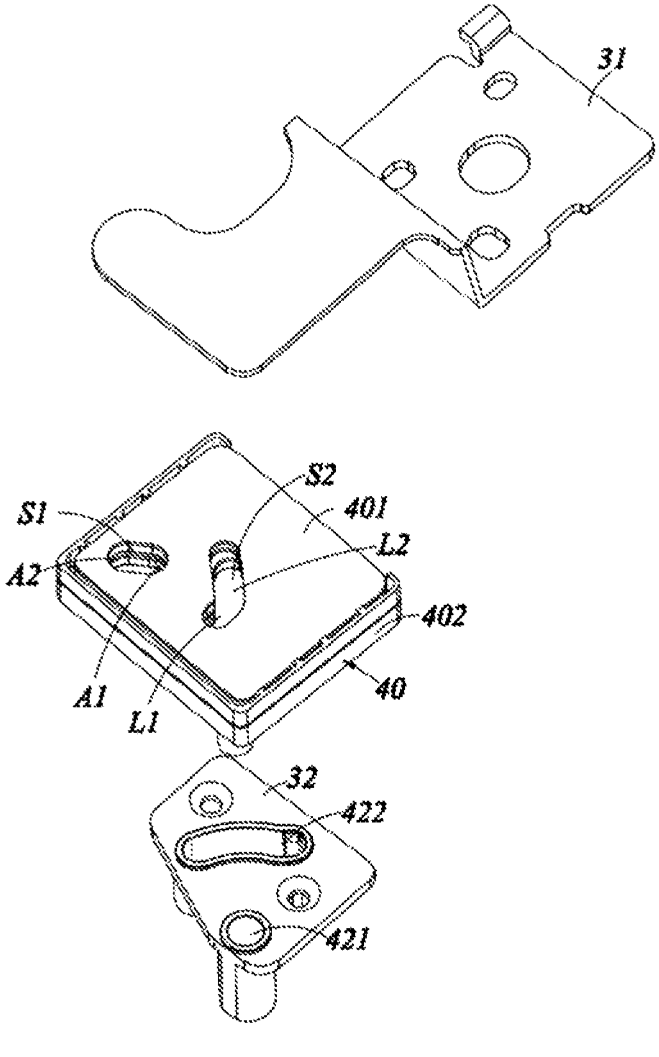
FIGS. 7 to 9 are exploded views of the hinge assembly in the first embodiment of the present invention in different states from the first perspective.
Figure 8:
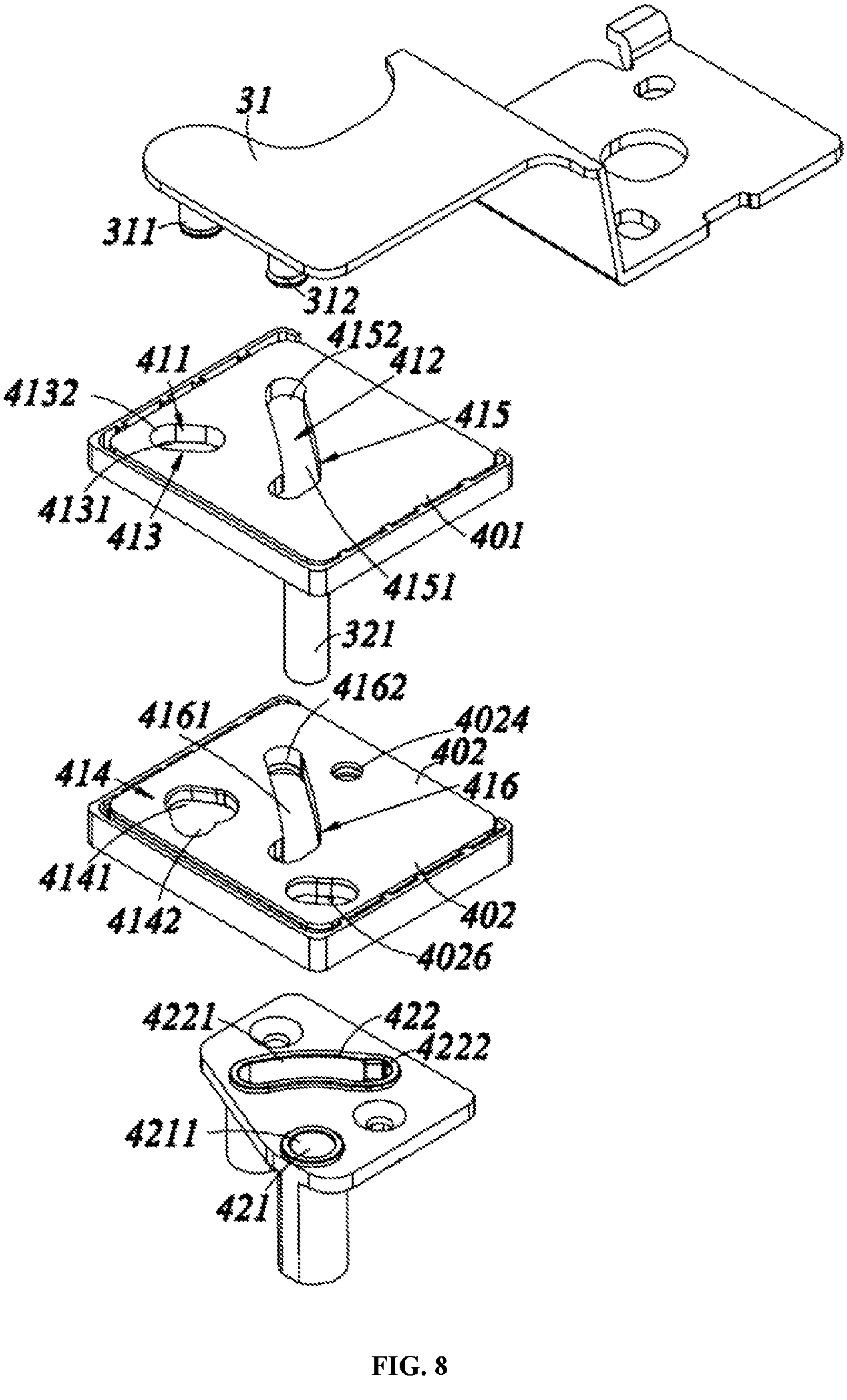

Hereinafter, the present invention will be described in detail in conjunction with specific embodiments shown in the accompanying drawings. However, these embodiments have no limitations on the present invention, and any transformations of structure, method, or function made by persons skilled in the art according to these embodiments fall within the protection scope of the present invention.

In drawings of the invention, some of the dimensions of the structure or portion may be enlarged relative to those of other structures or portions for ease of illustration and thus are merely used to illustrate the basic structure of the subject matter of the present invention.

In addition, the terms expressive of spatial relative positions, such as "upper", "above", "lower", "below", "left", "right", or the like herein are used to describe the relationship of a unit or feature relative to another unit or feature in the drawings, for the purpose of illustration and description. Terms expressive of the spatial relative positions are intended to include different orientations of the device in use or operation other than the orientations shown in the drawings. For example, if the device in the drawings is turned over, the units which are described to be located "below" or "under" other units or features are "above" other units or features. Therefore, the exemplary term "below" may include both the "above" and "below" orientations. The device may be oriented (rotated by 90 degrees or other orientations) in other ways, correspondingly explaining the expressions related to the space herein.

In the present embodiment, referring to FIGS. 1 to 13, a refrigerator 100 includes a cabinet 10, a door 20 for opening and closing the cabinet 10, and a hinge assembly 30 for connecting the cabinet 10 and the door 20.

The cabinet 10 includes an accommodating chamber S and a pivoting side P connected with the hinge assembly 30.

The hinge assembly 30 includes a first hinge part 31, a second hinge part 32 and a switching assembly 40 connected with the first hinge part 31 and the second hinge part 32.

When the door 20 is in an opening process, the first hinge part 31 moves relative to the switching assembly 40, and then, the second hinge part 32 moves relative to the switching assembly 40; the hinge assembly 30 drives the door 20 to rotate in situ relative to the cabinet 10, then drives the door 20 to move from the pivoting side P towards the accommodating chamber S, and then drives the door 20 to continuously rotate in situ relative to the cabinet 10.

Here, the door 20 rotates in situ relative to the cabinet 10 to effectively avoid that the door 20 is unable to be opened normally due to displacement of the door 20 in a certain direction; the door 20 moves from the pivoting side P towards the accommodating chamber S to prevent the door 20 from interfering with a peripheral cupboard or wall, or the like, in the opening process, and the structure is suitable for an embedded cupboard or a scenario with a small space for accommodating the refrigerator 100.

In addition, in the present embodiment, the first hinge part 31 and the second hinge part 32 may be switched by the switching assembly 33, the first hinge part 31 and the second hinge part 32 may achieve partial functions of in-situ rotation, movement from the pivoting side P to the accommodating chamber S, and continuous in-situ rotation respectively, and in the present embodiment, the in-situ rotation, the movement from the pivoting side P to the accommodating chamber S, and the continuous in-situ rotation are sequentially completed one by one.

In the present embodiment, the first hinge part 31 is fixed to the cabinet 10, the second hinge part 32 is fixed to the door 20, the switching assembly 40 includes a first fitting part 41 and a second fitting part 42, and the first hinge part 31 and the second hinge part 32 have various combinations.

In a first combination, when the door 20 is opened from a closed state to a first opening angle $\alpha 1$, the first hinge part 31 and the first fitting part 41 move relatively to drive the door 20 to rotate in situ relative to the cabinet 10, the first hinge part 31 and the first fitting part 41 then move relatively to drive the door 20 to move from the pivoting side P towards the accommodating chamber S, and the second fitting part 42 limits the second hinge part 32; when the door 20 is continuously opened from the first opening angle $\alpha 1$ to a second opening angle $\alpha 2$, the second hinge part 32 is released from the limit of the second fitting part 42, and the first fitting part 41 limits the first hinge part 31; when the door 20 is continuously opened from the second opening angle $\alpha 2$ to a maximum opening angle $\alpha 3$, the second hinge part 32 and the second fitting part 42 move relatively to drive the door 20 to continuously rotate in situ.

That is, in the present example, the first hinge part 31 and the first fitting part 41 are fitted to sequentially implement the in-situ rotation of the door 20, and the movement of the door 20 from the pivoting side P to the accommodating chamber S, the second hinge part 32 and the second fitting part 42 are fitted to implement the continuous in-situ rotation of the door 20, and the first hinge part 31 and the second hinge part 32 operate in sequence by means of locking and unlocking functions of the switching assembly 40.

In a second combination, when the door 20 is opened from a closed state to a first opening angle $\alpha 1$, the first hinge part 31 and the first fitting part 41 move relatively to drive the door 20 to rotate in situ relative to the cabinet 10, and the second fitting part 42 limits the second hinge part 32; when the door 20 is continuously opened from the first opening angle α1 to a second opening angle α2, the second hinge part 32 is released from the limit of the second fitting part 42, and the first fitting part 41 limits the first hinge part 31; when the door 20 is continuously opened from the second opening angle α2 to a maximum opening angle α3, the second hinge part 32 and the second fitting part 42 move relatively to drive the door 20 to move from the pivoting side P towards the accommodating chamber S, and then, the second hinge part 32 and the second fitting part 42 move relatively to drive the door 20 to continuously rotate in situ.

That is, in the present example, the first hinge part 31 and the first fitting part 41 are fitted to implement the in-situ rotation of the door 20, the second hinge part 32 and the second fitting part 42 are fitted to sequentially implement the movement of the door 20 from the pivoting side P to the accommodating chamber Sand the continuous in-situ rotation of the door 20, and the first hinge part 31 and the second hinge part 32 operate in sequence by means of locking and unlocking functions of the switching assembly 40.

Hereinafter, the refrigerator 100 according to the present embodiment will be described with a variety of specific embodiments of these two combinations as an example, and a multi-door refrigerator 100 is taken as an example of the refrigerator 100.

Referring to FIGS. 1 to 5, schematic diagrams of a multi-door refrigerator 100 of the first embodiment of the present invention are shown.

The refrigerator 100 includes a cabinet 10, a door 20 for opening and closing the cabinet 10, and a hinge assembly 30 for connecting the cabinet 10 and the door 20.

It should be emphasized that the structure in the present embodiment is applicable to not only the multi-door refrigerator 100 with the hinge assembly 30, but also other scenarios, such as the cupboard, a wine cabinet, a wardrobe, or the like, and the present invention is exemplified with the multi-door refrigerator 100, but not limited thereto.

The cabinet 10 includes an accommodating chamber S and a pivoting side P connected with the hinge assembly 30.

Here, the "pivoting side P" is defined as a region where the door 20 is rotated relative to the cabinet 10, i.e., a region where the hinge assembly 30 is provided, a direction from the pivoting side P to the accommodating chamber S is defined as a first direction X, and a direction from the accommodating chamber S to the pivoting side P is defined as a second direction Y.

Specifically, when the hinge assemblies 30 are provided on both left and right sides of the refrigerator 100, the cabinet 10 includes a left pivoting side P1 and a right pivoting side P2; when the left pivoting side P1 serves as the pivoting side P, the first direction X is from left to right, and the second direction Y is from right to left, and when the right pivoting side P2 serves as the pivoting side P, the first direction X is from right to left, and the second direction Y is from left to right; that is, actual directions of the first direction X and the second direction Y are different corresponding to different pivoting sides P, and for example, the left pivoting side P1 serves as the pivoting side P in the following description.

The door 20 is provided with a first fitting portion 25, and the cabinet 10 is provided with a second fitting portion 12.

Referring to FIGS. 6 to 13, the hinge assembly 30 includes a first hinge part 31 fixed to the cabinet 10, a second hinge part 32 fixed to the door 20 and a switching assembly 40 connected with the first hinge part 31 and the second hinge part 32.

The first hinge part 31 and the switching assembly 40 move relatively by a first shaft set 311, 312 and a first groove set 421, 412 which are fitted with each other; the first shaft set 311, 312 includes a first shaft 311 and a second shaft 312, and the first groove set 421, 412 includes a first free section S1, a second free section S2 and locking sections 4132, 4142, 4152, 4162, the first free section S1 includes an initial position A1 and a stop position A2 which are arranged oppositely, and the second free section S2 includes a first section L1 and a second section L2 which are connected.

The second hinge part 32 and the switching assembly 40 move relatively by a second shaft set 321, 322 and a second groove set 421, 422 which are fitted with each other; the second shaft set 321, 322 includes a third shaft 321 and a fourth shaft 322, and the second groove set 421, 422 includes a third free section 421, a fourth free section 4221 and a limiting section 4222.

When the door 20 is in the closed state (referring to FIGS. 14 to 17), the first shaft 311 is located at the initial position A1, the second shaft 312 is located at an end of the first section L1 apart from the second section L2, the fourth shaft 322 is located at the limiting section 4222, such that the switching assembly 40 limits the second hinge part 32, and the first fitting portion 25 and the second fitting portion 12 are engaged with each other.

Here, the first fitting portion 25 and the second fitting portion 12 are engaged with each other to close the door 20 and the cabinet 10, and specific forms of the first fitting portion 25 and the second fitting portion 12 may be determined according to actual situations.

When the door 20 is opened from the closed state to the first opening angle α1 (referring to FIGS. 18 to 25), the first shaft 311 rotates in situ at the initial position A1, the second shaft 312 moves in the first section L1 around the first shaft 311, the first fitting portion 25 is disengaged from the second fitting portion 12, the door 20 rotates in situ relative to the cabinet 10, the second shaft 312 then moves in the second section L2 to drive the first shaft 311 to move from the initial position A1 to the stop position A2, the door 20 moves from the pivoting side P to the accommodating chamber S.

Specifically, when the door 20 is opened from the closed state to a first intermediate opening angle α11 (referring to FIGS. 18 to 21), the first shaft 311 rotates in situ at the initial position A1, the second shaft 312 moves in the first section L1 around the first shaft 311, the door 20 rotates in situ relative to the cabinet 10, and the first fitting portion 25 is disengaged from the second fitting portion 12.

Here, when opened to the first intermediate opening angle α11 from the closed state, the door 20 rotates in situ relative to the cabinet 10; that is, the door 20 only rotates without generating displacement in other directions, thus effectively avoiding that the first fitting portion 25 is unable to be disengaged from the second fitting portion 12 due to the displacement in a certain direction of the door 20.

It should be noted that the refrigerator 100 according to the present embodiment may be configured as a single-door refrigerator having the first fitting portion 25 and the second fitting portion 12, or a side-by-side refrigerator, a multi-door refrigerator, or the like, having the first fitting portion 25 and the second fitting portion 12, in the present embodiment, the refrigerator 100 is a five-door refrigerator.

When the door 20 is opened from the first intermediate opening angle α11 to the first opening angle α1 (referring to FIGS. 22 to 25), the second shaft 312 moves in the second section L2 to drive the first shaft 311 to move from the initial position A1 to the stop position A2, and the door 20 moves from the pivoting side P towards the accommodating chamber S.

Here, when the door 20 is continuously opened to the first opening angle α1 from the first intermediate opening angle α11, the door 20 moves towards a side of the accommodating chamber S; that is, at this point, the door 20 rotates relative to the cabinet 10 and is displaced relative to the cabinet 10 in the first direction X, thus greatly reducing a distance by which the door 20 protrudes out of the cabinet 10 towards a side apart from the accommodating chamber S in the rotation process; that is, the displacement of the door 20 in the first direction X counteracts a part of the door 20 protruding out of the cabinet 10 in the second direction Y in the rotation process, thereby preventing the door 20 from interfering with the peripheral cupboard or wall, or the like, in the opening process; the refrigerator is suitable for the embedded cupboard or the scenario with a small space for accommodating the refrigerator 100.

When the door 20 is continuously opened from the first opening angle α1 to the second opening angle α2 (referring to FIGS. 26 to 29), the fourth shaft 322 is separated from the limiting section 4222, and the first shaft 311 and/or the second shaft 312 are/is limited at the locking sections 4132, 4142, 4152, 4162, such that the switching assembly 40 limits the first hinge part 31.

When the door 20 is continuously opened from the second opening angle α2 to a maximum opening angle α3 (referring to FIGS. 30 to 33), the third shaft 321 rotates in situ in the third free section 421, the fourth shaft 322 moves in the fourth free section 4221 around the third shaft 321, and the door 20 continuously rotates in situ relative to the cabinet 10.

In the present embodiment, the door 20 includes a first door 206 and a second door 207 pivotally connected with the cabinet 10 and arranged side by side in a horizontal direction.

The refrigerator 100 further includes a vertical beam 80 movably connected to a side of the first door 206 close to the second door 207, and the first fitting portion 25 is provided at the vertical beam 80.

Here, the vertical beam 80 is movably connected to a right side of the first door 206, the vertical beam 80 and the first door 206 may be connected by a return spring 81, and the vertical beam 80 rotates relative to the first door 206 around an axis in a vertical direction; in other words, under the action of the return spring 81, the vertical beam 80 may rotate relative to the first door 206 and be kept at a predetermined position.

The first fitting portion 25 is configured as a bump 25 protruding upwards from the vertical beam 80.

The second fitting portion 12 is fixedly provided on the cabinet 10; for example, the second fitting portion 12 is configured as a groove 12 in a base 104, the base 104 is fixedly provided at a top of an accommodating chamber S, a notch 121 is provided in an end of the groove 12, the notch 121 has a forward opening, the bump 25 and the groove 12 are both arc-shaped, and the bump 25 enters or leaves the groove 12 through the notch 121 to achieve mutual limitation and separation of the bump 25 and the groove 12.

Certainly, it may be understood that specific structures of the first and second fitting portions 25, 12 are not limited to the above description; that is, the first fitting portion 25 is not limited to the bump 25 at the vertical beam 80, the second fitting portion 12 is not limited to the groove 12 fitted with the bump 25, and the first and second fitting portions 25, 12 may be configured as structures fitted with each other in other regions of the refrigerator 100.

In the present embodiment, the door 20 further includes a third door 208 and a fourth door 209 pivotally connected to the cabinet 10 and arranged side by side in the horizontal direction, the third door 208 is located below the first door 206, the fourth door 209 is located below the second door 207, and the refrigerator 100 further includes a drawer 300 located below the third door 208 and the fourth door 209.

Here, the accommodating chamber S corresponding to the first door 206 and the second door 207 is configured as a refrigerating chamber; that is, the refrigerating chamber has a side-by-side structure; the third door 208 and the fourth door 209 correspond to two independent variable temperature compartments respectively; the drawer 300 is configured as a freezing drawer.

It should be noted that the refrigerator 100 includes a fixed beam fixed inside the cabinet 10 and configured to separate the two variable temperature compartments, and the third door 208 and the fourth door 209 may be fitted with the fixed beam to achieve a sealing effect; that is, at this point, no vertical beam is required to be provided at the third door 208 and the fourth door 209.

With continued reference to FIGS. 1 to 13, the first hinge part 31 includes the first shaft 311 and the second shaft 322, the switching assembly 40 includes a first groove 411 with the first free section S1, a second groove 412 with the second free section S2, the third shaft 321 and the fourth shaft 322, and the second hinge part 32 includes a third groove 421 having the third free section 421 and a fourth groove 422 having the fourth free section 4221.

In the present embodiment, the first fitting part 41 and the second fitting part 42 are specifically configured as a first switching part 401 and a second switching part 402 which are fitted with each other; that is, the switching assembly 40 includes the first switching part 401 and the second switching part 402 which are fitted with each other, but the present invention is not limited thereto.

The first groove 411 includes a first upper groove 413 located at the first switching part 401 and a first lower groove 414 located at the second switching part 402, and the first free section S1 includes a first upper free section 4131 located at the first upper groove 413 and a first lower free section 4141 located at the first lower groove 414.

The second groove 412 includes a second upper groove 415 located at the first switching part 401 and a second lower groove 416 located at the second switching part 402, and the second free section S2 includes a second upper free section 4151 located at the second upper groove 415 and a second lower free section 4161 located at the second lower groove 416.

The locking sections 4132, 4142, 4152, 4162 include a first upper locking section 4132 communicated with the first upper free section 4131, a first lower locking section 4142 communicated with the first lower free section 4141, a second upper locking section 4152 communicated with the second upper free section 4151, and a second lower locking section 4162 communicated with the second lower free section 4161.

It should be noted that the first upper locking section 4132 may be an extension of the first upper free section 4131, such as the first upper locking section 4132 is close to the stop position A2, or it may have a certain angle with the first upper free section 4131, of course, it may not include the first upper locking section 4132 and the second upper locking section 4152, and the locking is achieved by the first lower locking section 4142 and the second lower locking section 4162.

The first upper locking section 4132 and the first lower locking section 4142 are always staggered, and the second upper locking section 4152 and the second lower locking section 4162 are always staggered.

Here, the "always staggered" means that the first upper locking section 4132 and the first lower locking section 4142 are not completely overlapped and the second upper locking section 4152 and the second lower locking section 4162 are not completely overlapped in the opening process of the door 20.

In the present embodiment, the first switching part 401 is closer to the first hinge part 31 than the second switching part 402; that is, the first hinge part 31, the first switching part 401, the second switching part 402 and the second hinge part 32 are stacked in sequence.

Figure 9:
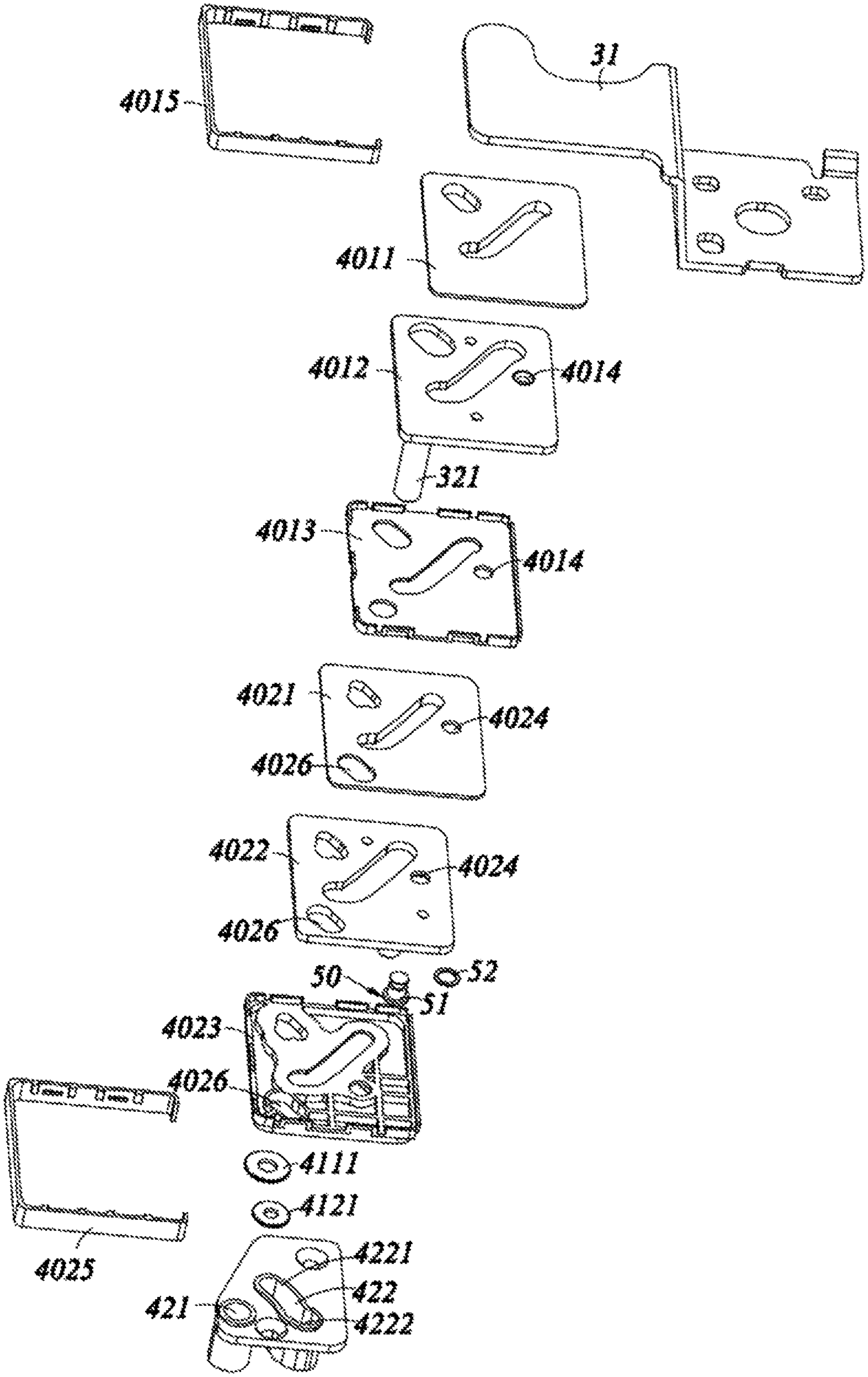
Figure 10:
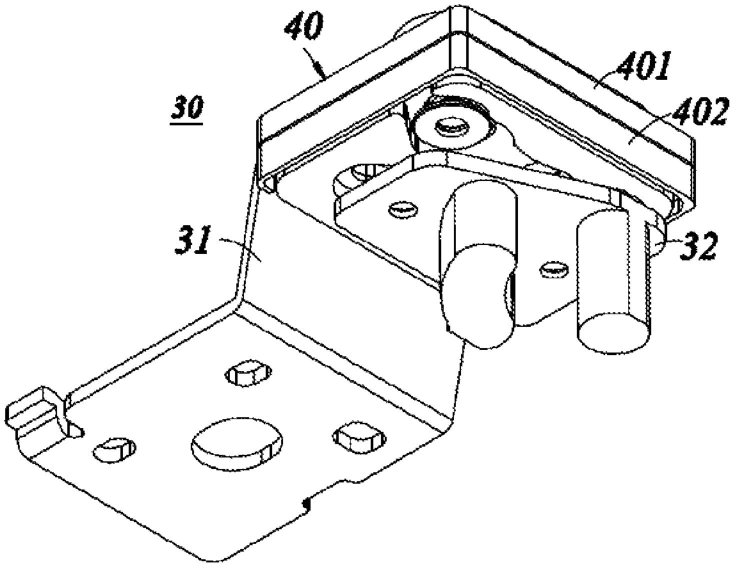
FIG. 10 is a perspective view of the hinge assembly in the first embodiment of the present invention in the closed state from a second perspective.
Figure 11:
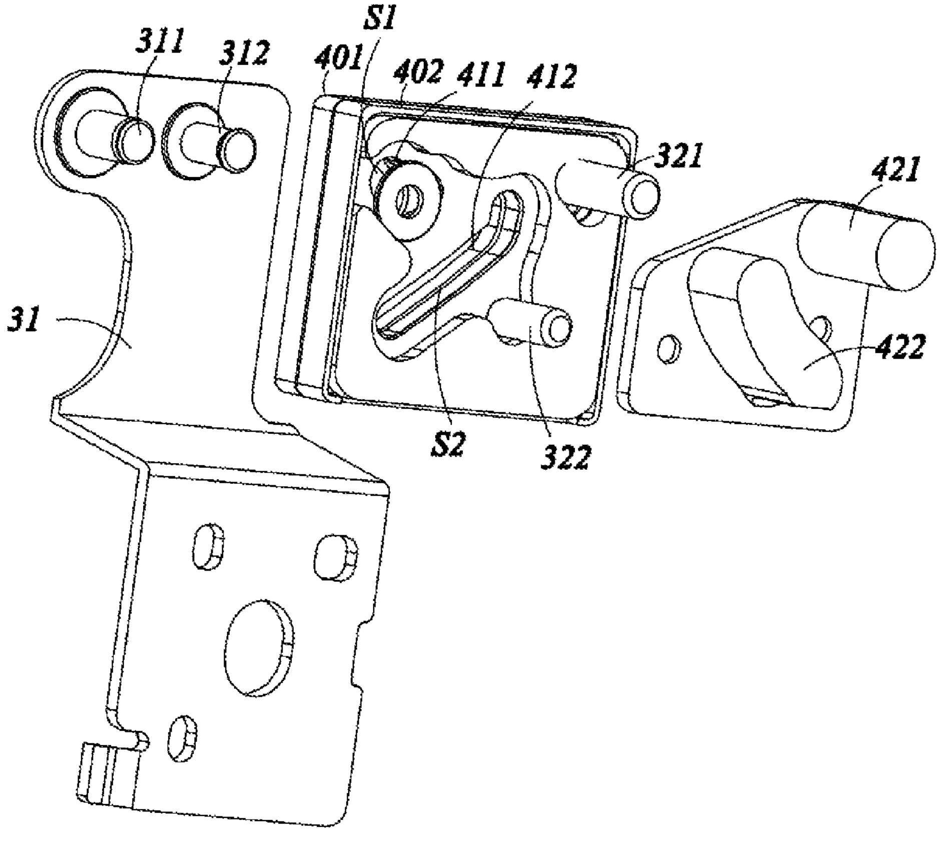
FIGS. 11 to 13 are exploded views of the hinge assembly in the first embodiment of the present invention in different states from the second perspective.
Figure 12:
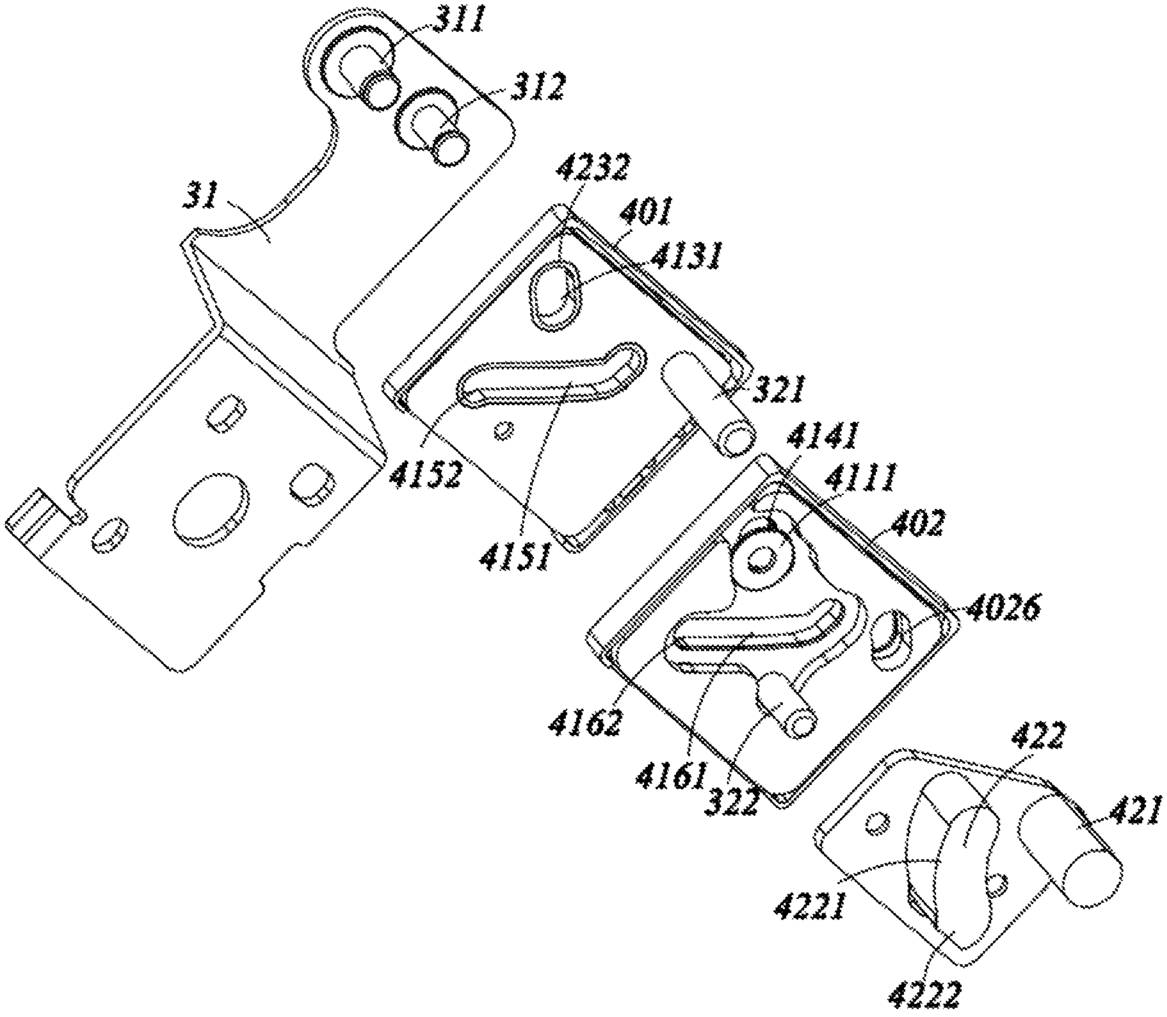
Figure 13:
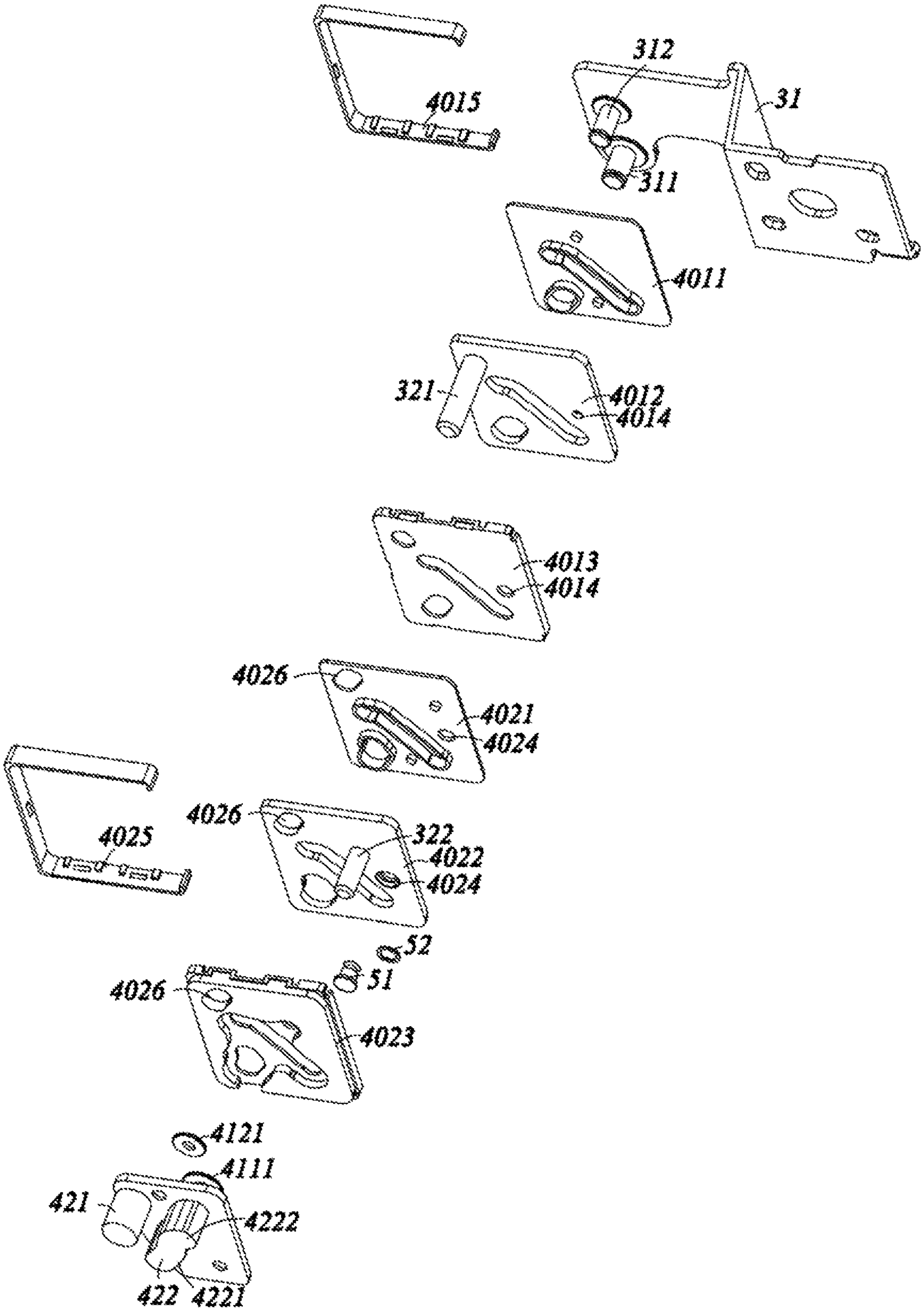
Figure 14:
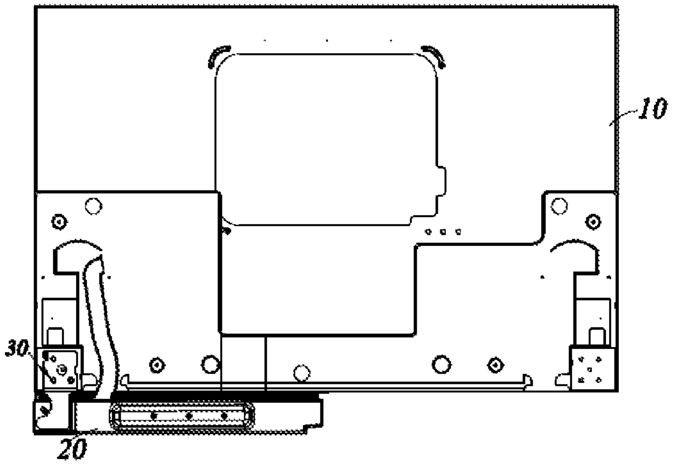
FIG. 14 is a top view of a refrigerator according to the first embodiment of the present invention in a closed state.
Figure 15:
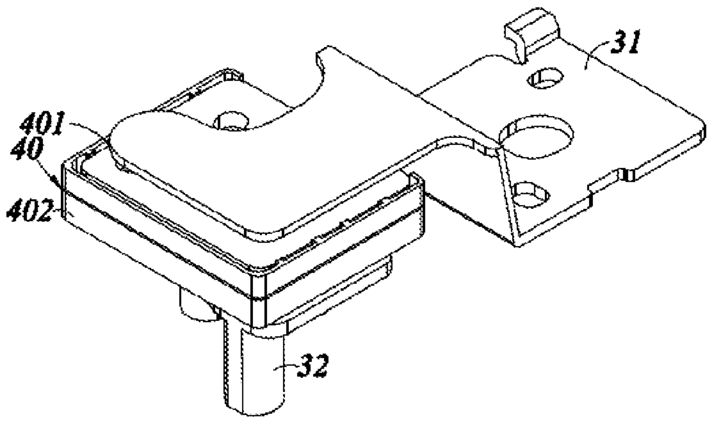
FIG. 15 is a perspective view of the hinge assembly in the first embodiment of the present invention in the closed state.
Figure 16:
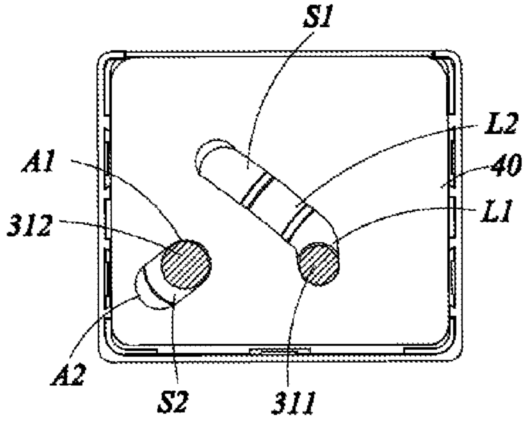
FIG. 16 is a top sectional view of the hinge assembly in the first embodiment of the present invention in the closed state.
Figure 17:
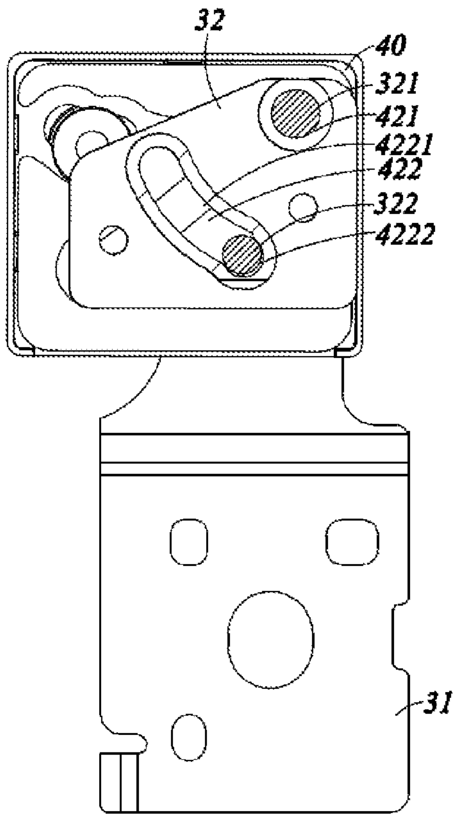
FIG. 17 is a bottom sectional view of the hinge assembly in the first embodiment of the present invention in the closed state.
Figure 18:
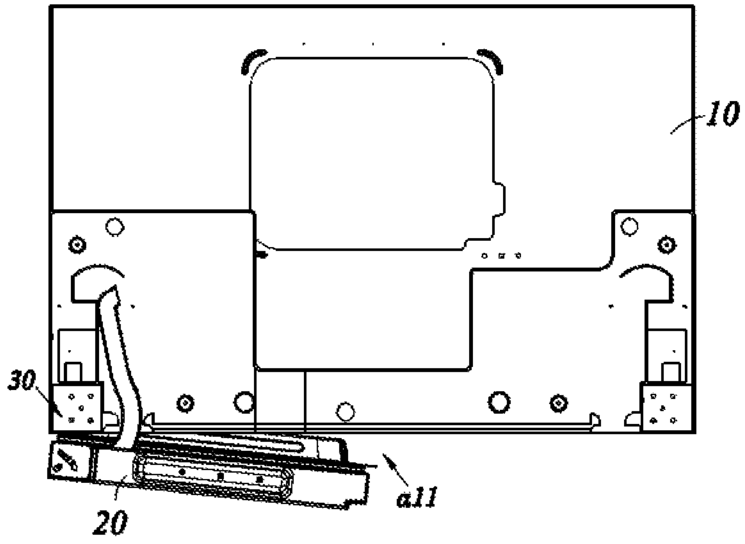
FIG. 18 is a top view of the refrigerator according to the first embodiment of the present invention at the first intermediate opening angle.
Figure 19:
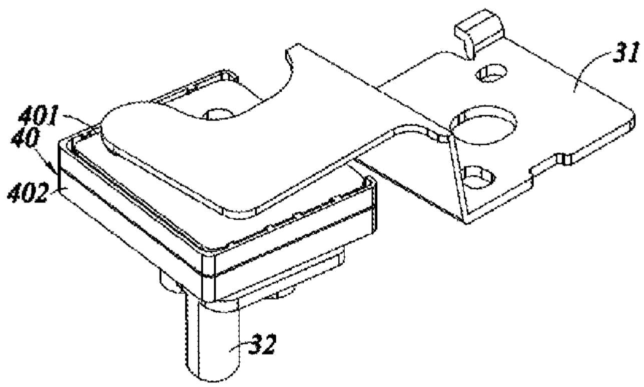
FIG. 19 is a perspective view of the hinge assembly in the first embodiment of the present invention at the first intermediate opening angle.
Figure 20:
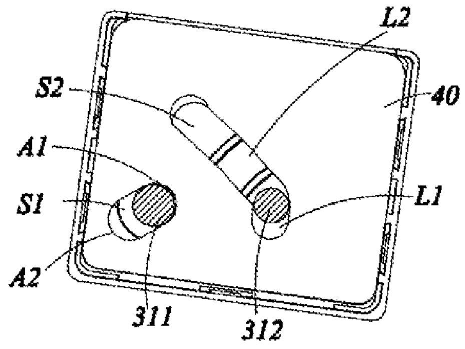
FIG. 20 is a top sectional view of the hinge assembly in the first embodiment of the present invention at the first intermediate opening angle.
Figure 21:
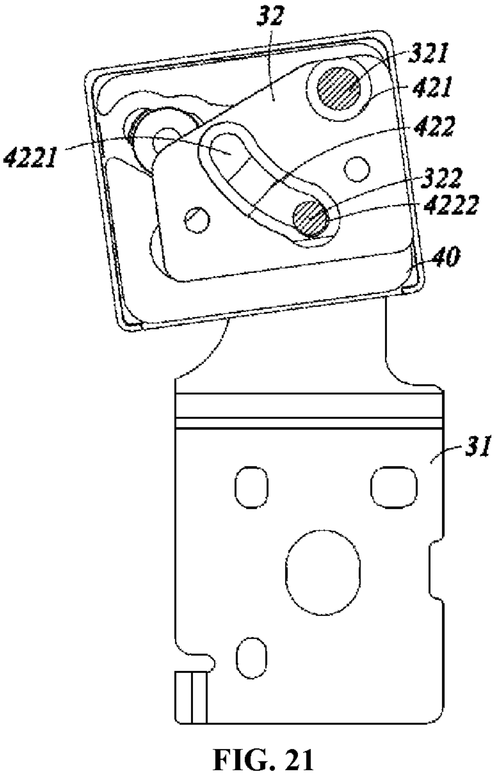
FIG. 21 is a bottom sectional view of the hinge assembly in the first embodiment of the present invention at the first intermediate opening angle.
Figure 22:
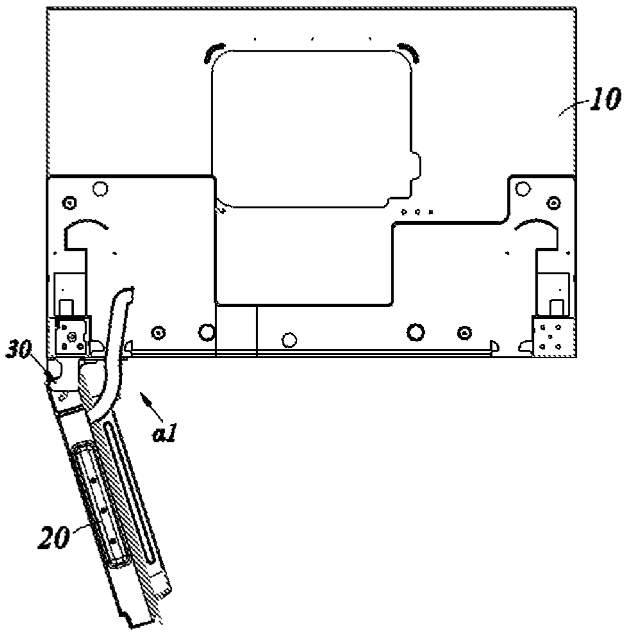
FIG. 22 is a top view of the refrigerator according to the first embodiment of the present invention at a first opening angle.
Figure 23:
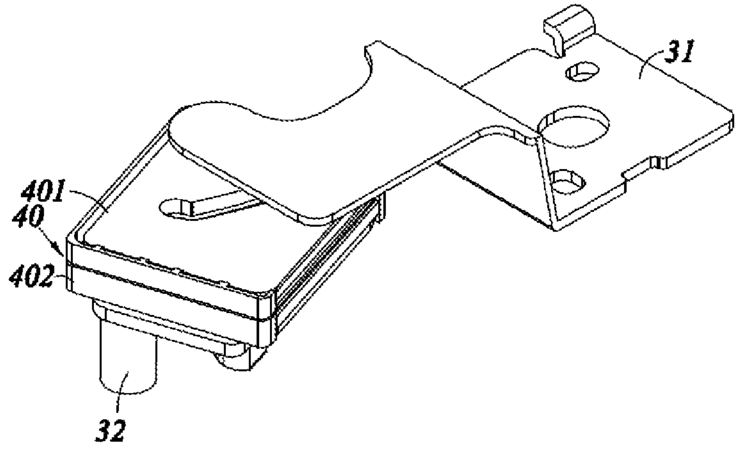
FIG. 23 is a perspective view of the hinge assembly in the first embodiment of the present invention at the first opening angle.
Figure 24:
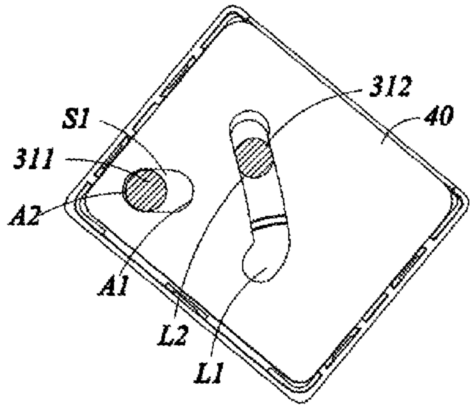
FIG. 24 is a top sectional view of the hinge assembly in the first embodiment of the present invention at the first opening angle.
Figure 25:
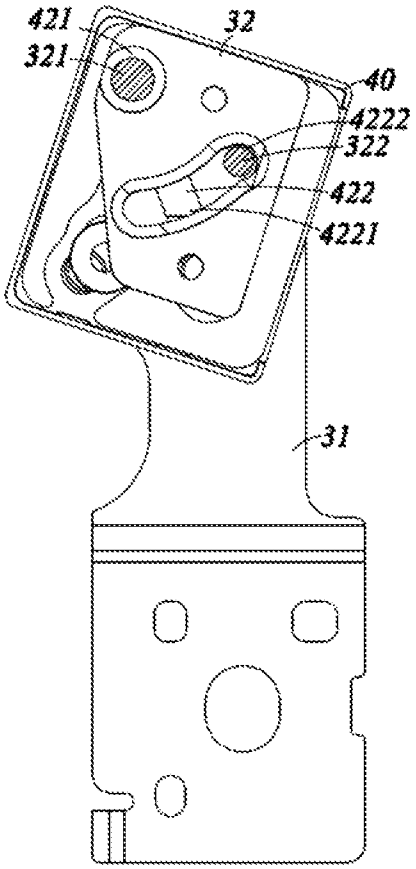
FIG. 25 is a bottom sectional view of the hinge assembly in the first embodiment of the present invention at the first opening angle.
Figure 26:
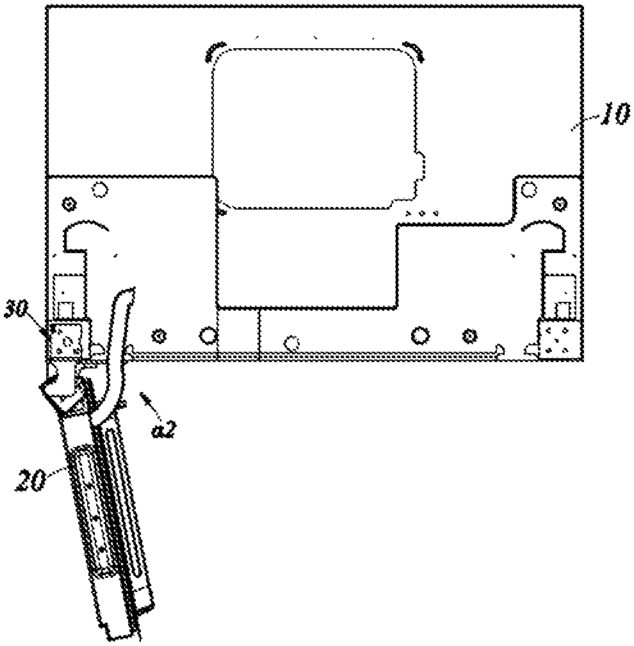
FIG. 26 is a top view of the refrigerator according to the first embodiment of the present invention at a second opening angle.
Figure 27:
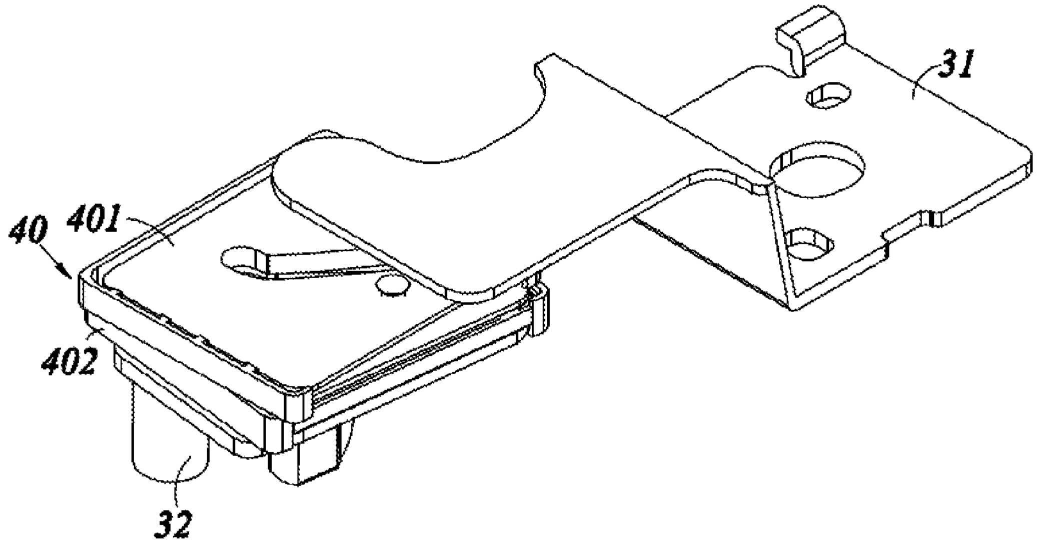
FIG. 27 is a perspective view of the hinge assembly in the first embodiment of the present invention at the second opening angle.
Figure 28:
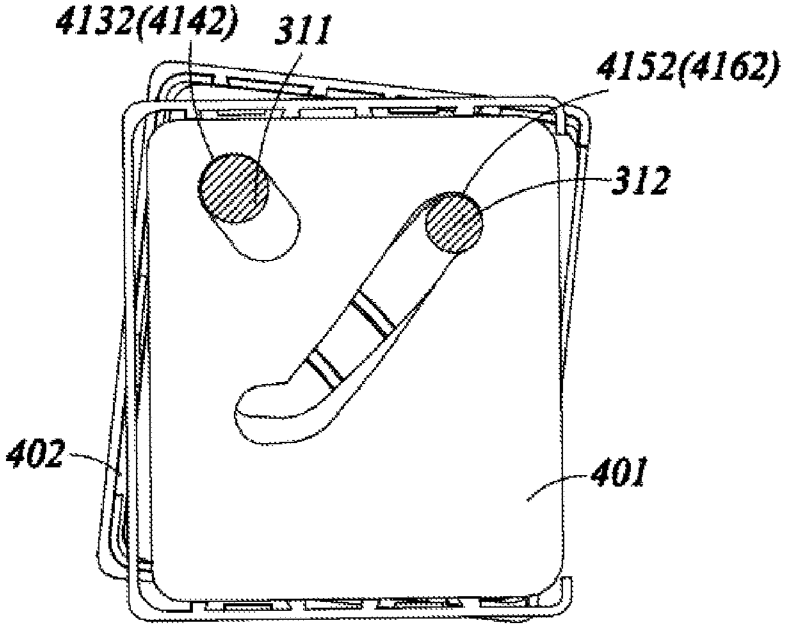
FIG. 28 is a top sectional view of the hinge assembly in the first embodiment of the present invention at the second opening angle.
Figure 29:
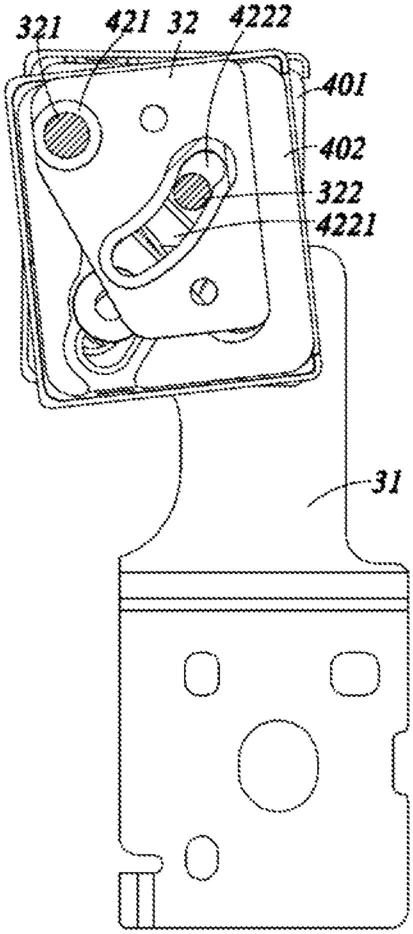
FIG. 29 is a bottom sectional view of the hinge assembly in the first embodiment of the present invention at the second opening angle.
Figure 30:
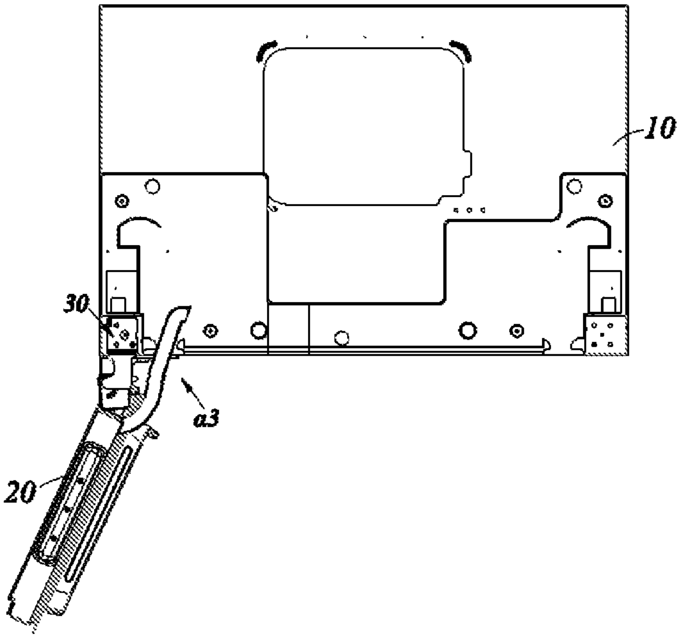
FIG. 30 is a top view of the refrigerator according to the first embodiment of the present invention at a maximum opening angle.
Figure 31:
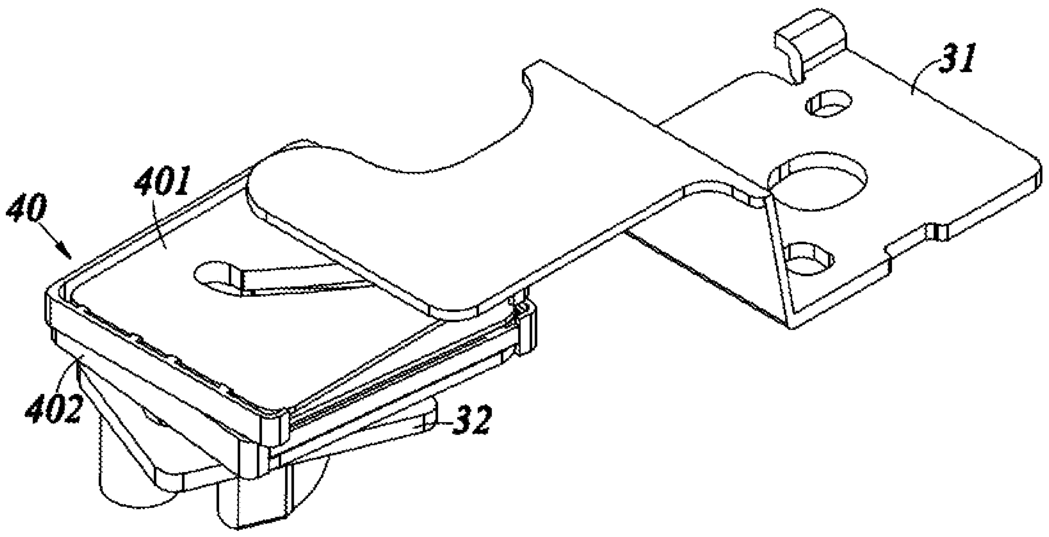
FIG. 31 is a perspective view of the hinge assembly in the first embodiment of the present invention at the maximum opening angle.
Figure 32:
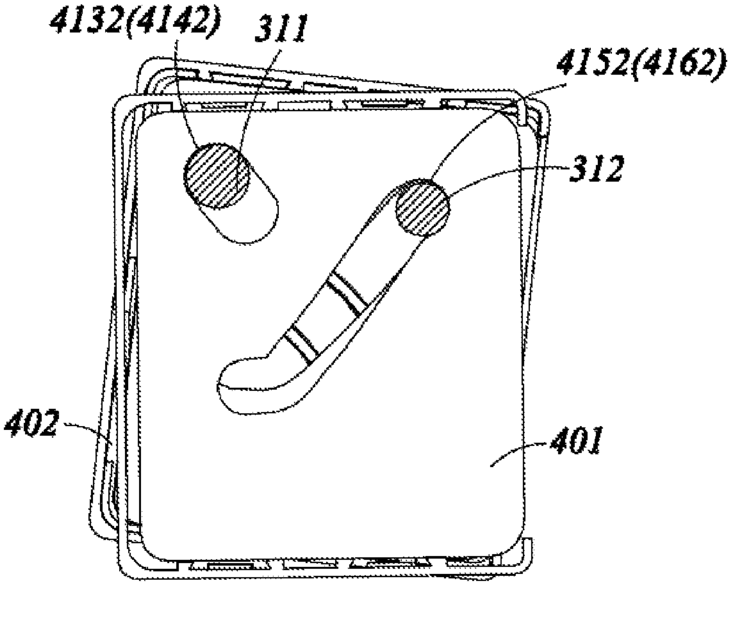
FIG. 32 is a top sectional view of the hinge assembly in the first embodiment of the present invention at the maximum opening angle.
Figure 33:
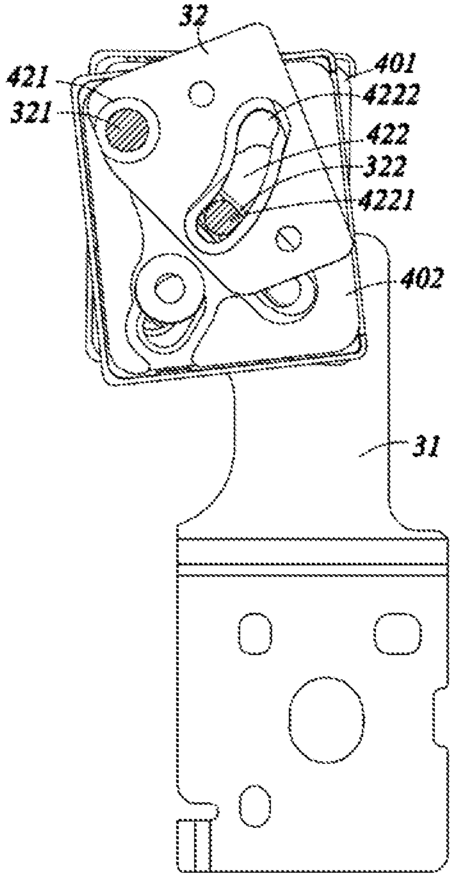
FIG. 33 is a bottom sectional view of the hinge assembly in the first embodiment of the present invention at the maximum opening angle.

Referring to FIGS. 9 and 13, the hinge assembly 30 further includes a first riveting sheet 4111 and a second riveting sheet 4121; when the first shaft 311 extends into the first groove 411, the first riveting sheet 4111 is located below the second switching part 402, and the first shaft 311 is sleeved with the first riveting sheet 4111, so as to prevent the first shaft 311 from being separated from the first groove 411; similarly, when the second shaft 312 extends into the second groove 412, the second riveting sheet 4121 is located below the second switching part 402, and the second shaft 312 is sleeved with the second riveting sheet 4121, so as to prevent the second shaft 312 from being separated from the second groove 412.

The first switching part 401 and the second switching part 402 are fitted and connected with each other by a fifth shaft 50.

Here, the first switching part 401 and the second switching part 402 are provided with a first through hole 4014 and a second through hole 4024, and an independent riveting part as the fifth shaft 50 penetrates through the first through hole 4014 and the second through hole 4024.

Specifically, the fifth shaft 50 includes a riveting post 51 and a riveting post gasket 52, the riveting post 51 has a large end located below the second through hole 4024 and a small end sequentially extending into the second through hole 4024 and the first through hole 4014, and the riveting post gasket 52 is located above the first through hole 4014 and fitted with the riveting post 51 to lock the riveting post 51.

In this way, the first switching part 401 and the second switching part 402 may be fitted and connected with each other; that is, the first switching part 401 and the second switching part 402 may move relative to each other, and the first switching part 401 and the second switching part 402 may not be separated from each other.

It should be noted that the first through hole 4014 and the second through hole 4024 are matched with the fifth shaft 50, and the first switching part 401 rotates in situ relative to the second switching part 402.

In other embodiments, the through hole may be provided in one of the first switching part 401 and the second switching part 402, and the fifth shaft 50 may be provided at the other of the first switching part 401 and the second switching part 402, such that the first switching part 401 and the second switching part 402 are fitted and connected with each other by fitting the fifth shaft 50 with the through hole, but the invention is not limited thereto.

In addition, the first switching part 401 includes the third shaft 321, the second switching part 402 has a through hole 4026, the third shaft 321 extends to the third groove 421 through the through hole 4026, the second switching part 402 includes the fourth shaft 322, and the fourth shaft 322 extends to the fourth groove 422.

Here, the through hole 4026 may have a greater size than the third shaft 321, such that the third shaft 321 may move in the through hole 4026, and when the first switching part 401 and the second switching part 402 move relatively, the through hole 4026 and the third shaft 321 may be prevented from interfering with each other.

That is, in the present embodiment, the third shaft 321 and the fourth shaft 322 are located at different switching parts, but the invention is not limited thereto.

In the present embodiment, referring to FIGS. 9 and 13, the first switching part 401 includes a first lining 4011, a first sliding sheet 4012, and a first bushing 4013 which are stacked in sequence, and the second switching part 402 includes a second lining 4021, a second sliding sheet 4022, and a second bushing 4023 which are stacked in sequence.

Here, the first hinge part 31, the first lining 4011, the first sliding sheet 4012, the first bushing 4013, the second lining 4021, the second sliding sheet 4022, the second bushing 4023, and the second hinge part 32 are stacked in sequence from top to bottom.

The first lining 4011, the first bushing 4013, the second lining 4021 and the second bushing 4023 are made of plastic, such as polyformaldehyde (POM), or the like.

The first sliding sheet 4012 and the second sliding sheet 4022 are made of metal, such as stainless steel, Q235 steel, or the like.

The first lining 4011, the first sliding sheet 4012 and the first bushing 4013 have matched profiles, and the first lining 4011 and the first bushing 4013 are fitted with each other to sandwich the first sliding sheet 4012 therebetween; the first lining 4011, the first sliding sheet 4012 and the first bushing 4013 are all required to be provided with slots to form the first upper groove 413, the second upper groove 415 and the first through hole 4014 in cooperation.

Here, the slots may be formed only in the first sliding sheet 4012 and the first bushing 4013 to form the first through hole 4014; that is, the first through hole 4014 does not penetrate through the first lining 4011, and at this point, the fifth shaft 50 extends from a position below the first switching part 401 into the first through hole 4011, and the first lining 4011 may shield the first through hole 4014 and the fifth shaft 50, thereby improving attractiveness.

The second lining 4021, the second sliding sheet 4022 and the second bushing 4023 have matched profiles, and the second lining 4021 and the second bushing 4023 are fitted with each other to sandwich the second sliding sheet 4022 therebetween; the second lining 4021, the second sliding sheet 4022 and the second bushing 4023 are all required to be provided with slots to form the first lower groove 414, the second lower groove 416 and the second through hole 4024 in cooperation.

Here, the slots may be formed only in the second lining 4021 and the second sliding sheet 4022 to form the second through hole 4024; that is, the second through hole 4024 does not penetrate through the second bushing 4023, and at this point, the fifth shaft 50 extends from a position below the second bushing 4023 into the second through hole 4024 and the first through hole 4011, and the second bushing 4023 may shield the second through hole 4024 and the fifth shaft 50, thereby improving the attractiveness.

At this point, one end of the riveting post 51 of the fifth shaft 50 may be limited in the second bushing 4023, so as to further improve a fitting effect of the second lining 4021, the second sliding sheet 4022 and the second bushing 4023.

In the present embodiment, the first switching part 401 further includes a first decorative sheet 4015 covering peripheries of the first lining 4011, the first sliding sheet 4012, and the first bushing 4013, the second switching part 402 further includes a second decorative sheet 4025 covering peripheries of the second lining 4021, the second sliding sheet 4022, and the second bushing 4023, and the first decorative sheet 4015 and the second decorative sheet 4025 are separated from each other.

Here, "the first decorative sheet 4015 and the second decorative sheet 4025 are separated from each other" means that the first decorative sheet 4015 and the second decorative sheet 4025 have independent structures, and when the first switching part 401 and the second switching part 402 move relatively, the first decorative sheet 4015 and the second decorative sheet 4025 also move relatively.

In addition, in the present embodiment, the first decorative sheet 4015 is in an n shape; that is, the first decorative sheet 4015 covers only three side surfaces of the first switching part 401, so as to assemble the first decorative sheet 4015; the three side surfaces may be provided with snap structures to be fitted with the first decorative sheet 4015, and in a stacking direction of the first switching part 401 and the second switching part 402, a width of the first decorative sheet 4015 is substantially equal to a sum of thicknesses of the first lining 4011, the first sliding sheet 4012, and the first bushing 4013.

Similarly, the second decorative sheet 4025 is in an n shape; that is, the second decorative sheet 4025 covers only three side surfaces of the second switching part 402, so as to assemble the second decorative sheet 4025; the three side surfaces may be provided with snap structures to be fitted with the second decorative sheet 4025, and in the stacking direction of the first switching part 401 and the second switching part 402, a width of the second decorative sheet 4025 is substantially equal to a sum of thicknesses of the second lining 4021, the second sliding sheet 4022, and the second bushing 4023.

The first decorative sheet 4015 and the second decorative sheet 4025 may be made of Acrylonitrile Butadiene Styrene (ABS) plastic.

Next, a specific operation flow of the hinge assembly 30 will be described.

In the present embodiment, the cabinet 10 includes an outer side surface 13 adjacent to the hinge assembly 30 and on an extension section of a rotation path of the door 20, the door 20 includes a front wall 21 apart from the accommodating chamber S and a side wall 22 always clamped between the front wall 21 and the accommodating chamber S, and a side edge 23 is provided between the front wall 21 and the side wall 22.

Referring to FIGS. 14 to 17, when the door 20 is in the closed state, the first switching part 401 and the second switching part 402 are relatively stationary, the first upper free section 4131 and the first lower free section 4141 are overlapped to form the first free section S1, the second upper free section 4151 and the second lower free section 4161 are overlapped to form the second free section S2, the first shaft 311 is located at the initial position A1, the second shaft 312 is located at an end of the first section L1 apart from the second section L2, and the bump 25 is limited in the groove 12.

Specifically, the bump 25 is limited in the groove 12, such that the vertical beam 80 extends to the second door 207; that is, at this point, the vertical beam 80 is attached to inner side surfaces of the first door 206 and the second door 207, so as to prevent cold air in the accommodating chamber S from leaking to the outside of the refrigerator 100.

In addition, the outer side surface 13 and the side wall 22 are located on a same plane, which may guarantee appearance smoothness, improve attractiveness, and facilitate a mounting process of the door 20, but the present invention is not limited thereto.

Referring to FIGS. 18 to 21, when the door 20 is opened from the closed state to the first intermediate opening angle α11, the first switching part 401 and the second switching part 402 are relatively stationary, the first upper free section 4131 and the first lower free section 4141 are overlapped to form the first free section S1, the second upper free section 4151 and the second lower free section 4161 are overlapped to form the second free section S2, the first shaft 311 rotates in situ at the initial position A1, the second shaft 312 moves in the first section L1 around the first shaft 311, and the door 20 rotates in situ relative to the cabinet 10, such that the bump 25 is separated from the groove 12.

Specifically, the bump 25 is gradually disengaged from the groove 12 through the notch 121, and at the same time, the vertical beam 80 rotates towards a side close to the accommodating chamber S, such that the first door 206 and the vertical beam 80 have a first folding angle β therebetween.

Here, when the bump 25 is completely disengaged from the groove 12, the first folding angle β is preferably kept less than 90 degrees, thus preventing the vertical beam 80 from affecting opening and closing operations of the second door 207.

It should be noted that, since an arc fit exists between the bump 25 and the groove 12, when the door 20 is in the closed state, the bump 25 and the groove 12 are limited by each other in the first direction X or the second direction Y; when the door 20 is displaced in the first direction X or the second direction Y when opened to the first intermediate opening angle α11, the bump 25 and the groove 12 may interfere with each other and be jammed, such that the bump 25 is unable to be disengaged from the groove 12, and therefore, the door 20 is unable to be opened.

In the present embodiment, the door 20 rotates in situ relative to the cabinet 10 when the door 20 is opened to the first intermediate opening angle α11, thus ensuring that the door 20 is not displaced in the first direction X or the second direction Y in this process, and then ensuring that the bump 25 may be smoothly disengaged from the groove 12.

Here, the first intermediate opening angle α11 is not greater than 10°; that is, the bump 25 may not be restricted by the groove 12 in the process of opening the door 20 to about 10°, and at this point, the bump 25 may be completely disengaged from the groove 12, or the bump 25 may not interfere with the groove 12 even when displaced in the first direction X or the second direction Y.

Referring to FIGS. 22 to 25, when the door 20 is continuously opened from the first intermediate opening angle α11 to the first opening angle α1, the first switching part 401 and the second switching part 402 are relatively stationary, the first upper free section 4131 and the first lower free section 4141 are overlapped to form the first free section S1, the second upper free section 4151 and the second lower free section 4161 are overlapped to form the second free section S2, the second shaft 312 moves in the second section L2 to drive the first shaft 311 to move from the initial position A1 to the stop position A2, and the door 20 moves from the pivoting side P towards the accommodating chamber S.

Here, the side edge 23 moves to a side of the outer side surface 13 close to the accommodating chamber S; that is, at this point, the hinge assembly 30 drives the side edge 23 to move towards the side close to the accommodating chamber S, such that interference between the side edge 23 and the peripheral cupboard or wall, or the like, due to the side edge 23 protruding out of the outer side surface 13 may be avoided in the opening process of the door 20.

Here, in order to guarantee the opening degree of the cabinet 10 as much as possible and avoid the problem that the drawers, the racks, or the like, in the cabinet 10 are unable to be opened due to the interference of the door 20, the side edge 23 moves towards the side close to the accommodating chamber S into the plane of the outer side surface 13, and then, the hinge assembly 30 drives the side edge 23 to move in the plane and gradually approach the accommodating chamber S.

That is, at this point, on the basis of ensuring that the side edge 23 does not protrude out of the corresponding outer side surface 13, the side edge 23 is made to be as close as possible to the outer side surface 13, thus avoiding the interference between the door 20 and the peripheral cupboard or wall, or the like, in the opening process, and guaranteeing the opening degree of the cabinet 10 as much as possible.

It should be noted that when the door 20 is opened from the closed state to the first opening angle $\alpha 1$, the fourth shaft 322 is always limited at the limiting section 4222, such that the switching assembly 40 limits the second hinge part 32.

In addition, in this process, the first upper free section 4131 and the first lower free section 4141 are always overlapped into the first free section S1, and the second upper free section 4151 and the second lower free section 4161 are always overlapped into the second free section S2; that is, the first switching part 401 and the second switching part 402 have completely same motion tracks, the first shaft 311 moves at the first free section S1, and meanwhile, the second shaft 312 moves at the second free section S2; in this process, the first switching part 401 and the second switching part 402 are never staggered; that is, the first switching part 401 and the second switching part 402 are kept stationary relatively, such that the first upper free section 4131 and the first lower free section 4141 may be prevented from being staggered, and meanwhile, the second upper free section 4151 and the second lower free section 4161 are prevented from being staggered, thus ensuring that the first shaft 311 may move smoothly at the first free section S1, and the second shaft 312 may move smoothly at the second free section S2.

Referring to FIGS. 26 to 29, when the door 20 is continuously opened from the first opening angle $\alpha 1$ to the second opening angle $\alpha 2$, the first switching part 401 and the second switching part 402 move relatively, such that the fourth shaft 322 is separated from the limiting section 4222, and the first shaft 311 and/or the second shaft 312 are/is limited at the locking sections 4132, 4142, 4152, 4162, such that the switching assembly 40 limits the first hinge part 31.

Here, "the first switching part 401 and the second switching part 402 move relatively, such that the second hinge part 32 is released from the limit of the switching assembly 40, and the first shaft 311 and/or the second shaft 312 are/is limited at the locking sections 4132, 4142, 4152, 4162, such that the switching assembly 40 limits the first hinge part 31" means that the switching assembly 40 and the second hinge part 32 move relatively, such that no mutual limit exists between the switching assembly 40 and the second hinge part 32, and the switching assembly 40 and the first hinge part 31 move relatively, such that the switching assembly 40 and the first hinge part 31 are limited by each other In the present embodiment, the first shaft 311 is simultaneously limited at the first upper locking section 4132 and the first lower locking section 4142, the second shaft 312 is simultaneously limited at the second upper locking section 4152 and the second lower locking section 4162, and the fourth shaft 322 is separated from the fourth limiting section 4222, which is described as follows.

When the door 20 is opened to the first opening angle $\alpha 1$, the second shaft 312 moves from the second free section S2 to the second lower locking section 4162 and is limited, and at this point, the first shaft 311 and the second shaft 312 may no longer move relative to the first free section S1 and the second free section S2, and at this point, the first shaft 311 is close to the first upper locking section 4132 and the first lower locking section 4142, the second shaft 312 is close to the second upper locking section 4152, and tracks of the first upper locking section 4132 and the second upper locking section 4152 are adapted to moving paths of the first shaft 311 and the second shaft 312.

When the door 20 is continuously opened from the first opening angle $\alpha 1$, the door 20 drives the second hinge part 32 connected to the door 20 to move, the second hinge part 32 applies an acting force to the third shaft 321 and the fourth shaft 322 through the third free section 4211 and the fourth limiting section 4222, and then, the third shaft 321 and the fourth shaft 322 drive the first switching part 401 and the second switching part 402 to move.

Specifically, at this point, the first shaft 311 is close to the first upper locking section 4132, and the second shaft 312 is close to the second upper locking section 4152; the first switching part 401 may move by a first angle relative to the first shaft 311 and the second shaft 312 until the first shaft 311 is limited at the first upper locking section 4132, and the second shaft 312 is limited at the second upper locking section 4152; meanwhile, the second switching part 402 moves around a fifth shaft 50 by a second angle relative to the first shaft 311 until the first shaft 311 is limited in the second upper locking section 4152; in this process, the second shaft 312 always contacts the second lower locking section 4162, and the second angle is greater than the first angle.

That is, the first switching part 401 and the second switching part 402 both rotate by certain angles, and the rotation angle of the second switching part 402 is greater than the rotation angle of the first switching part 401, such that the first switching part 401 and the second switching part 402 also move relatively to be staggered.

It may be understood that the rotation processes of the first switching part 401 and the second switching part 402 are not in a certain sequence, and the first switching part 401 and the second switching part 402 may rotate simultaneously; for example, the first switching part 401 and the second switching part 402 synchronously rotate within a certain rotation angle range, and are then staggered.

In practice, the first switching part 401 and the second switching part 402 drive the first groove 411 and the second groove 412 to rotate relative to the first shaft 311 and the second shaft 312 respectively, and the first shaft 311 is separated from the first free section S1 and abuts against the first upper locking section 4132 and the first lower locking section 4142; that is, the first shaft 311 is simultaneously limited at the first upper locking section 4132 and the first lower locking section 4142; the second shaft 312 is separated from the second free section S2 and abuts against the second upper locking section 4152 and the second lower locking section 4162; that is, the second shaft 312 is simultaneously limited at the second upper locking section 4152 and the second lower locking section 4162; meanwhile, the movement of the second switching part 402 makes the fourth shaft 322 separated from the fourth limiting section 4222.

It may be understood that when the first shaft 311 is located at the first upper locking section 4132 and the first lower locking section 4142, since the first switching part 401 and the second switching part 402 are staggered, the first upper free section 4131 and the first lower free section 4141 which are originally overlapped with each other are also staggered, and at this point, the first upper free section 4131 and the first lower free section 4141 which are staggered restrict the first shaft 311 from being separated from the first upper locking section 4132 and the first lower locking section 4142, thus ensuring that the first shaft 311 is always kept at the first upper locking section 4132 and the first lower locking section 4142 in the process of continuously opening the door 20.

Similarly, when the second shaft 312 is located at the second upper locking section 4152 and the second lower locking section 4162, since the first switching part 401 and the second switching part 402 are staggered, the second upper free section 4151 and the second lower free section 4161 which are originally overlapped with each other are also staggered, and at this point, the second upper free section 4151 and the second lower free section 4161 which are staggered restrict the second shaft 312 from being separated from the second upper locking section 4152 and the second lower locking section 4162, thus ensuring that the second shaft 312 is always kept at the second upper locking section 4152 and the second lower locking section 4162 in the process of continuously opening the door 20.

In addition, the rotation angle of the second switching part 402 is greater than the rotation angle of the first switching part 401; that is, the second switching part 402 and the first switching part 401 are staggered, thus further improving a locking effect between the first hinge part 31 and the switching assembly 40, and ensuring that the first shaft 311 is always kept at the first upper locking section 4132 and the first lower locking section 4142, and the second shaft 312 is always kept at the second upper locking section 4152 and the second lower locking section 4162.

Meanwhile, when the first switching part 401 and the second switching part 402 move relatively, a distance between the third shaft 321 located at the first switching part 401 and the fourth shaft 322 located at the second switching part 402 changes, the third shaft 321 is always located at the third free section 4211, and the fourth shaft 322 moves from the fourth limiting section 4222 to the fourth free section 4221; that is, the fourth shaft 322 is separated from the fourth limiting section 4222.

Referring to FIGS. 30 to 33, when the door 20 is continuously opened from the second opening angle α2 to the maximum opening angle α3, the first switching part 401 and the second switching part 402 are relatively stationary, the third shaft 321 moves in the third free section 421, and the fourth shaft 322 moves in the fourth free section 4221.

Here, the first opening angle α1 approximately ranges from 80° to 83°, the second opening angle α2 is about 90°, and the maximum opening angle α3 is greater than 90°; that is, in the process of opening the door 20 to 80° to 83°, the door 20 first rotates in situ and is then displaced in the first direction X to prevent the door 20 from interfering with the peripheral cupboard or wall, or the like, and finally, the door is opened to 80° to 83°; then, in the process of continuously opening the door 20 to 90°, the switching assembly 40 moves, such that the door 20 has a rotation axis changed and continuously rotates; that is, after opened to 90°, the door 20 continuously rotates in situ relative to the cabinet 10 around the third shaft 321, so as to further open the door 20.

It may be understood that the angle is not limited to the above description.

It may be seen that in the present embodiment, by the unlocking and locking effects of the switching assembly 40 on the first hinge part 31 and the second hinge part 32, the first hinge part 31 and the second hinge part 32 may be effectively controlled to be switched sequentially, such that the door 20 may be opened stably.

It may be understood that, when the door 20 is in a closing process, that is, when the door 20 starts to be closed from the maximum opening angle α3, the switching assembly 40 may also effectively control the first hinge part 31 and the second hinge part 32 to be switched sequentially; that is, when the door 20 is closed from the maximum opening angle α3 to the second opening angle α2, the third shaft 321 moves at the third free section 4211, the fourth shaft 322 moves at the fourth free section 4221, and the switching assembly 40 locks the first hinge part 31; when the door 20 is closed from the second opening angle α2 to the first opening angle α1, the first switching part 401 and the second switching part 402 relatively move to make the first hinge part 31 released from the limit of the switching assembly 40, the fourth shaft 322 is limited at the fourth limiting section 4222, and the switching assembly 40 locks the second hinge part 32; when the door 20 is completely closed from the first opening angle α1, the first shaft 311 moves at the first free section S1, and the second shaft 312 moves at the second free section S2.

In other words, the closing process of the door 20 and the opening process of the door 20 are processes in reverse orders, and the switching sequence of the first hinge part 31 and the second hinge part 32 in the opening and closing processes of the door 20 may be effectively controlled by the unlocking and locking effects of the switching assembly 40 on the first hinge part 31 and the second hinge part 32.

In the present embodiment, a first pitch exists between a center of the first shaft 311 and the side edge 23, a second pitch exists between the center of the first shaft 311 and the front wall 21, a third pitch exists between the center of the first shaft 311 and the side wall 22, a fourth pitch exists between a center of the third shaft 312 and the side edge 23, a fifth pitch exists between the center of the third shaft 312 and the front wall 21, and a sixth pitch exists between the center of the third shaft 312 and the side wall 22; when the door 20 is opened from the closed state to the first opening angle α1, the first pitch, the second pitch and the third pitch are all kept unchanged first, then decreased, and when the door 20 is continuously opened from the second opening angle α2 to the maximum opening angle α3, the fourth pitch, the fifth pitch and the sixth pitch are all kept unchanged.

In addition, in the present embodiment, the first shaft 311 and the third shaft 321 are staggered, and thus, the refrigerator may be suitable for the embedded cupboard or the scenario with a small space for accommodating the refrigerator 100.

Figure 34:
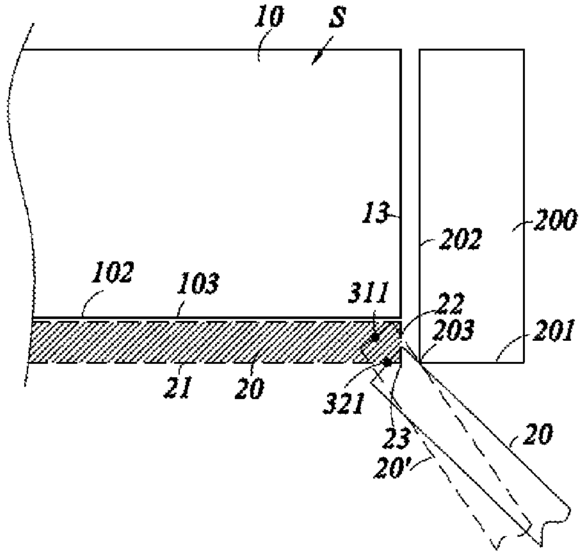
FIG. 34 is a schematic diagram of the refrigerator according to the first embodiment of the present invention in a fully embedded state.

Referring to FIG. 34, a simple schematic diagram in which the refrigerator 100 is embedded in a cupboard 200 is taken as an example for illustration.

In the present embodiment, the cabinet 10 includes an opening 102 and a front end surface 103 provided around the opening 102; the cabinet 10 further includes an accommodating chamber S and an outer side surface 13 adjacent to the hinge assembly 30 and on an extension section of a rotation path of the door 20, the door 20 includes a front wall 21 apart from the accommodating chamber S and a side wall 22 always clamped between the front wall 21 and the accommodating chamber S, and a side edge 23 is provided between the front wall 21 and the side wall 22.

Here, when the door 20 is opened to the first opening angle α1 from the closed state, the door 20 rotates around the first shaft 311, and a first distance exists between the first shaft 311 and the front end surface 103; when the door 20 is continuously opened from the second opening angle α2 to the maximum opening angle α3, the door 20 rotates around the third shaft 321, a second distance exists between the third shaft 321 and the front end surface 103, and the second distance is greater than the first distance, thus greatly increasing the maximum opening angle of the fully-embedded refrigerator 100.

In addition, a third distance exists between the first shaft 311 and the outer side surface 13, and when the door 20 is continuously opened from the second opening angle α2 to the maximum opening angle α3, a fourth distance exists between the third shaft 321 and the outer side surface 13, and the fourth distance is less than the third distance, thus further increasing the opening degree of the cabinet 10.

Details are as follows.

In some motion tracks of the refrigerator 100, the door 20 is considered to rotate around the first shaft 311 and the third shaft 321 in sequence.

In the present embodiment, the hinge assembly 30 further includes the second shaft 312 fitted with the first shaft 311 and the fourth shaft 322 fitted with the third shaft 321, and for simplicity of description, the door 20 is considered to rotate around the first shaft 311 first, and be then switched to rotated around the third shaft 321 by the switching assembly 40.

In practice, in order to improve an embedding effect, the refrigerator 100 is preferably embedded into the cupboard 200 completely, and the refrigerator 100 is configured as a free-embedded refrigerator; that is, a front end 201 of the cupboard 200 is located on a same plane as the front wall 21 on a side of the door 20 apart from the cabinet 10, or the front wall 21 of the door 20 does not protrude from the front end 201 of the cupboard 200 at all.

In a prior art, all refrigerators are single-shaft refrigerators, and certain distances are required to be kept between a rotating shaft of the refrigerator and a side wall and a front wall of the refrigerator, such that enough spaces may be provided to satisfy foaming or other processes; that is, the rotating shaft of the existing refrigerator is approximately located at the position of the first shaft 311 in FIG. 34; in this case, after the single-shaft refrigerator is embedded into the cupboard 200, since a corner 203 of the cupboard 200 between the front end 201 and an inner wall 202 is provided corresponding to the side edge 23 of the door 20, when the door 20 is opened, the side edge 23 interferes with the door 20 to limit the maximum opening angle of the door 20; in order to ensure that the door 20 is opened normally, a common method in the prior art is to increase a gap between the inner wall 202 of the cupboard 200 and the refrigerator 100, and this gap is required to have a size of approximate 10 cm, which seriously affects the embedding effect and is not favorable for rational utilization of a limited space.

Referring to FIG. 34, a shaded region represents the door 20 in the closed state; when the door 20 is in the opening process, and when the door 20 always rotates around the first shaft 311 (i.e., the prior art), referring to the dotted-line door 20' in FIG. 34, since the first shaft 311 is close to the front end surface 103 (that is, apart from the front end 201 of the cupboard 200), after the door 20' is opened to a certain angle, the corner 203 of the cupboard 200 interferes with the door 20' to limit the maximum opening angle of the door 20'.

In the present embodiment, the third shaft 321 is located at the first switching part 401, and in the opening process of the door 20, the switching assembly 40 moves relative to the first hinge part 31 and the second hinge part 32, such that the third shaft 321 gradually moves away from the front end surface 103; that is, the third shaft 321 gradually moves towards the front end 201 of the cupboard 200; that is, at this point, the whole door 20 moves away from the cabinet 10; referring to the solid-line door 20 in FIG. 34, the interference effect of the corner 203 of the cupboard 200 on the door 20 is reduced greatly, and the corner 203 of the cupboard 200 interferes with the door when the door 20 is opened to a larger angle, thereby greatly increasing the maximum opening angle of the door 20.

That is, in the present embodiment, the door 20 may rotate around the third shaft 321 in a later period under the action of the switching assembly 40, such that the maximum opening angle of the door 20 may be effectively increased on the premise of ensuring that the refrigerator 100 is freely embedded into the cupboard 200, thus facilitating a user to operate the refrigerator 100, and greatly improving user experiences.

Moreover, in the present embodiment, the gap between the inner wall 202 of the cupboard 200 and the refrigerator 100 is not required to be increased, and the refrigerator 100 and the cupboard 200 may be connected seamlessly, thereby greatly improving the embedding effect.

In addition, in the present embodiment, the switching assembly 40 drives the third shaft 321 to gradually move towards the front end 201 of the cupboard 200, and simultaneously drives the third shaft 321 to gradually approach the inner wall 202 of the cupboard 200; that is, when the door 20 rotates around the third shaft 321, the third shaft 321 is closer to the front end 201 and the inner wall 202 of the cupboard 200 than the first shaft 311, so as to increase the maximum opening angle of the door 20, and make the door 20 apart from the cabinet 10 to increase the opening degree of the cabinet 10, thereby facilitating opening and closing operations of racks, drawers, or the like, in the cabinet 10, or facilitating taking and placing operations of articles.

Certainly, the third shaft 321 finally used as the rotating shaft may be located at other positions; for example, when the door 20 rotates around the third shaft 321, the third shaft 321 is closer to the front end 201 of the cupboard 200 than the first shaft 311, and the third shaft 321 is farther away from the inner wall 202 of the cupboard 200 than the first shaft 311, or the like.

It may be understood that the switching assembly 40 controls the switching sequence of the first hinge part 31 and the second hinge part 32 in the opening and closing processes of the door 20, thus effectively preventing the door 20 from interfering with the cupboard 200 in the opening and closing processes.

In addition, it should be noted that the motion track of the door 20 may be effectively controlled by specific designs of the shaft and the groove; in the present embodiment, the cabinet 10 includes a pivoting side P connected to the hinge assembly 30, and when the door 20 is in the opening process, the hinge assembly 30 at least drives the door 20 to move from the pivoting side P towards the accommodating chamber S, so as to prevent the door 20 from interfering with the peripheral cupboard or wall, or the like, in the opening process; for the specific designs of the shaft and the groove, reference may be made to the following example.

Figure 35:
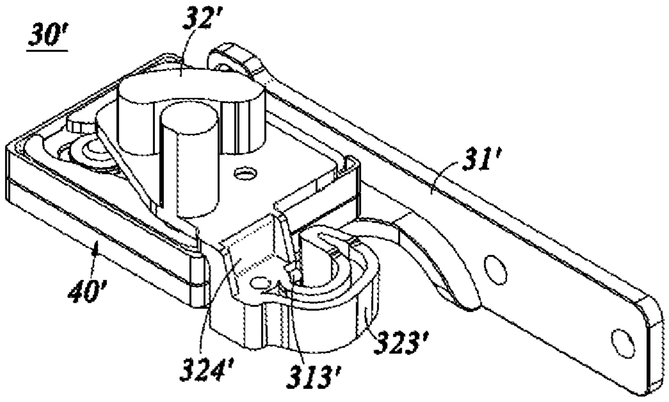
FIG. 35 is a perspective view of the hinge assembly below a door in the first embodiment of the present invention.
Figure 36:
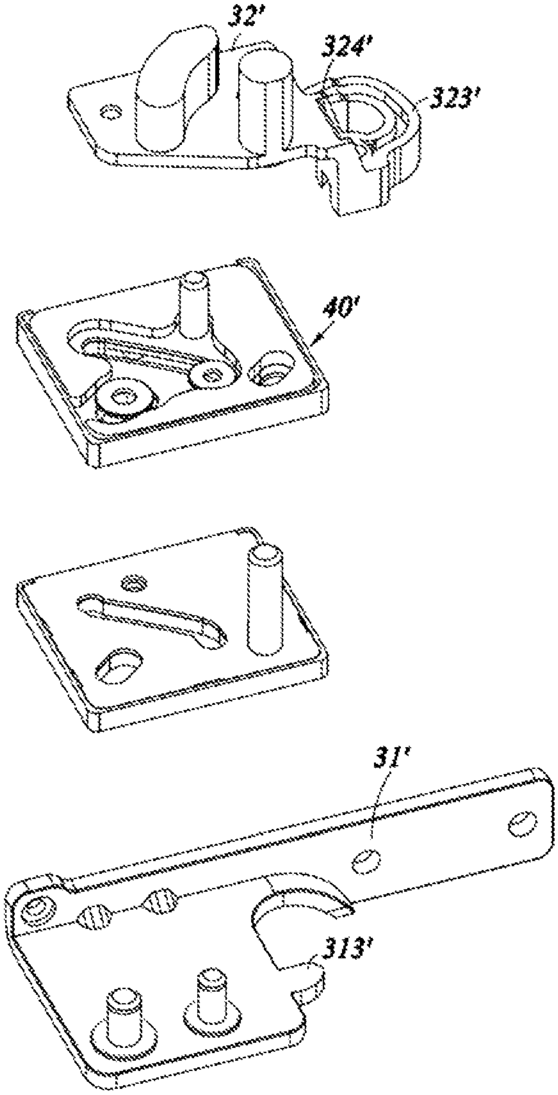
FIG. 36 is an exploded view of the hinge assembly below the door in the first embodiment of the present invention.
Figure 37:
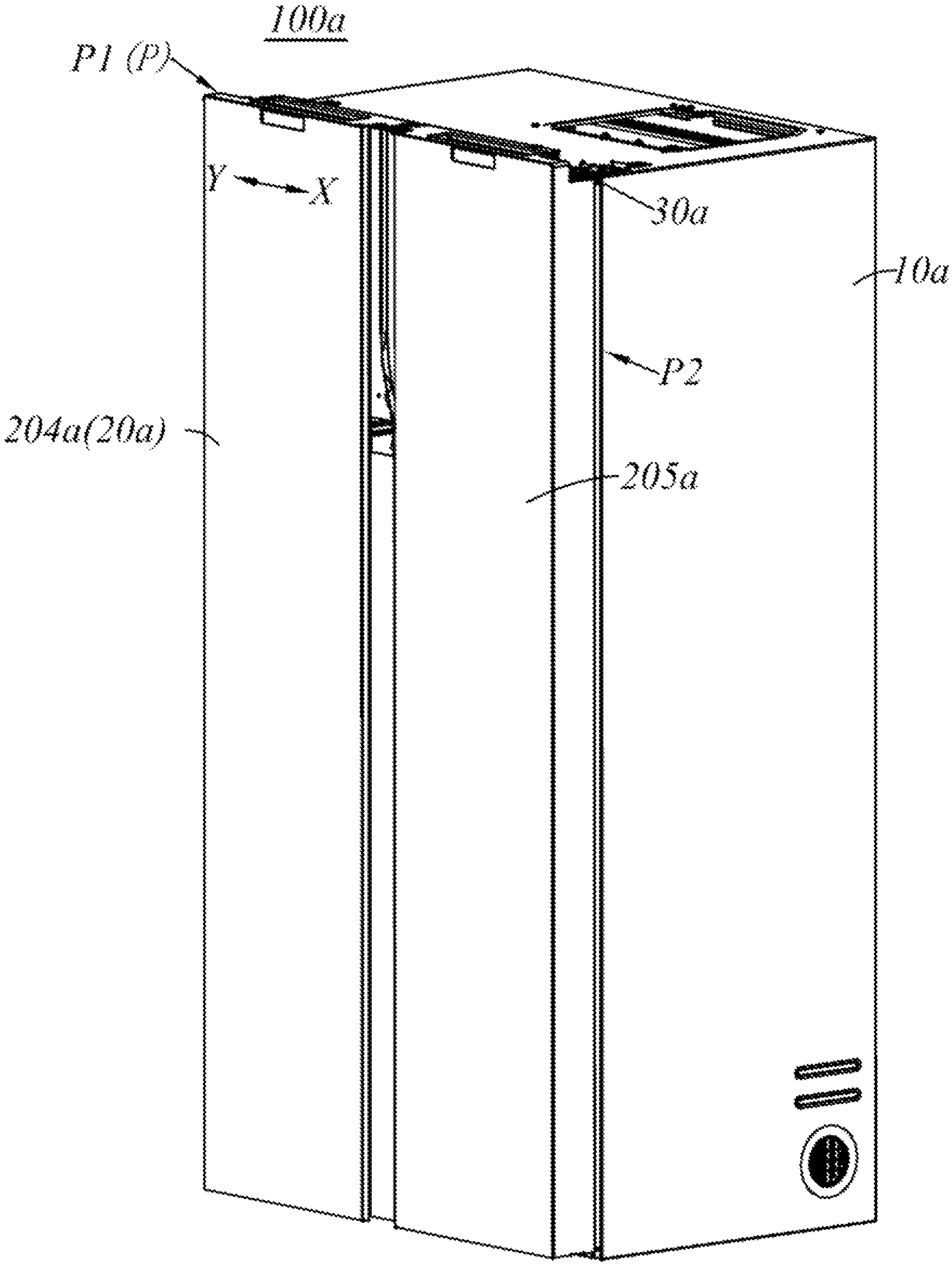
FIG. 37 is a perspective view of a side-by-side refrigerator according to the second embodiment of the present invention.
Figure 38:
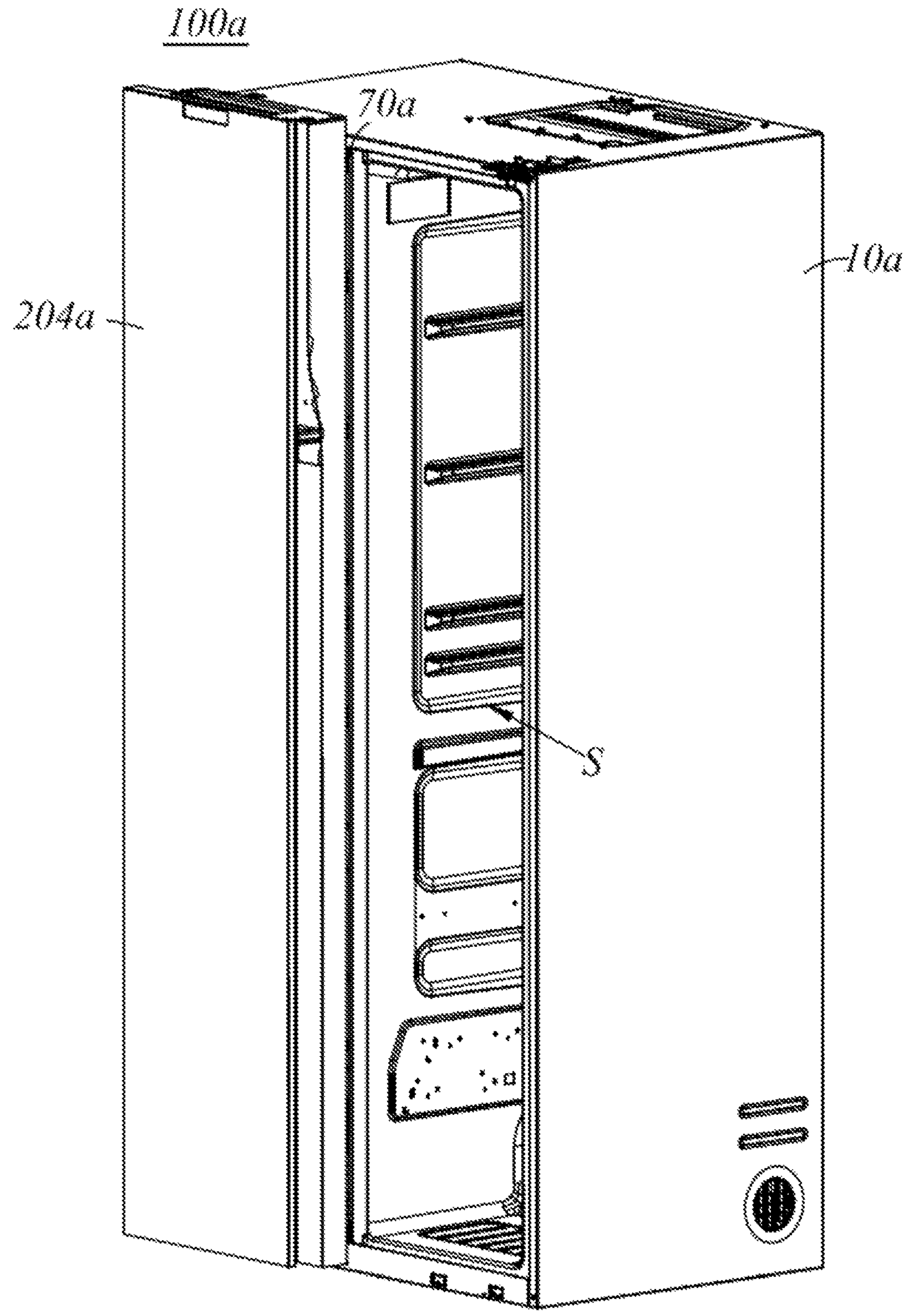
FIG. 38 is a schematic diagram of the side-by-side refrigerator according to the second embodiment of the present invention with a second door omitted.
Figure 39:
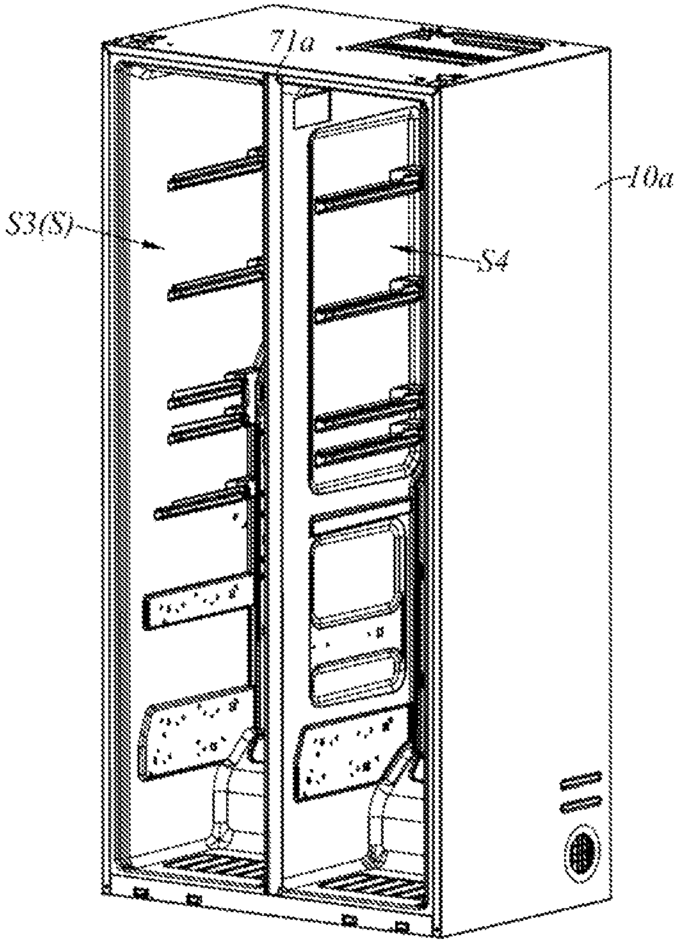
FIG. 39 is a schematic diagram of the side-by-side refrigerator according to the second embodiment of the present invention with a door omitted.
Figure 40:
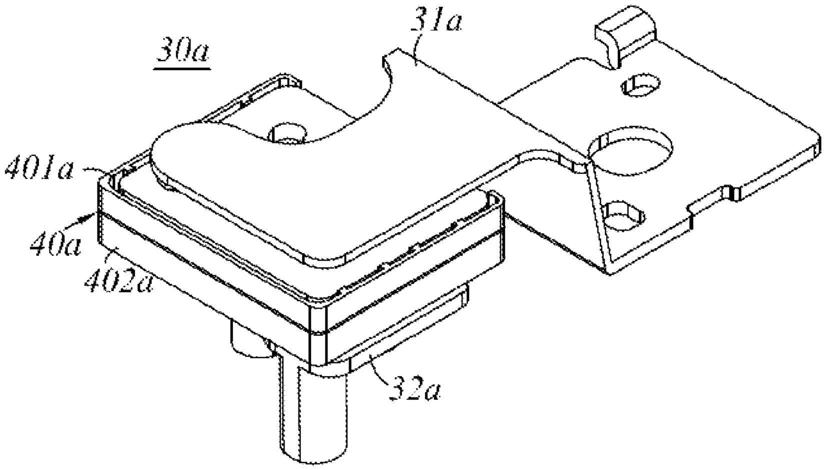
FIG. 40 is a perspective view of hinge assembly according to the second embodiment of the present invention in the closed state.
Figure 41:
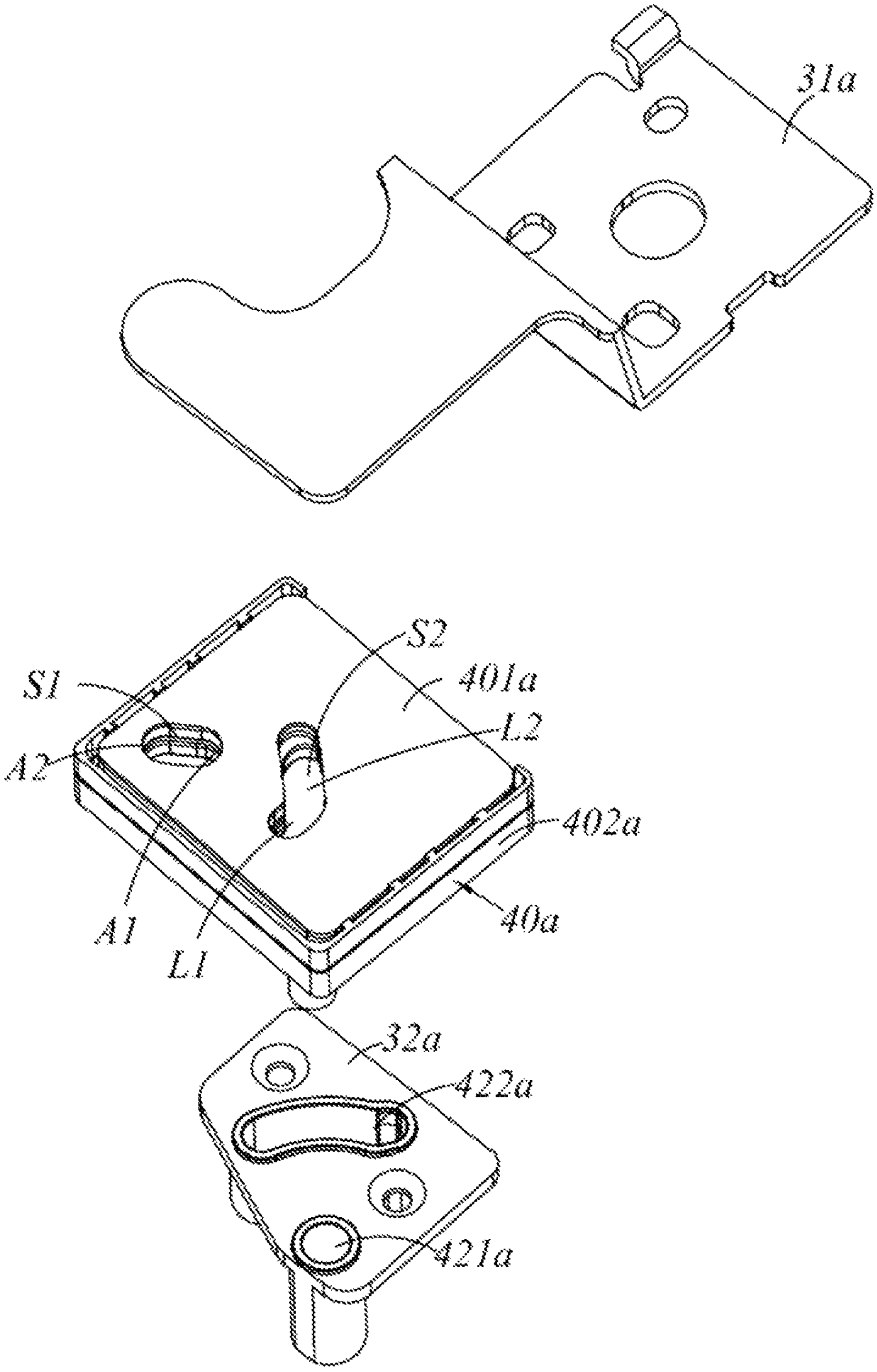
FIGS. 41 to 43 are exploded views of the hinge assembly according to the second embodiment of the present invention in different states.
Figure 42:
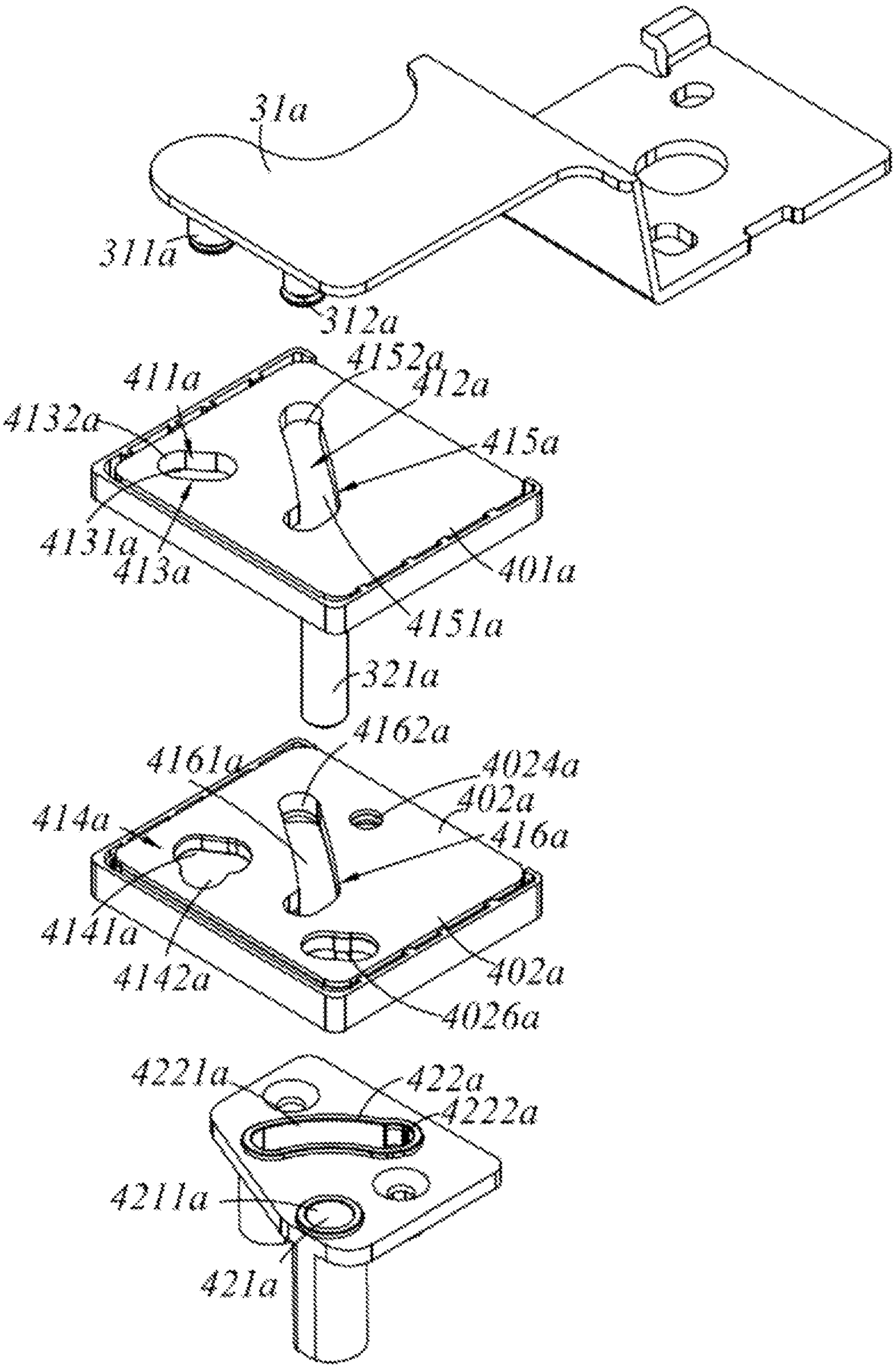
Figure 43:
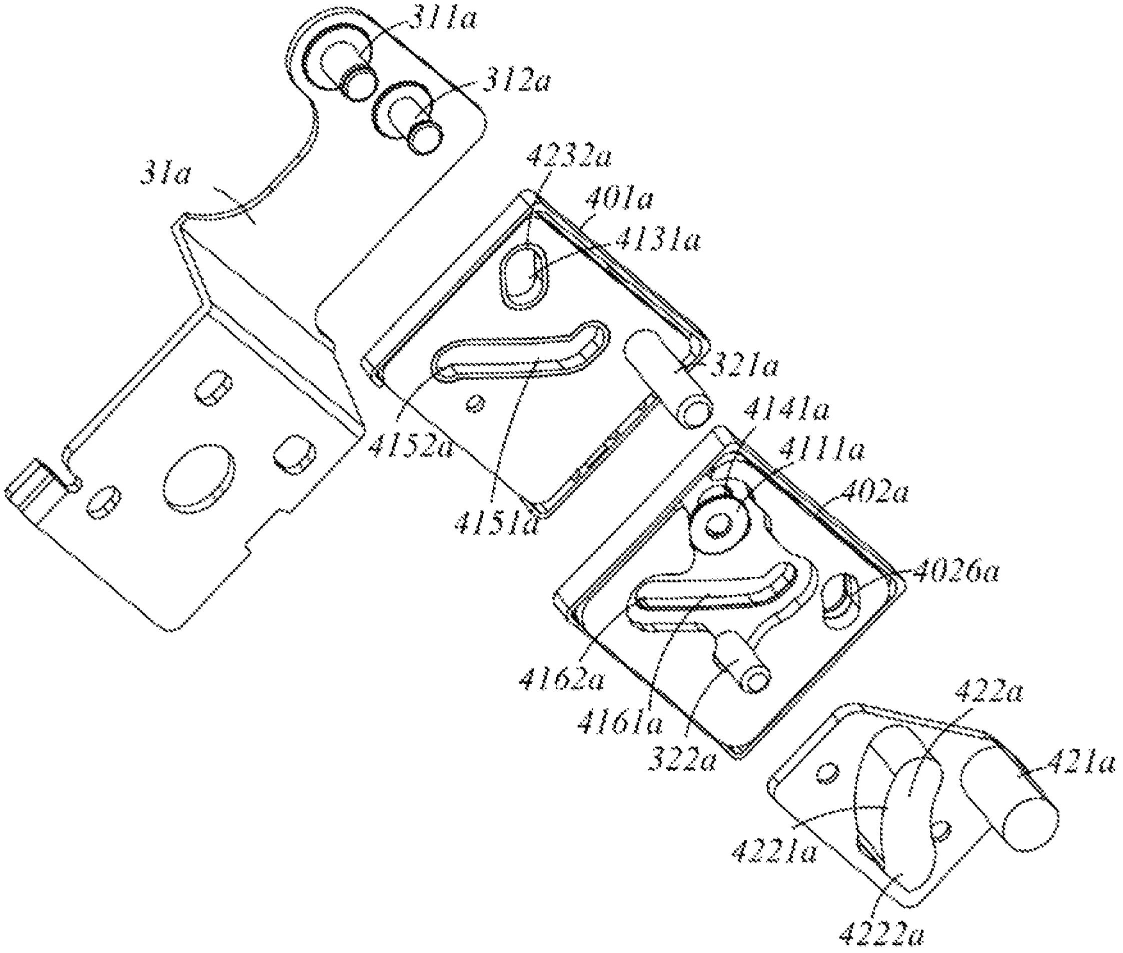
Figure 44:
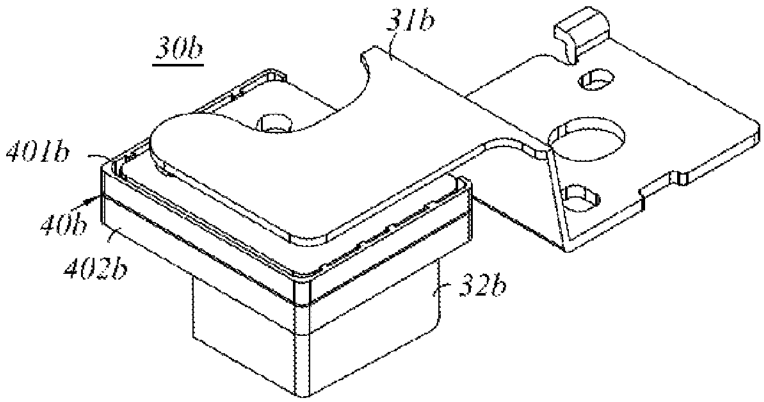
FIG. 44 is a perspective view of hinge assembly according to the third embodiment of the present invention in the closed state.
Figure 45:
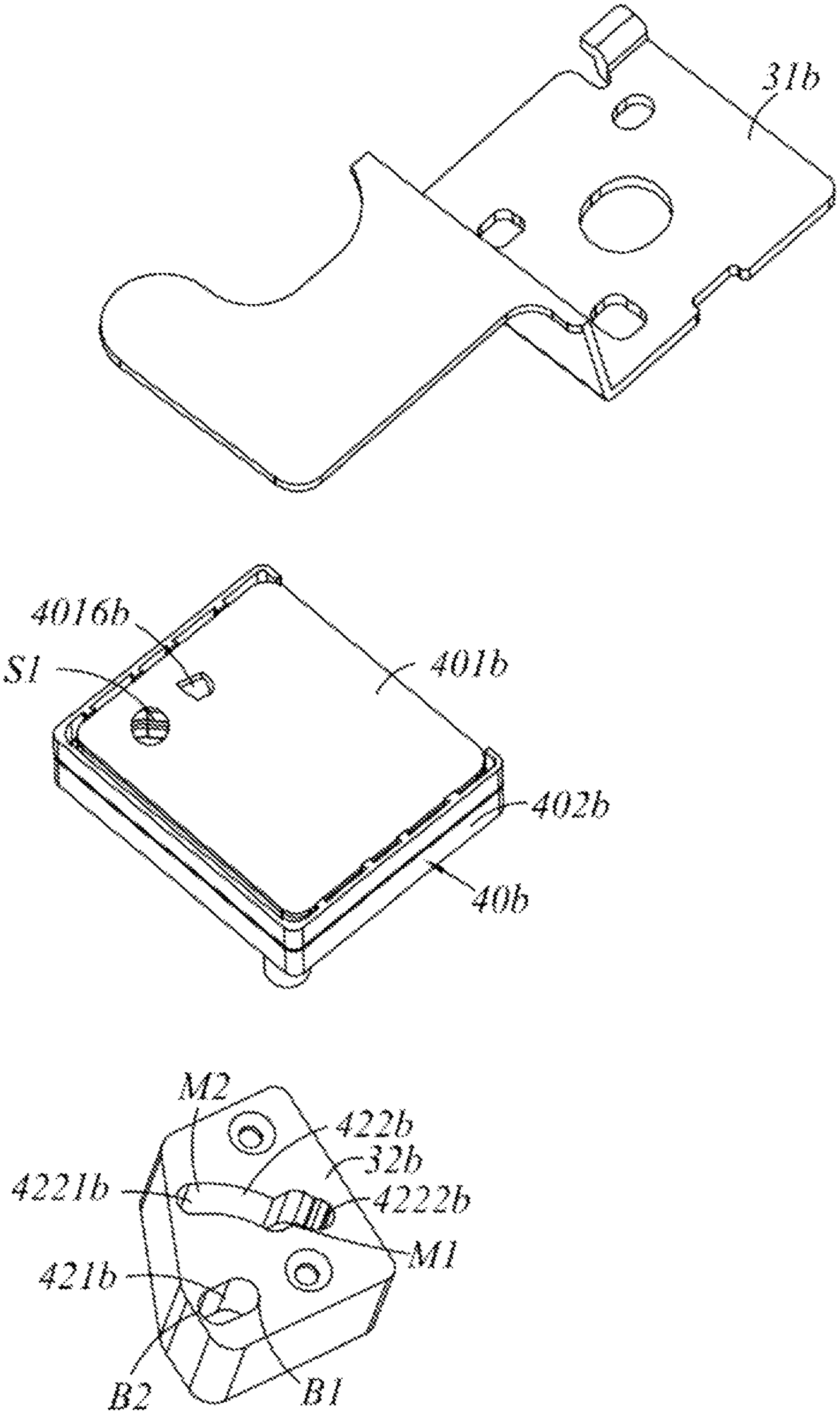
FIGS. 45 to 48 are exploded views of the hinge assembly according to the third embodiment of the present invention in different states.
Figure 46:
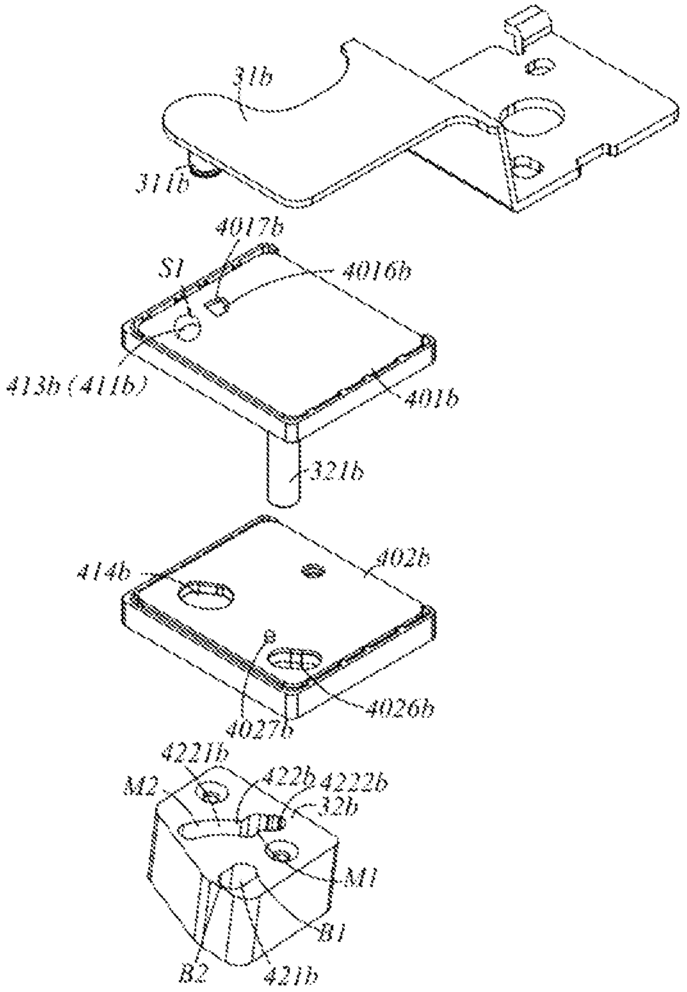

In the present embodiment, the hinge assembly 30 is structurally different in different regions of the door 20, the above-mentioned hinge assembly 30 is located between an upper portion of the door 20 and the cabinet 10, and hereinafter, the hinge assembly 30' located between a lower portion of the door 20 and the cabinet 10 will be briefly described with reference to FIGS. 35 and 36.

The lower hinge assembly 30' is different from the upper hinge assembly 30 in that: the first hinge part 31' of the lower hinge assembly 30' has a projection 313', the second hinge part 32' has a corresponding hook 323', and the hook 323' is configured as an elastic part; when the door 20 is in the closed state, the projection 313' acts on the hook 323' to deform, such that the door 20 is in close fit with the cabinet 10, and when the door 20 is in the opening process, the door 20 drives the hook 323' to move, and the hook 323' deforms to be separated from the projection 313'.

That is, when the door 20 is in the closed state, the projection 313' is in interference fit with the hook 323', thus enhancing a closing effect of the door 20.

It should be noted that, since the switching assembly 40' is connected between the first hinge part 31' and the second hinge part 32', the second hinge part 32' further includes an extension section 324' passing through the switching assembly 40' in a thickness direction, and the extension section 324' is connected to the hook 323', such that the hook 323' may be provided horizontally and fitted with the projection 313'.

Referring to FIGS. 37 to 43, schematic diagrams of a refrigerator of a second embodiment of the present invention are shown, and for convenience of description, same or similar components of the present embodiment and the first embodiment have same or similar reference numbers, which is applicable to the following description.

In the present embodiment, the refrigerator 100*a* is a side-by-side refrigerator 100*a*.

A cabinet 10*a* includes a pivoting side P connected with a hinge assembly 30*a*, an accommodating chamber S, and a fixed beam 70*a* dividing the accommodating chamber S into a first compartment S3 and a second compartment S4.

A door 20*a* includes a first door 204*a* provided corresponding to the first compartment S3 and a second door 205*a* provided corresponding to the second compartment S4.

Here, the "pivoting side P" is defined as a region where the door 20*a* is rotated relative to the cabinet 10*a*, i.e., a region where the hinge assembly 30*a* is provided, a direction from the pivoting side P to the accommodating chamber S is defined as a first direction X, and a direction from the accommodating chamber S to the pivoting side P is defined as a second direction Y.

Specifically, when the hinge assemblies 30*a* are provided on both left and right sides of the refrigerator 100*a*, the cabinet 10*a* includes a left pivoting side P1 and a right pivoting side P2; when the left pivoting side P1 serves as the pivoting side P (i.e., the pivoting side P corresponds to the first door 204*a*), the first direction X is from left to right, and the second direction Y is from right to left, and when the right pivoting side P2 serves as the pivoting side P (i.e., the pivoting side P corresponds to the second door 205*a*), the first direction X is from right to left, and the second direction Y is from left to right; that is, actual directions of the first direction X and the second direction Y are different corresponding to different pivoting sides P, and for example, the left pivoting side P1 serves as the pivoting side P in the following description.

In addition, the fixed beam 70*a* extends to an opening of the cabinet 10*a*, and a contact surface 71*a* having a certain width is formed by a side of the fixed beam 70*a* adjacent to the door 20*a*.

The hinge assembly 30*a* includes a first hinge part 31*a* fixed to the cabinet 10*a*, a second hinge part 32 fixed to the door 20*a* and a switching assembly 40*a* connected with the first hinge part 31*a* and the second hinge part 32*a*.

The hinge assembly 30*a* of the present embodiment has a same structure as the hinge assembly 30 in the first embodiment, and therefore, reference may be made to the description of the hinge assembly 30 in the first embodiment.

In the present embodiment, the first hinge part 31*a* and the switching assembly 40*a* move relatively by a first shaft set 311*a*, 312*a* and a first groove set 421*a*, 412*a* which are fitted with each other; the first shaft set 311*a*, 312*a* includes a first shaft 311*a* and a second shaft 312*a*, and the first groove set 421*a*, 412*a* includes a first free section S1, a second free section S2 and locking sections 4132*a*, 4142*a*, 4152*a*, 4162*a*, the first free section S1 includes an initial position A1 and a stop position A2 which are arranged oppositely, and the second free section S2 includes a first section L1 and a second section L2 which are connected.

The second hinge part 32*a* and the switching assembly 40*a* move relatively by a second shaft set 321*a*, 322*a* and a second groove set 421*a*, 422*a* which are fitted with each other; the second shaft set 321*a*, 322*a* includes a third shaft 321*a* and a fourth shaft 322*a*, and the second groove set 421*a*, 422*a* includes a third free section 421*a*, a fourth free section 4221*a* and a limiting section 4222*a*.

When the door 20*a* is in the closed state, the first shaft 311*a* is located at the initial position A1, the second shaft 312*a* is located at an end of the first section L1 apart from the second section L2, the fourth shaft 322*a* is located at the limiting section 4222*a*, such that the switching assembly 40*a* limits the second hinge part 32, and both the first door 204*a* and the second door 205*a* contact the fixed beam 70*a*.

Here, door gaskets may be provided on sides of the first door 204*a* and the second door 205*a* close to the cabinet 10*a*, and when the door 20*a* is in the closed state, the door gasket contacts a contact surface 71*a* of the fixed beam 70*a* to completely close the door 20*a*, so as to prevent cold air in the cabinet 10' from leaking.

When the door 20*a* is opened from the closed state to the first opening angle α1, the first shaft 311*a* rotates in situ at the initial position A1, the second shaft 312*a* moves in the first section L1 around the first shaft 311*a*, the door 20*a* rotates in situ relative to the cabinet 10*a*, the second shaft 312*a* then moves in the second section L2 to drive the first shaft 311*a* to move from the initial position A1 to the stop position A2, the door 20*a* moves from the pivoting side P to the accommodating chamber S.

Specifically, when the door 20*a* is opened from the closed state to a first intermediate opening angle α11, the first shaft 311*a* rotates in situ at the initial position A1, the second shaft 312*a* moves in the first section L1 around the first shaft 311*a*, the door 20*a* rotates in situ relative to the cabinet 10*a*, and the door 20*a* is apart from the fixed beam 70*a*.

Here, when opened to the first intermediate opening angle α11 from the closed state, the door 20*a* rotates in situ relative to the cabinet 10*a*; that is, the door 20*a* only rotates without generating displacement in other directions, thus effectively avoiding that the door 20*a* is unable to be normally opened due to displacement in a certain direction of the door 20*a*.

At this point, when the first door 204*a* is displaced horizontally when opened, the first door 204*a* and the second door 205*a* are unable to be opened normally due to interference therebetween, but the first door 204*a* and the second door 205*a* rotate in situ when the refrigerator 100*a* according to the present embodiment is opened, thus effectively avoiding the interference between the adjacent first and second doors 204*a*, 205*a*.

When the door 20*a* is opened from the first intermediate opening angle α11 to the first opening angle α1, the second shaft 312*a* moves in the second section L2 to drive the first shaft 311*a* to move from the initial position A1 to the stop position A2, and the door 20*a* moves from the pivoting side P towards the accommodating chamber S.

Here, when the door 20*a* is continuously opened to the first opening angle α1 from the first intermediate opening angle α11, the door 20*a* moves towards a side of the accommodating chamber S; that is, at this point, the door 20*a* rotates relative to the cabinet 10*a* and is displaced relative to the cabinet 10*a* in the first direction X, thus greatly reducing a distance by which the door 20*a* protrudes out of the cabinet 10*a* towards a side apart from the accommodating chamber S in the rotation process; that is, the displacement of the door 20*a* in the first direction X counteracts a part of the door 20*a* protruding out of the cabinet 10*a* in the second direction Y in the rotation process, thereby preventing the door 20*a* from interfering with the peripheral cupboard or wall, or the like, in the opening process; the refrigerator is suitable for the embedded cupboard or the scenario with a small space for accommodating the refrigerator 100*a*.

When the door 20*a* is continuously opened from the first opening angle α1 to the second opening angle α2 (referring to the first embodiment), the fourth shaft 322*a* is separated from the limiting section 4222*a*, and the first shaft 311*a* and/or the second shaft 312*a* are/is limited at the locking sections 4132*a*, 4142*a*, 4152*a*, 4162*a*, such that the switching assembly 40*a* limits the first hinge part 31*a*.

When the door 20*a* is continuously opened from the second opening angle α2 to a maximum opening angle α3 (referring to the first embodiment), the third shaft 321*a* rotates in situ in the third free section 421*a*, the fourth shaft 322*a* moves in the fourth free section 4221*a* around the third shaft 321*a*, and the door 20*a* continuously rotates in situ relative to the cabinet 10*a*.

It should be noted that for other descriptions of the hinge assembly 30*a* in the present embodiment and the working principle, reference may be made to the first embodiment, which are not repeated herein.

Referring to FIGS. 44 to 73, schematic diagrams of a refrigerator of a third embodiment of the present invention are shown.

In the third embodiment, the hinge assembly 30*b* includes a first hinge part 31*b* fixed to the cabinet 10*b*, a second hinge part 32*b* fixed to the door 20*b* and a switching assembly 40*b* connected with the first hinge part 31*b* and the second hinge part 32*b*.

It should be noted that the hinge assembly 30*b* in the present embodiment may be applied to the multi-door refrigerator in the first embodiment and the side-by-side refrigerator according in the second embodiments, and certainly, may be applied to other refrigerators.

Referring to FIGS. 44 to 48, the first hinge part 31*b* and the switching assembly 40*b* move relatively by a first shaft 311*b* and a first groove 411*b* which are fitted with each other, and the first groove 411*b* includes a first free section S1*b*.

The second hinge part 32*b* and the switching assembly 40*b* move relatively by a second shaft set 321*b*, 322*b* and a second groove set 421*b*, 422*b* which are fitted with each other; the second shaft set 321*b*, 322*b* includes a third shaft 321*b* and a fourth shaft 322*b*, and the second groove set 421*b*, 422*b* includes a third free section 421*b*, a fourth free section 4221*b* and a limiting section 4222*b*, the third free section 421*b* includes a start position B1 and a pivoting position B2 which are arranged oppositely, and the fourth free section 4221*b* includes a moving section M1 and a rotating section M2 which are connected in sequence.

When the door 20*b* is in the closed state (referring to FIGS. 49 to 52), the first shaft 311*b* is located at the first free section S1*b*, and the fourth shaft 322*b* is located at the limiting section 4222*b*, such that the switching assembly 40*b* limits the second hinge part 32, and the third shaft 321*b* is located at the start position B1.

When the door 20*b* is opened to a first opening angle α1 from the closed state (referring to FIGS. 53 to 56), the first shaft 311*b* rotates in situ in the first free section S1 to drive the door 20*b* to rotate in situ relative to the cabinet 10*b*.

When the door 20*b* is continuously opened from the first opening angle α1 to the second opening angle α2 (referring to FIGS. 57 to 60), the fourth shaft 322*b* is separated from the limiting section 4222*b*, the third shaft 321*b* is kept at the start position B1, and the switching assembly 40*b* limits the first hinge part 31*b*.

When the door 20*b* is continuously opened from the second opening angle α2 to the maximum opening angle α3 (referring to FIGS. 61 to 68), the fourth shaft 322*b* moves in the moving section M1 to drive the third shaft 321*b* to move from the start position B1 to the pivoting position B2, the door moves from the pivoting side P towards the accommodating chamber S, the third shaft 321*a* then rotates in situ at the pivoting position B2, the fourth shaft 322*b* moves in the rotating section M2 around the third shaft 321*b*, and the door 20*b* continuously rotates in situ relative to the cabinet 10*b*.

Specifically, when the door 20*b* is continuously opened from the second opening angle α2 to the first intermediate opening angle α21 (referring to FIGS. 61 to 64), the fourth shaft 322*b* moves in the moving section M1 to drive the third shaft 321*b* to move from the start position B1 to the pivoting position B2, and the door moves from the pivoting side P towards the accommodating chamber S.

Here, when the door 20*b* is continuously opened to the first intermediate opening angle α21 from the second opening angle α2, the door 20*b* moves towards a side of the accommodating chamber S; that is, at this point, the door 20 is displaced relative to the cabinet 10*b* in the first direction X, thus greatly reducing a distance by which the door 20*b* protrudes out of the cabinet 10*b* towards a side apart from the accommodating chamber S in the rotation process; that is, the displacement of the door 20*b* in the first direction X counteracts a part of the door 20*b* protruding out of the cabinet 10*b* in the second direction Y in the rotation process, thereby preventing the door 20*b* from interfering with the peripheral cupboard or wall, or the like, in the opening process; the refrigerator is suitable for the embedded cupboard or the scenario with a small space for accommodating the refrigerator 100*b*.

When the door 20*b* is continuously opened from the first intermediate opening angle α21 to a maximum opening angle α3 (referring to FIGS. 65 to 68), the third shaft 321*b* is kept at the pivoting position B2, the fourth shaft 322*b* moves in the rotating section M2 around the third shaft 321*b*, and the door 20*b* continuously rotates in situ relative to the cabinet 10*b*.

With continued reference to FIGS. 44 to 48, the first hinge part 31*b* includes the first shaft 311*b*, the switching assembly 40*b* includes the first groove 411*b*, the third shaft 321*b* and the fourth shaft 322*b*, the second hinge part 32*b* includes a third groove 421*b* having the third free section 421*b* and a fourth groove 422*b* having the fourth free section 4221*b* and the limiting section 4222*b*, the third groove 421*b* includes the start position B1 and the pivoting position B2 which are arranged oppositely, and the fourth groove 422*b* includes the limiting section 4222*b*, the moving section M1 and the rotating section M2 which are connected sequentially.

Here, "connected sequentially" means that the fourth shaft 322*b* sequentially passes through the limiting section 4222*b*, the moving section M1 and the rotating section M2, and the sections may be overlapped, reciprocate or form a folding line.

In the present embodiment, the third groove 421*b* has an oval shape, the start position B1 and the pivoting position B2 are the two ends in the direction of the long axis of the oval shape; the limiting section 4222*b*, the moving section M1 and the rotating section M2 in the fourth groove 422*b* are not overlapped with one another.

The switching assembly 40*b* includes a first switching part 401*b* and a second switching part 402*b* which are fitted with each other.

The first hinge part 31*b* includes a first limiting portion 314*b*, the first switching part 401*b* includes a second limiting portion 4016*b*, one of the first limiting portion 314*b* and the second limiting portion 4016*b* is configured as a bump 314*b*, the other is configured as a recess 4016*b*, the bump 314*b* includes a first limiting surface 3141*b*, and the recess 4016*b* includes a second limiting surface 4017*b*.

In the present embodiment, the recess 4016*b* is located on the first switching part 401*b*, and the bump 314*b* is located on the first hinge part 314*b*.

In other embodiments, positions of the bump 314*b* and the recess 4016*b* may be interchanged, and other limiting structures may be adopted.

The first groove 411*b* includes a first upper groove 413*b* located at the first switching part 401*b* and a first lower groove 414*b* located at the second switching part 402*b*, and the first free section S1*b* includes the first upper groove 413*b* and the first lower groove 414*b*.

An opening size of the first upper groove 413*b* is matched with a size of the first shaft 311*b*, and an opening size of the first lower groove 414*b* is greater than the opening size of the first upper groove 413*b*.

Here, the first upper groove 413*b* is circular, and the first lower groove 414*b* is oval, but the present invention is not limited thereto.

In the present embodiment, the first switching part 401*b* is closer to the first hinge part 31*b* than the second switching part 402*b*; that is, the first hinge part 31*b*, the first switching part 401*b*, the second switching part 402*b* and the second hinge part 32*b* are stacked in sequence.

Figure 47:
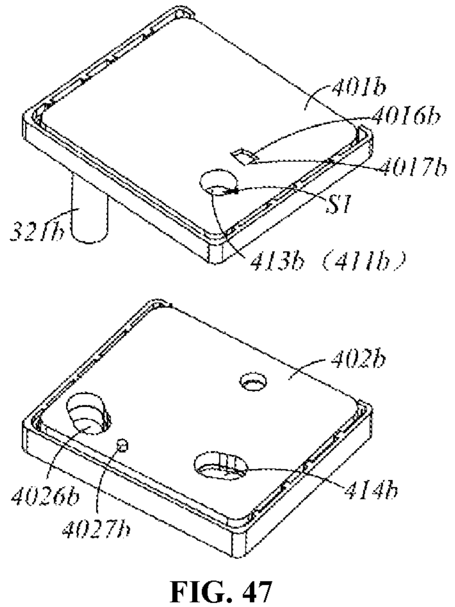
Figure 48:
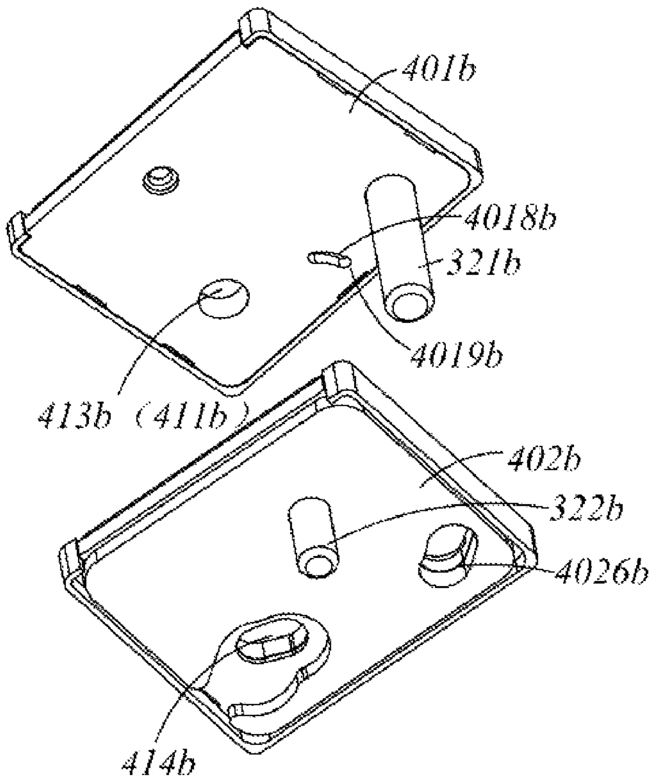
Figure 49:
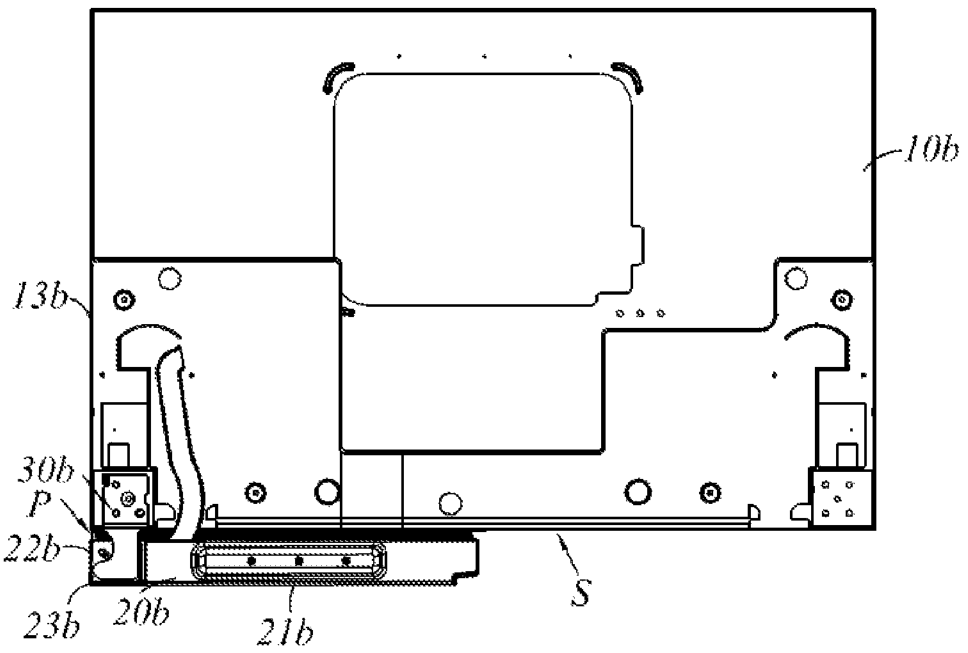
FIG. 49 is a top view of a refrigerator according to a third embodiment of the present invention in a closed state.
Figure 50:
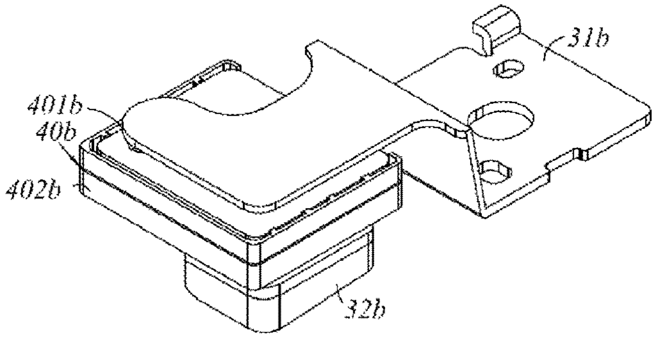
FIG. 50 is a perspective view of the hinge assembly in the third embodiment of the present invention in the closed state.
Figure 51:
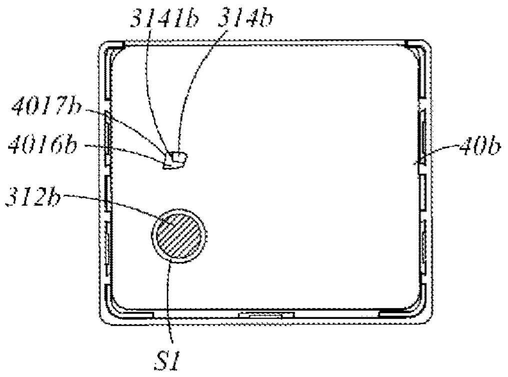
FIG. 51 is a top sectional view of the hinge assembly in the third embodiment of the present invention in the closed state.
Figure 52:
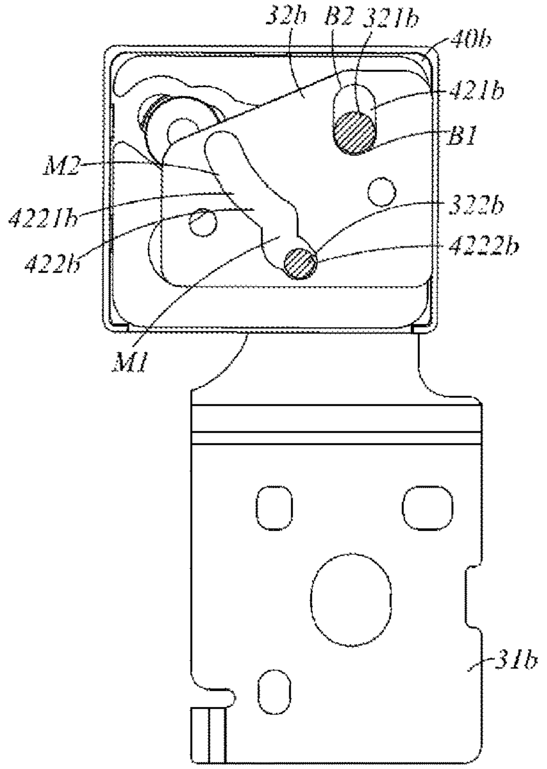
FIG. 52 is a bottom sectional view of the hinge assembly in the third embodiment of the present invention in the closed state.
Figure 53:
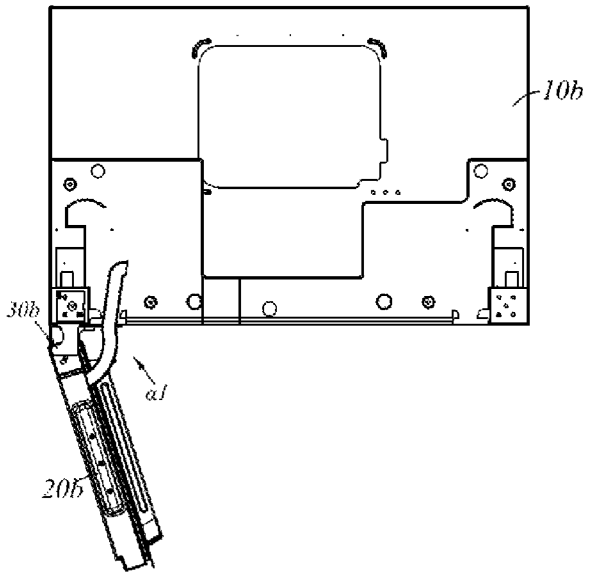
FIG. 53 is a top view of the refrigerator according to the third embodiment of the present invention at a first opening angle.
Figure 54:
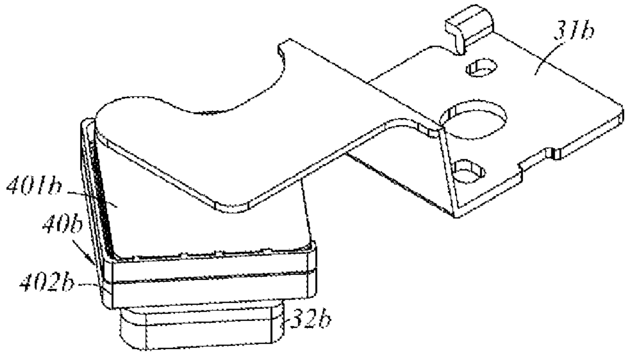
FIG. 54 is a perspective view of the hinge assembly in the third embodiment of the present invention at the first opening angle.
Figure 55:
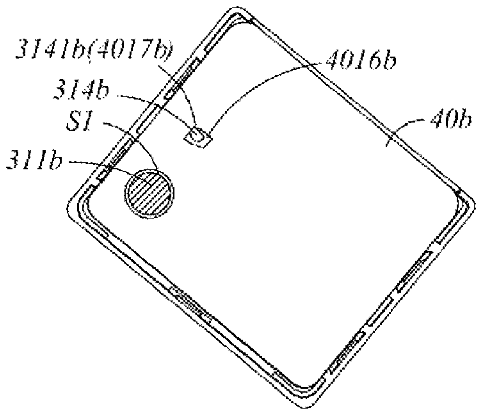
FIG. 55 is a top sectional view of the hinge assembly in the third embodiment of the present invention at the first opening angle.
Figure 56:
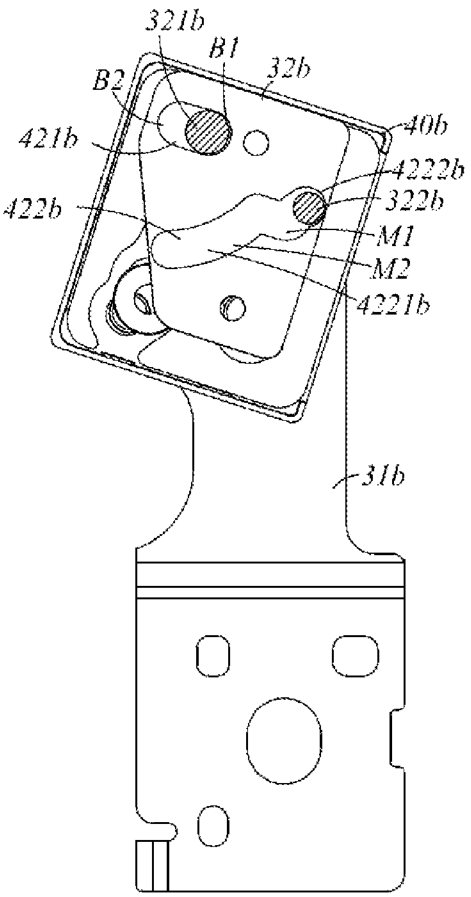
FIG. 56 is a bottom sectional view of the hinge assembly in the third embodiment of the present invention at the first opening angle.
Figure 57:
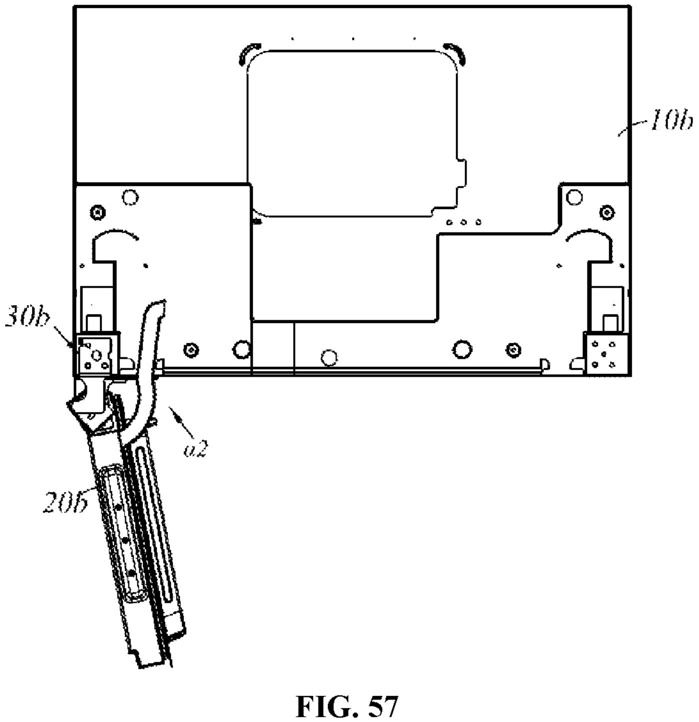
FIG. 57 is a top view of the refrigerator according to the third embodiment of the present invention at a second opening angle.
Figure 58:
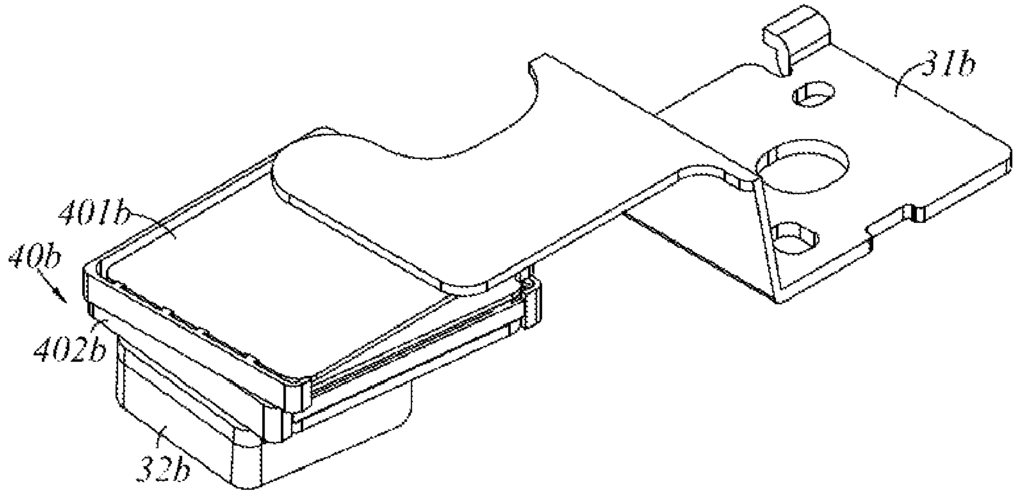
FIG. 58 is a perspective view of the hinge assembly in the third embodiment of the present invention at the second opening angle.
Figure 59:
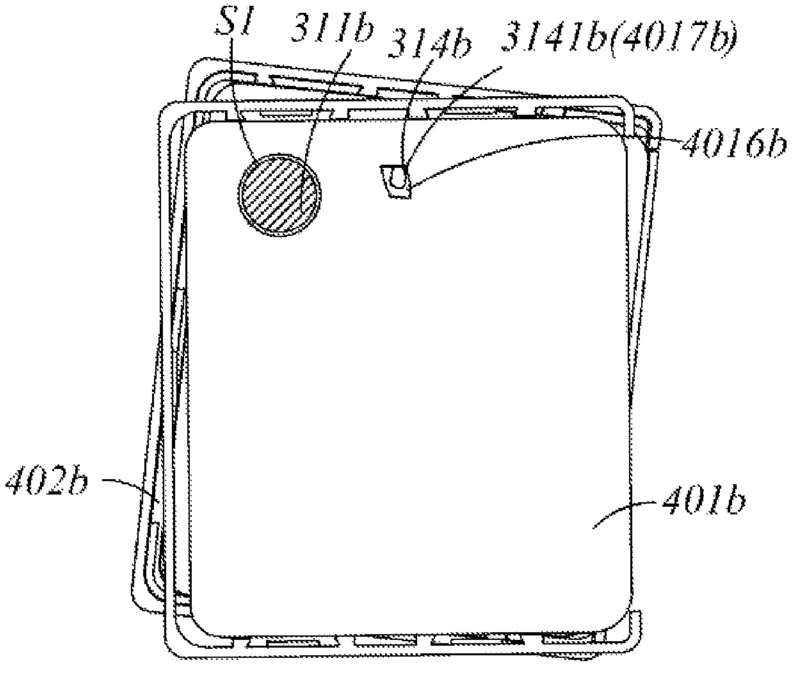
FIG. 59 is a top sectional view of the hinge assembly in the third embodiment of the present invention at the second opening angle.
Figure 60:
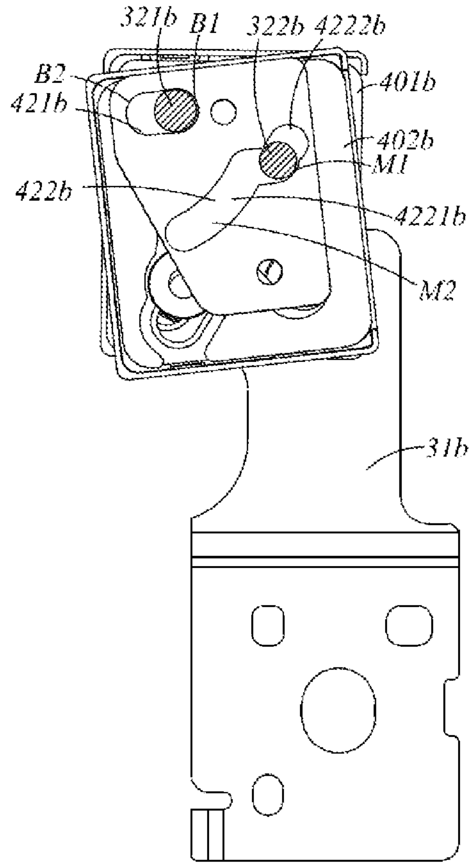
FIG. 60 is a bottom sectional view of the hinge assembly in the third embodiment of the present invention at the second opening angle.
Figure 61:
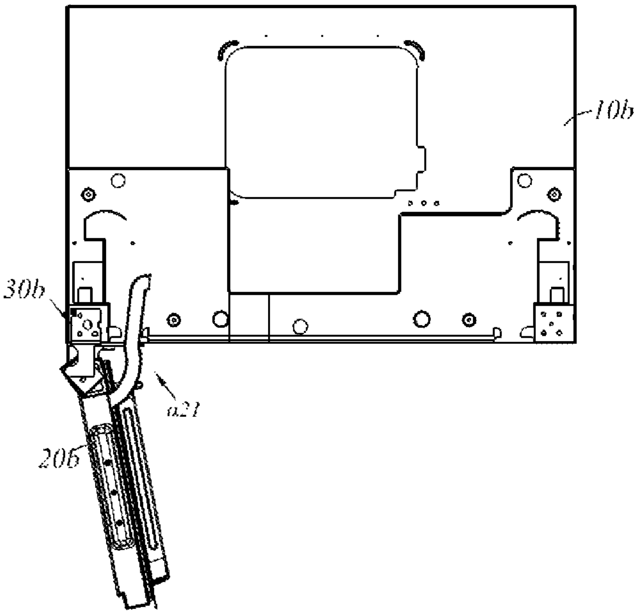
FIG. 61 is a top view of the refrigerator according to the third embodiment of the present invention at a first intermediate opening angle.
Figure 62:
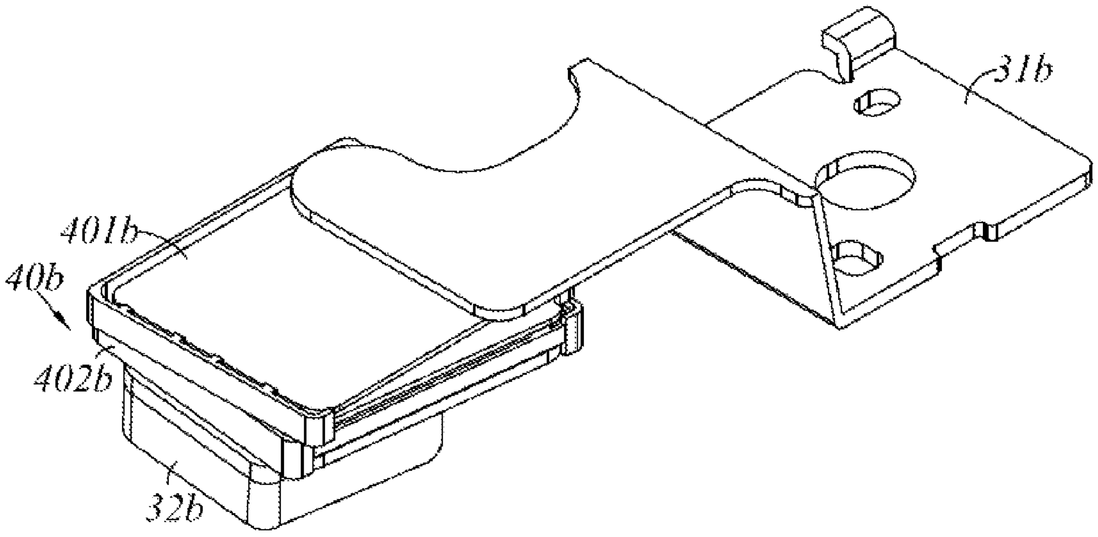
FIG. 62 is a perspective view of the hinge assembly in the third embodiment of the present invention at the first intermediate opening angle.
Figure 63:
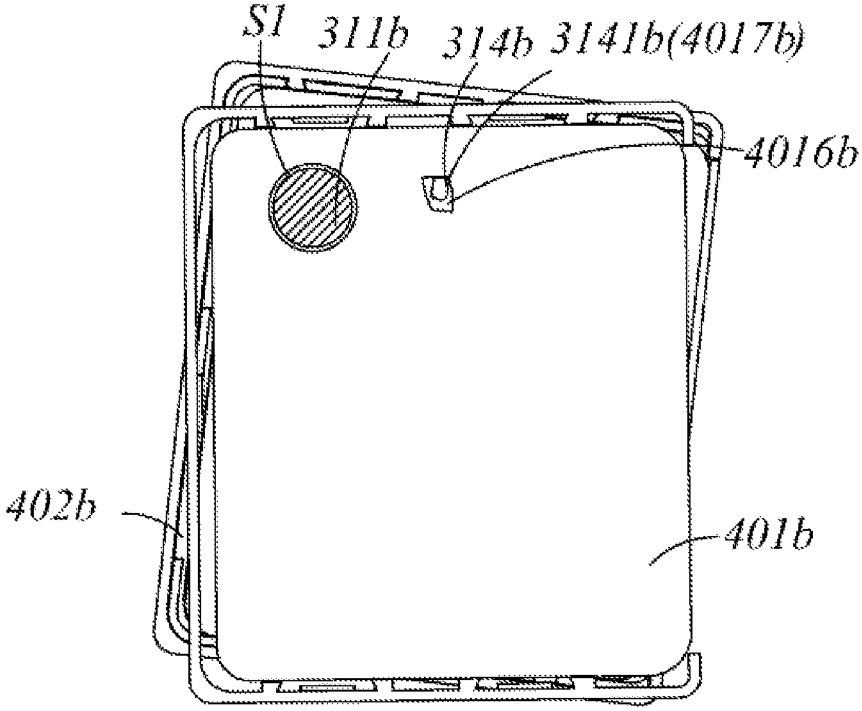
FIG. 63 is a top sectional view of the hinge assembly in the third embodiment of the present invention at the first intermediate opening angle.
Figure 64:
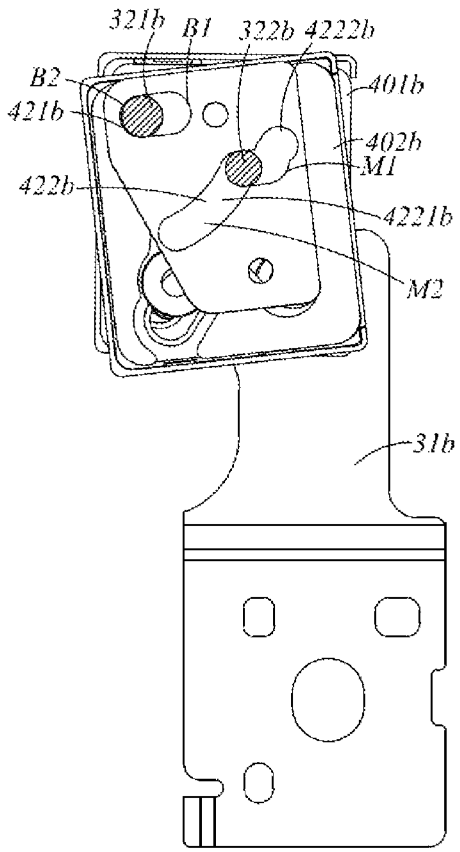
FIG. 64 is a bottom sectional view of the hinge assembly in the third embodiment of the present invention at the first intermediate opening angle.
Figure 65:
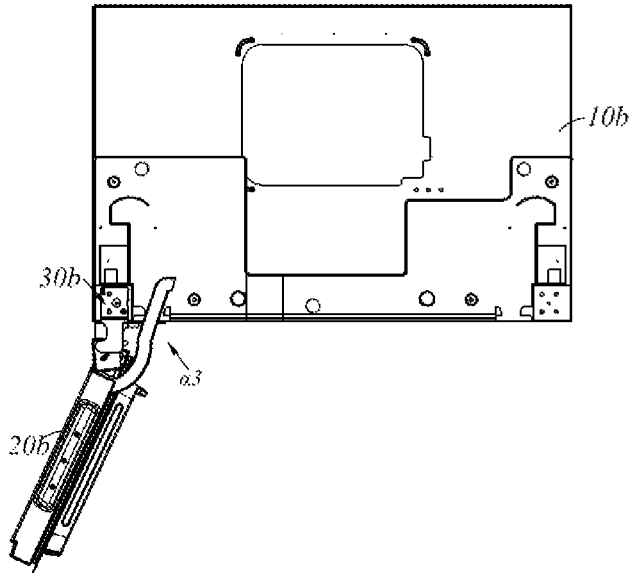
FIG. 65 is a top view of the refrigerator according to the third embodiment of the present invention at a maximum opening angle.
Figure 66:
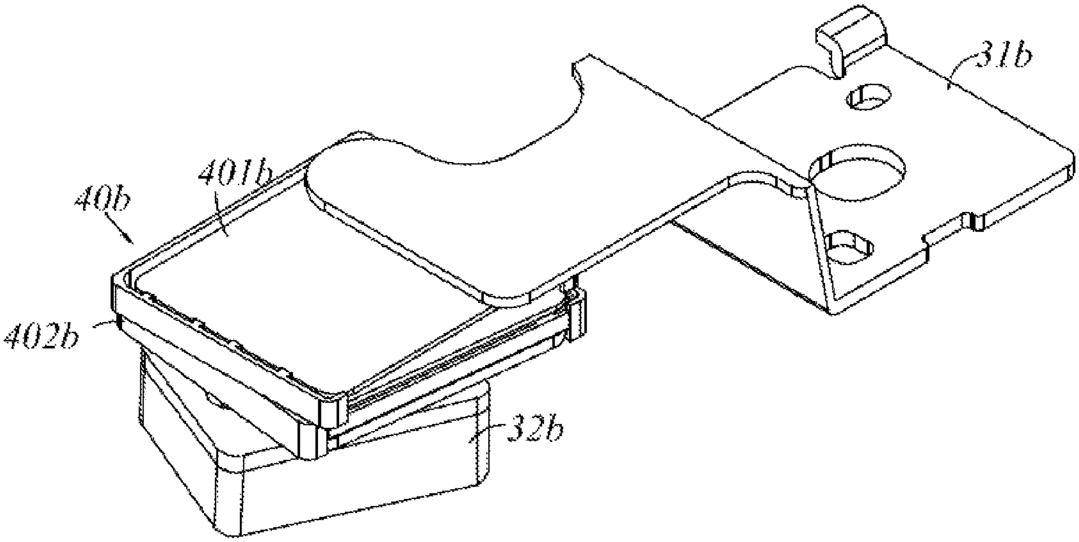
FIG. 66 is a perspective view of the hinge assembly in the third embodiment of the present invention at the maximum opening angle.
Figure 67:
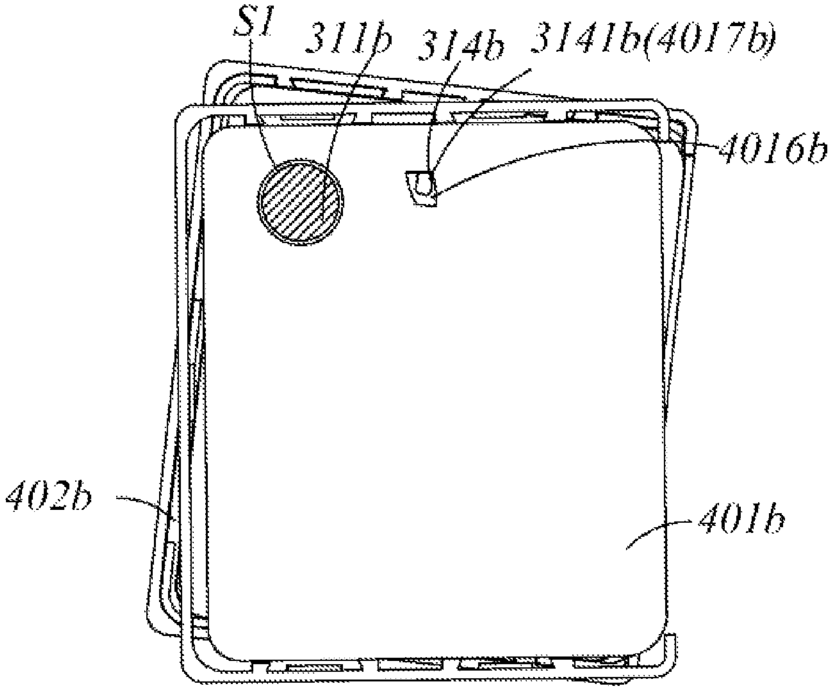
FIG. 67 is a top sectional view of the hinge assembly in the third embodiment of the present invention at the maximum opening angle.
Figure 68:
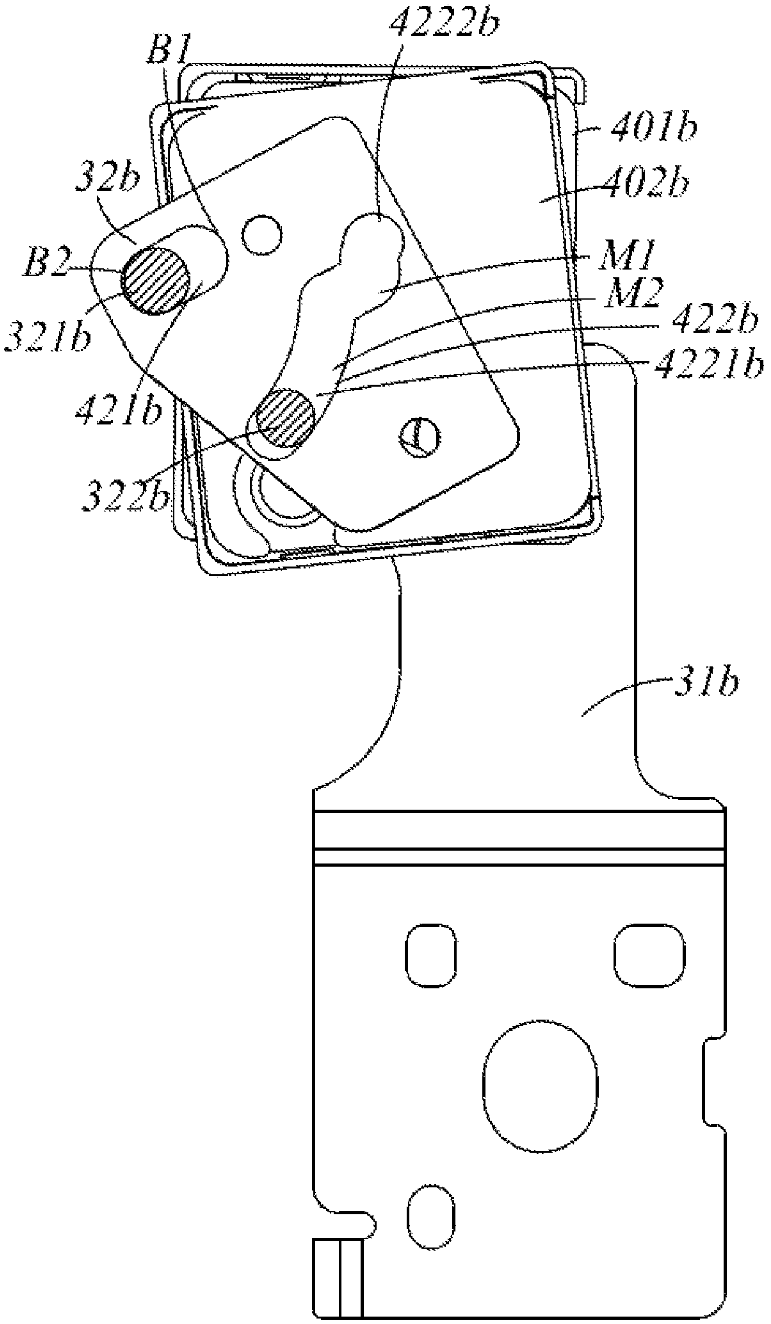
FIG. 68 is a bottom sectional view of the hinge assembly in the third embodiment of the present invention at the maximum opening angle.
Figure 69:
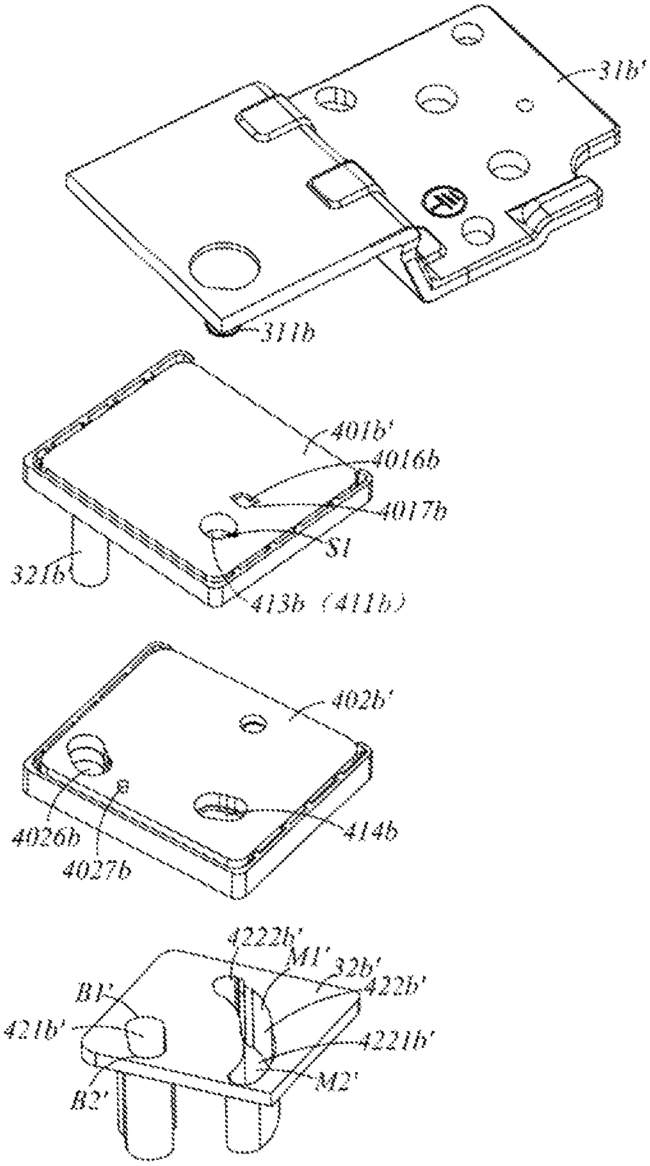
FIG. 69 is an exploded view of a hinge assembly in another embodiment of the present invention.

In the present embodiment, referring to FIGS. 47 and 48, the first switching part 401*b* includes a first stopper 4018*b*, the second switching part 402*b* includes a second stopper 4027*b* fitted with the first stopper 4018*b*, and when the door 20*b* is closed from the second opening angle α2 to the first opening angle α1, the second switching part 402*b* limits movement of the first switching part 401*b* by fitting the second stopper 4027*b* with the first stopper 4018*b*.

Specifically, the first stopper 4018*b* is configured as a groove portion 4018*b* located on the first switching part 401*b*, the second stopper 4027*b* is configured as a protruding portion 4027*b* located on the second switching part 402*b*, and one end of the groove portion 4018*b* is configured as a stopping end 4019*b*; when the door 20*b* is opened from the closed state to the first opening angle α1, the first switching part 401*b* and the second switching part 402*b* are relatively stationary, the protruding portion 4027*b* is retained on a side of the groove portion 4018*b* apart from the stopping end 4019*b*; when the door 20*b* is opened from the first opening angle α1 to the second opening angle α2, the first switching part 401*b* and the second switching part 402*b* move relatively, the protruding portion 402*b* moves towards a side close to the stopping end 4019*b* in the groove portion 4018*b* until the protruding portion 402*b* abuts against the stopping end 4019*b*, and the first switching part 401*b* and the second switching part 402*b* are relatively stationary.

It may be understood that, in the opening process of the door 20*b*, the relative movement between the first switching part 401*b* and the second switching part 402*b* may be controlled by other structures; for example, the first switching part 401*b* and the second switching part 402*b* stop the relative movement by abutting the grooves on the first switching part 401*b* and the second switching part 402*b* against the first shaft 311*b* and the third shaft 321*b*; at this point, the first switching part 401*b* and the second switching part 402*b* are kept relatively stationary and mutually staggered; preferably, when the first switching part 401*b* and the second switching part 402*b* stop the relative movement, the protruding portion 402*b* just abuts against the stopping end 4019*b*, but the present invention is not limited thereto.

An interaction between the protruding portion 402*b* and the groove portion 4018*b* mainly plays a role in the closing process of the door 20*b*; in an actual operation, when the door 20*b* is closed from the second opening angle α2 to the first opening angle α1, since the protruding portion 402*b* abuts against the stopping end 4019*b*, the first switching part 401*b* is unable to rotate without rotating the second switching part 402*b*; that is, in this process, rotation of the first switching part 401*b* is certainly later than rotation of the second switching part 402*b*, and after overlapped, the first switching part 401*b* and the second switching part 402*b* are relatively stationary, and then, the first switching part 401*b* and the second switching part 402*b* move together relative to the first shaft 311*b* until the door 20*b* is closed.

It may be understood that the closing process of the door 20*b* and the opening process of the door 20*b* are processes in reverse orders, and the switching sequence of the first hinge part 31*b* and the second hinge part 32*b* in the opening and closing processes of the door 20*b* may be effectively controlled by the unlocking and locking effects of the switching assembly 40*b* on the first hinge part 31*b* and the second hinge part 32*b*.

Next, a specific operation flow of the hinge assembly 30*b* will be described.

In the present embodiment, the cabinet 10*b* includes an outer side surface 13*b* adjacent to the hinge assembly 30*b* and on an extension section of a rotation path of the door 20*b*, the door 20*b* includes a front wall 21*b* apart from the accommodating chamber S and a side wall 22*b* always clamped between the front wall 21*b* and the accommodating chamber S, and a side edge 23*b* is provided between the front wall 21*b* and the side wall 22*b*.

Referring to FIGS. 49 to 52, when the door 20*b* is in the closed state, the first switching part 401*b* and the second switching part 402*b* are relatively stationary, the first shaft 311*b* is located at the first free section S1*b*, and the fourth shaft 322*b* is located at the limiting section 4222*b*, such that the switching assembly 40*b* limits the second hinge part 32, and the third shaft 321*b* is located at the start position B1.

Specifically, the outer side surface 13*b* and the side wall 22*b* are located on a same plane, which may guarantee appearance smoothness, improve attractiveness, and facilitate a mounting process of the door 20*b*, but the present invention is not limited thereto.

Here, it should be noted that when the door 20*b* is in the closed state, the third shaft 321*b* is located at the start position B1, the fourth shaft 322*b* is limited in the limiting section 4222*b*, a distance between the third shaft 321*b* and the fourth shaft 322*b* remains unchanged, the third shaft 321*b* is located at the first switching part 401*b*, the fourth shaft 322*b* is located at the second switching part 402*b*, and the first switching part 401*b* and the second switching part 402*b* are relatively stationary under the common limit of the third shaft 321*b* and the fourth shaft 322*b*.

Referring to FIGS. 53 to 56, when the door 20*b* is opened from the closed state to the first opening angle α1, the first switching part 401*b* and the second switching part 402*b* are relatively stationary, the first free section S1 is formed by overlapped parts of the first upper groove 413*b* and the first lower groove 414*b*, the first shaft 311*b* moves in situ in the first free section S1, and the recess 4016*b* abuts against the bump 314*b*, such that the switching assembly 40*b* limits the first hinge part 31*b*, and the door 20*b* rotates in situ relative to the cabinet 10*b*.

Here, when the door 20*b* is in the closed state, the bump 314*b* is located in the recess 4016*b*, and the first limiting surface 3141*b* is apart from the second limiting surface 4017*b*; when the door 20*b* is opened from the closed state to the first opening angle α1, the first hinge part 31*b* is fixed to the cabinet 10*b*, the door 20*b* drives the switching assembly 40*b* to move together relative to the first hinge part 31*b*, the bump 314*b* moves in the recess 4016*b*, and the first limiting surface 3141*b* and the second limiting surface 4017*b* gradually approach until the first limiting surface 3141*b* abuts against the second limiting surface 4017*b*; at this point, the first switching part 401*b* is unable to rotate relative to the first hinge part 31*b*; that is, the switching assembly 40*b* locks the first hinge part 31*b*, and a rotation angle of the door 20*b* when the first limiting surface 3141*b* abuts against the second limiting surface 4017*b* may be controlled by controlling sizes, shapes, or the like, of the bump 314*b* and the recess 4016*b*.

In the present embodiment, the door 20*b* rotates in situ relative to the cabinet 10*b* when the door 20*b* is opened to the first opening angle α1, thus ensuring that the door 20*b* is not displaced in the first direction X or the second direction Y in this process.

It should be noted that when the door 20*b* is opened from the closed state to the first opening angle α1, the fourth shaft 322*b* is always limited at the limiting section 4222*b*, such that the switching assembly 40*b* limits the second hinge part 32*b*.

With reference to FIGS. 57 to 60, when the door 20*b* is continuously opened from the first opening angle α1 to the second opening angle α2, the first switching part 401*b* and the second switching part 402*b* move relatively, such that the fourth shaft 322*b* is separated from the limiting section 4222*b*, and the third shaft 321*b* is kept at the start position B1.

Specifically, when the first switching part 401*b* and the second switching part 402*b* move relatively, the distance between the third shaft 321*b* located at the first switching part 401*b* and the fourth shaft 322*b* located at the second switching part 402*b* changes, the third shaft 321*b* is always located at the start position B1, and the fourth shaft 322*b* moves from the limiting section 4222*b* to the fourth free section 4221*b*; that is, the fourth shaft 322*b* is separated from the limiting section 4222*b*.

It should be noted that a locking operation of the first hinge part 31*b* is not limited to the above-mentioned cooperation of the bump 314*b* and the recess 4016*b*, and in other embodiments, the first hinge part 31*b* may be locked by other structures, for example, by locking the first shaft 311*b*; specifically, a locking section may be provided at the first groove 411*b*, and the first shaft 311*b* may be locked when the first shaft 311*b* rotates to the locking section; or, the first switching part 401*b* and the second switching part 402*b* move relatively to form a locking section between the first upper groove 413*b* and the first lower groove 414*b*, and the locking section may be configured to lock the first shaft 311*b*.

Referring to FIGS. 61 to 64, when the door 20*b* is continuously opened from the second opening angle α2 to the first intermediate opening angle α21, the first switching part 401*b* and the second switching part 402*b* are relatively stationary, the fourth shaft 322*b* moves in the moving section M1 to drive the third shaft 321*b* to move from the start position B1 to the pivoting position B2, and the door moves from the pivoting side P towards the accommodating chamber S.

Here, the side edge 23*b* moves to a side of the outer side surface 13*b* close to the accommodating chamber S; that is, at this point, the hinge assembly 30*b* drives the side edge 23*b* to move towards the side close to the accommodating chamber S, such that interference between the side edge 23*b* and the peripheral cupboard or wall, or the like, due to the side edge 23*b* protruding out of the outer side surface 13*b* may be avoided in the opening process of the door 20*b*.

Here, in order to guarantee the opening degree of the cabinet 10*b* as much as possible and avoid the problem that the drawers, the racks, or the like, in the cabinet 10*b* are unable to be opened due to the interference of the door 20*b*, the side edge 23*b* moves towards the side close to the accommodating chamber S into the plane of the outer side surface 13*b*, and then, the hinge assembly 30*b* drives the side edge 23*b* to move in the plane and gradually approach the accommodating chamber S.

That is, at this point, on the basis of ensuring that the side edge 23*b* does not protrude out of the corresponding outer side surface 13*b*, the side edge 23*b* is made to be as close as possible to the outer side surface 13*b*, thus avoiding the interference between the door 20*b* and the peripheral cupboard or wall, or the like, in the opening process, and guaranteeing the opening degree of the cabinet 10*b* as much as possible.

In the present embodiment, a connection line between the start position B1 and the pivoting position B2 is parallel to the moving section M1; that is, the fourth shaft 322*b* translates in the moving section M1 and drives the third shaft 321*b* to translate from the starting position B1 to the pivoting position B2, such that the door 20*b* translates from the pivoting side P toward the accommodating chamber S.

Referring to FIGS. 65 to 68, when the door 20*b* is continuously opened from the first intermediate opening angle α21 to the maximum opening angle α3, the first switching part 401*b* and the second switching part 402*b* are relatively stationary, the third shaft 321*b* is kept at the pivoting position B2, the fourth shaft 322*b* moves in the rotating section M2 around the third shaft 321*b*, and the door 20*b* continuously rotates in situ relative to the cabinet 10*b*.

It may be seen that in the present embodiment, by the unlocking and locking effects of the switching assembly 40*b* on the first hinge part 31*b* and the second hinge part 32*b*, the first hinge part 31*b* and the second hinge part 32*b* may be effectively controlled to be switched sequentially, such that the door 20*b* may be opened stably.

In the present embodiment, a fourth pitch exists between a center of the third shaft 312*b* and the side edge 23*b*, a fifth pitch exists between the center of the third shaft 312*b* and the front wall 21*b*, and a sixth pitch exists between the center of the third shaft 312*b* and the side wall 22*b*; when the door 20*b* is continuously opened from the second opening angle α2 to the maximum opening angle α3, the fourth pitch, the fifth pitch and the sixth pitch are all decreased first, and then kept unchanged.

It should be noted that the variation of the pitch is not limited to the above description; for example, when the door 20*b* is continuously opened from the second opening angle α2 to the first intermediate opening angle α21, the fifth pitch is always kept unchanged, and the fourth pitch and the sixth pitch are both decreased first, and then kept unchanged.

The motion track in the present invention is not limited to the above description, and with reference to FIGS. 69 to 73 which are schematic diagrams of the hinge assembly in another example in the third embodiment, for convenience of description, same or similar structures have same or similar reference numbers, a difference between the present embodiment and the third embodiment mainly lies in the second hinge part 32*b*', and for the description of the first hinge part 31*b*', reference may be made to the third embodiment, which is not repeated herein.

The second hinge part 32*b*' includes a third groove 421*b*' and a fourth groove 422*b*', the third groove 421*b*' includes a start position B1' and a pivoting position B2', and the fourth groove 422*b*' includes a limiting section 4222*b*', a moving section M1' and a rotating section M2' which are connected sequentially.

Here, the third groove 421*b*' has an oval shape, the moving section M1' has an arc shape, and the limiting section 4222*b*', the moving section M1' and the rotating section M2' are not overlapped with each other.

It should be noted that "the third groove 421*b*' has an oval shape" means the third shaft 321*b*' is moving along a straight line in the third groove 421*b*', "the moving section M1' has an arc shape" means that the fourth shaft 322*b*' moves along an arc in the moving section M1'; that is, the fourth shaft 322*b*' rotates in the moving section M1' to drive the third shaft 321*b*' to translate from the start position B1' to the pivoting position B2'.

Figure 70:
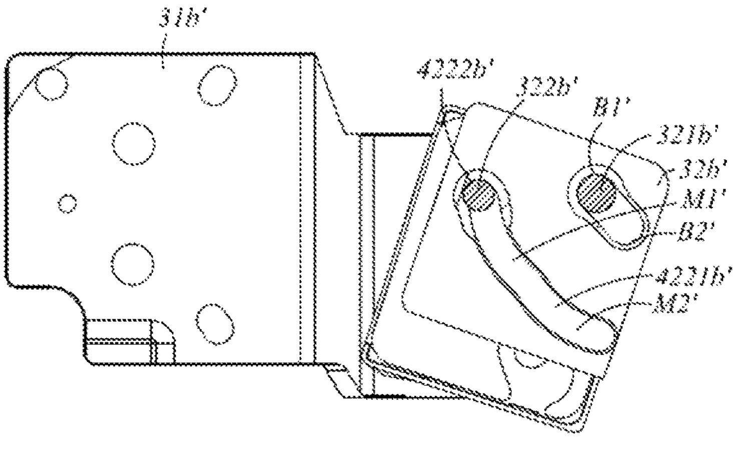
FIGS. 70 to 73 are bottom sectional views of the hinge assembly in the other embodiment of the present invention at different opening angles.

Specifically, when the door 20*b* is in the closed state and opened from the closed state to the first opening angle α1, referring to FIG. 70, the first switching part 401*b*' and the second switching part 402*b*' are relatively stationary, the third shaft 321*b*' is located at the start position B1', and the fourth shaft 322*b*' is located at the limiting section 4222*b*' to limit the second hinge part 32*b'*.

Figure 71:
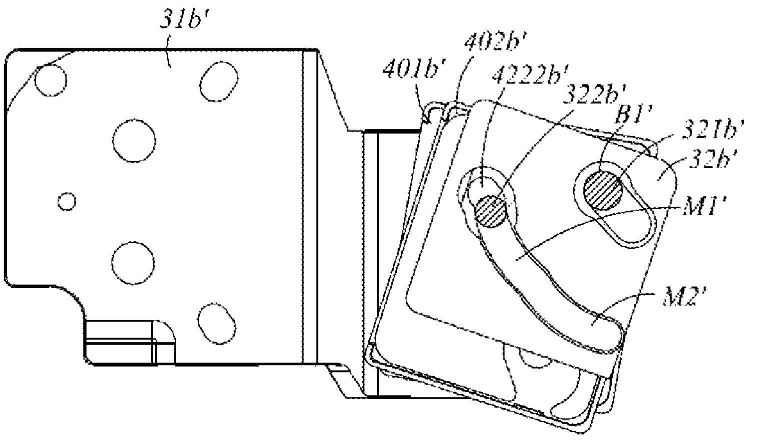

When the door 20*b* is continuously opened from the first opening angle α1 to the second opening angle α2, with reference to FIG. 71, the first switching part 401*b*' and the second switching part 402*b*' move relatively, such that the fourth shaft 322*b*' is separated from the limiting section 4222*b*', and the third shaft 321*b*' is kept at the start position B1'.

Figure 72:
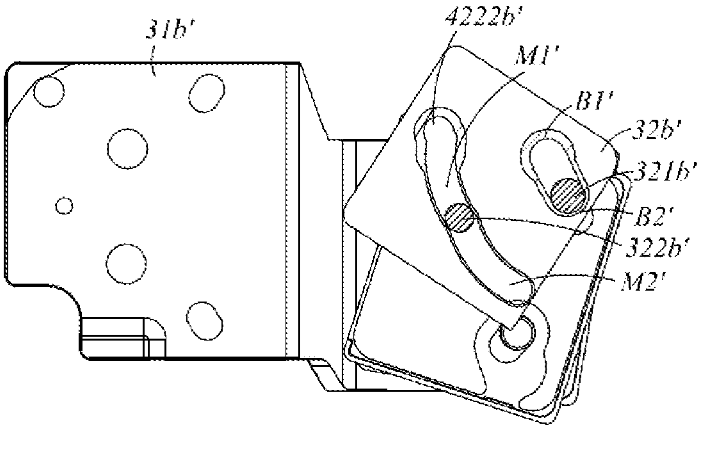

When the door 20*b* is continuously opened from the second opening angle α2 to the first intermediate opening angle α21, with reference to FIG. 72, the first switching part 401*b*' and the second switching part 402*b*' are relatively stationary, the fourth shaft 322*b*' rotates in the moving section M1' to drive the third shaft 321*b*' to translate from the start position B1' to the pivoting position B2', and the door moves from the pivoting side P towards the accommodating chamber S.

Figure 73:
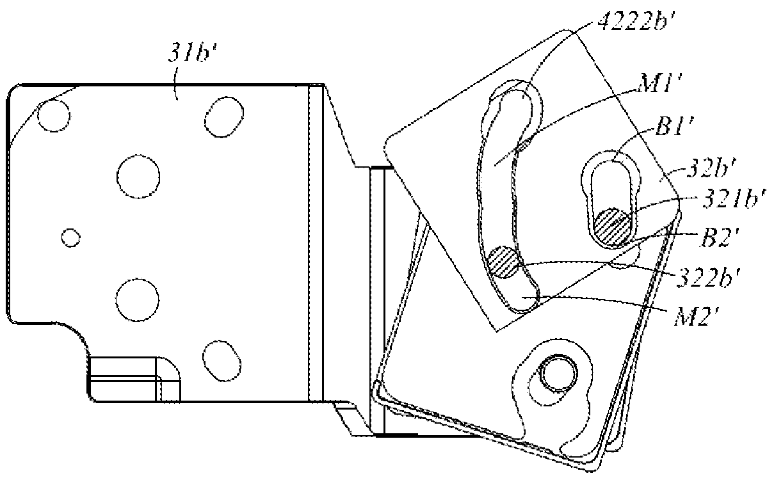
Figure 74:
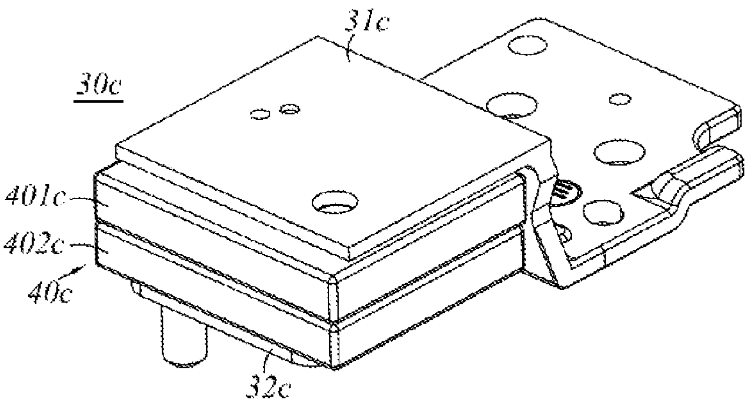
FIG. 74 is a perspective view of a hinge assembly in a fourth embodiment of the present invention.

When the door 20*b* is continuously opened from the first intermediate opening angle α21 to the maximum opening angle α3, with reference to FIG. 73, the first switching part 401*b*' and the second switching part 402*b*' are relatively stationary, the third shaft 321*b*' is kept at the pivoting position B2', the fourth shaft 322*b*' moves in the rotating section M2' around the third shaft 321*b*', and the door 20*b* continuously rotates in situ relative to the cabinet 10*b*.

For other descriptions of the present embodiment, reference may be made to the previous embodiment, which is not repeated herein.

It should be noted that the third groove 421*b* and the fourth groove 422*b* in the present invention may be in other forms, as long as the motion track in the present invention may be guaranteed to be realized.

In the present invention, the first shaft 311*b* and the third shaft 321*b* are staggered, and thus, the refrigerator may be suitable for the embedded cupboard or the scenario with a small space for accommodating the refrigerator 100*b*.

It should be noted that, for other descriptions of the hinge assembly 30*b* in the present embodiment and the working principle, reference may be made to other embodiments, which are not repeated herein.

With reference to FIGS. 74 to 96, schematic diagrams of a refrigerator of a fourth embodiment of the present invention are shown.

In the fourth embodiment, the hinge assembly 30*c* includes a first hinge part 31*c* fixed to the cabinet 10*c*, a second hinge part 32*c* fixed to the door 20*c* and a switching assembly 40*c* connected with the first hinge part 31*c* and the second hinge part 32*c*.

It should be noted that the hinge assembly 30*c* in the present embodiment may be applied to the multi-door refrigerator and the side-by-side refrigerator according to the first and second embodiments, and certainly, may be applied to other refrigerators.

The cabinet 10*c* includes an outer side surface 13*c* close to the hinge assembly 30*c* and on an extension section of a rotation path of the door 20*c*.

The door 20*c* includes a front wall 21*c* apart from the accommodating chamber S and a side wall 22*c* always clamped between the front wall 21*c* and the accommodating chamber S, and a side edge 23*c* is provided between the front wall 21*c* and the side wall 22*c*.

The hinge assembly 30*c* includes a first hinge part 31*c* fixed to the cabinet 10*c*, a second hinge part 32*c* fixed to the door 20*c* and a switching assembly 40*c* connected with the first hinge part 31*c* and the second hinge part 32*c*

The switching assembly 40*c* includes a first switching part 401*c* and a second switching part 402*c* which are fitted with each other, and the first switching part 401*c* is closer to the first hinge part 31*c* than the second switching part 402*c*; that is, the first hinge part 31*c*, the second hinge part 32*c* and the switching assembly 40*c* are mounted in an order of the first hinge part 31*c*, the first switching part 401*c*, the second switching part 402*c* and the second hinge part 32*c*, and the first hinge part 31*c*, the first switching part 401*c*, the second switching part 402*c* and the second hinge part 32*c* are sequentially stacked, but the present invention is not limited thereto.

When the door 20*c* is opened from the closed state to the first opening angle α1, the first switching part 401*c*, the second switching part 402*c* and the second hinge part 32*c* are relatively stationary and move together relative to the first hinge part 31*c*, and the door 20*c* rotates in situ relative to the cabinet 10*c*; when the door 20*c* is continuously opened from the first opening angle α1 to the second opening angle α2, the first switching part 401*c* and the first hinge part 31*c* are relatively stationary, the second switching part 402*c* and the second hinge part 32*c* are relatively stationary and move together relative to the first switching part 401*c*, and the door 20*c* moves from the pivoting side P towards the accommodating chamber S; when the door 20*c* is continuously opened from the second opening angle α2 to the maximum opening angle α3, the first hinge part 31*c*, the first switching part 401*c* and the second switching part 402*c* are relatively stationary, the second hinge part 32*c* moves relative to the second switching part 402*c*, and the door 20*c* continuously rotate in situ relative to the cabinet 10*c*.

It may be seen that the switching assembly 40*c* is connected with the first hinge part 31*c* and the second hinge part 32*c*, such that the rotation axis of the door 20*c* may be switched in the opening process; specifically, the in-situ rotation axis generated when the door 20*c* is opened from the closed state to the first opening angle α1 is different from the in-situ rotation axis generated when the door 20*c* is continuously opened from the second opening angle α2 to the maximum opening angle α3, and thus, the motion track of the door 20*c* may be changed by switching the rotating axis, such that the refrigerator 100*c* may adapt to the embedded application scenario; in addition, the door 20*c* in the present embodiment moves from the pivoting side P to the accommodating chamber S in the opening process, the door 20*c* may be prevented from interfering with the peripheral cupboard or wall, or the like, in the opening process, and the refrigerator is further suitable for the embedded cupboard or the scenario with a small space for accommodating the refrigerator 100*c*, and reference of the specific construction for the hinge assembly 30*c* is made to the following description.

Figure 75:
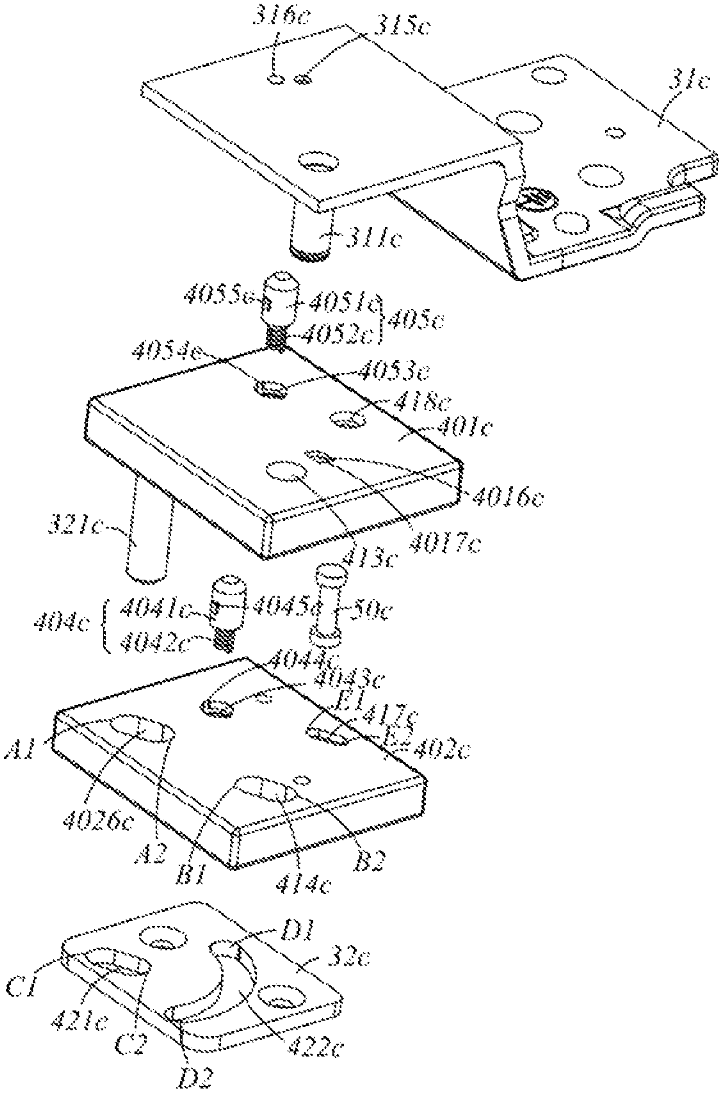
FIGS. 75 and 76 are exploded views of the hinge assembly in the fourth embodiment of the present invention from different perspectives.
Figure 76:
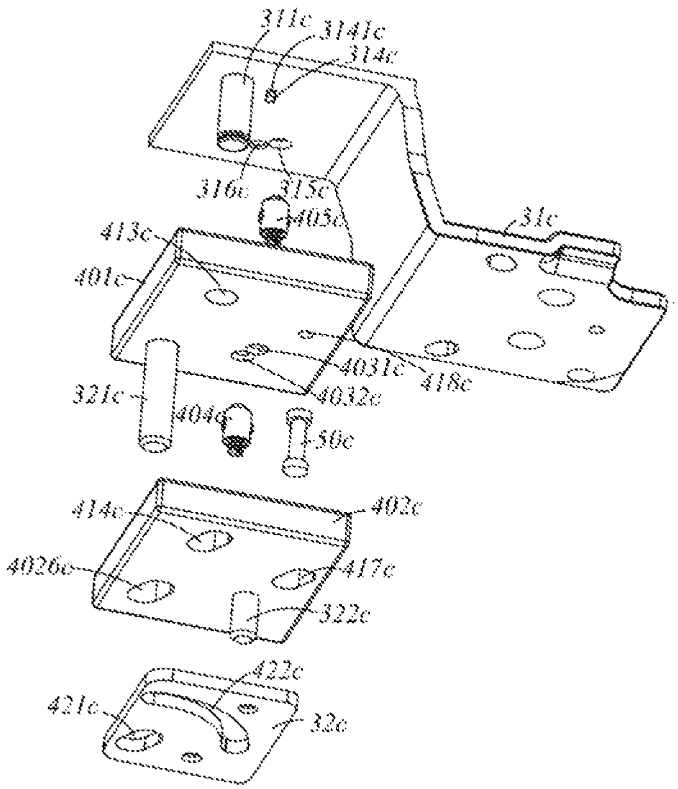
Figure 77:
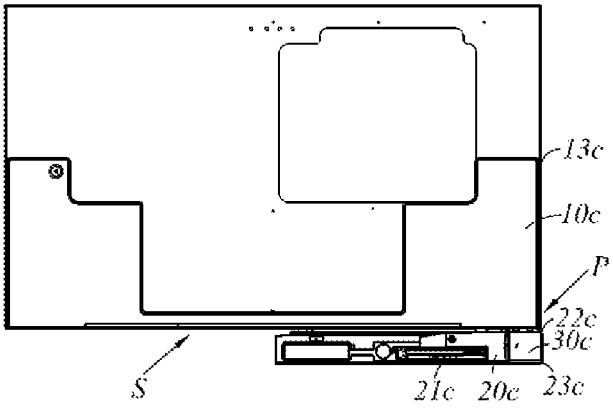
FIG. 77 is a top view of a refrigerator according to the fourth embodiment of the present invention in a closed state.
Figure 78:
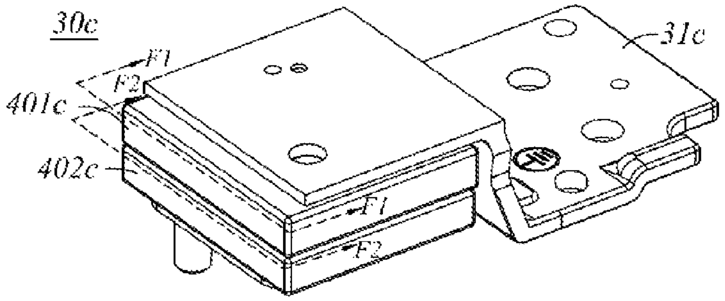
FIG. 78 is a perspective view of the hinge assembly in the fourth embodiment of the present invention in the closed state.
Figure 79:
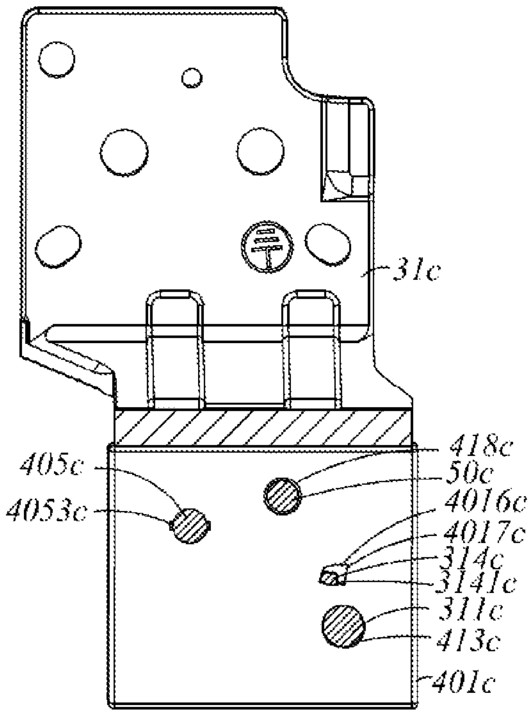
FIG. 79 is a sectional view taken along F1-F1 in FIG. 78.
Figure 80:
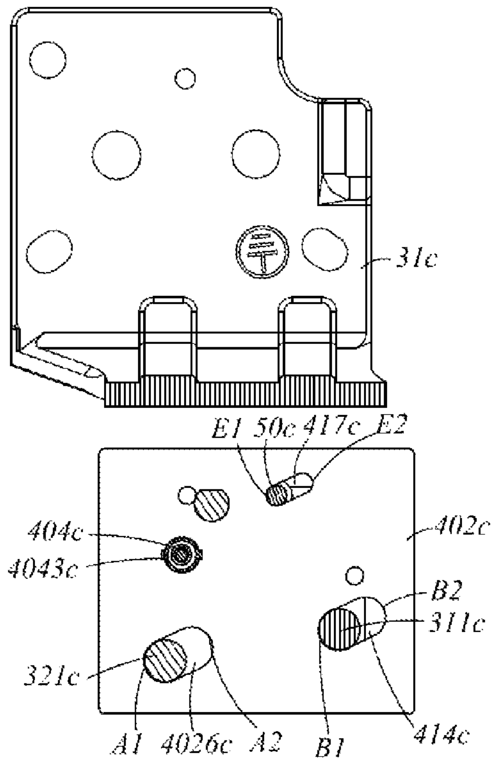
FIG. 80 is a sectional view taken along F2-F2 in FIG. 78.
Figure 81:
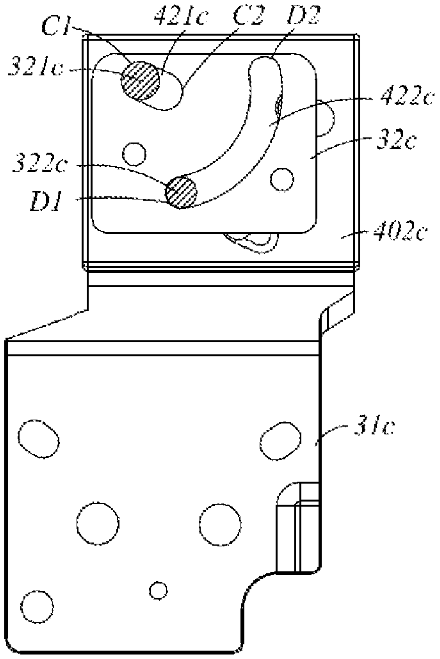
FIG. 81 is a bottom view of the hinge assembly in the fourth embodiment of the present invention.
Figure 82:
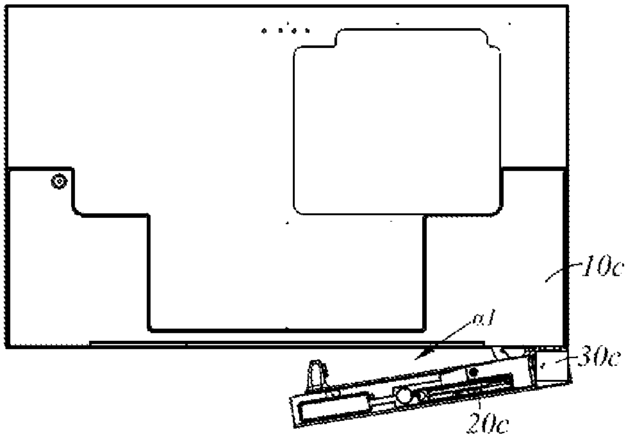
FIG. 82 is a top view of the refrigerator according to the fourth embodiment of the present invention at a first opening angle.
Figure 83:
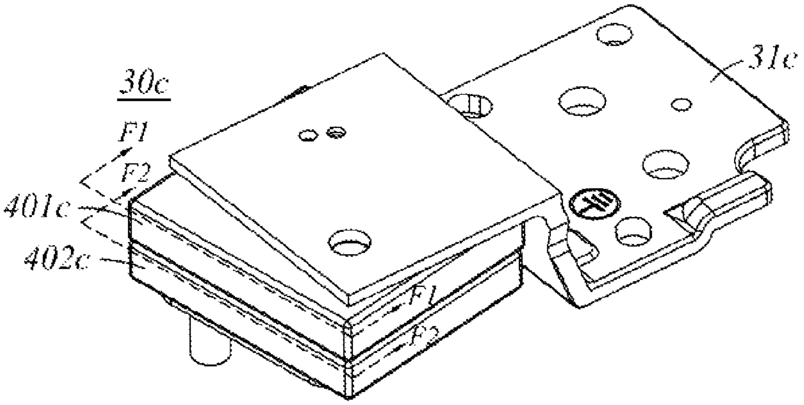
FIG. 83 is a perspective view of the hinge assembly in the fourth embodiment of the present invention at the first opening angle.
Figure 84:
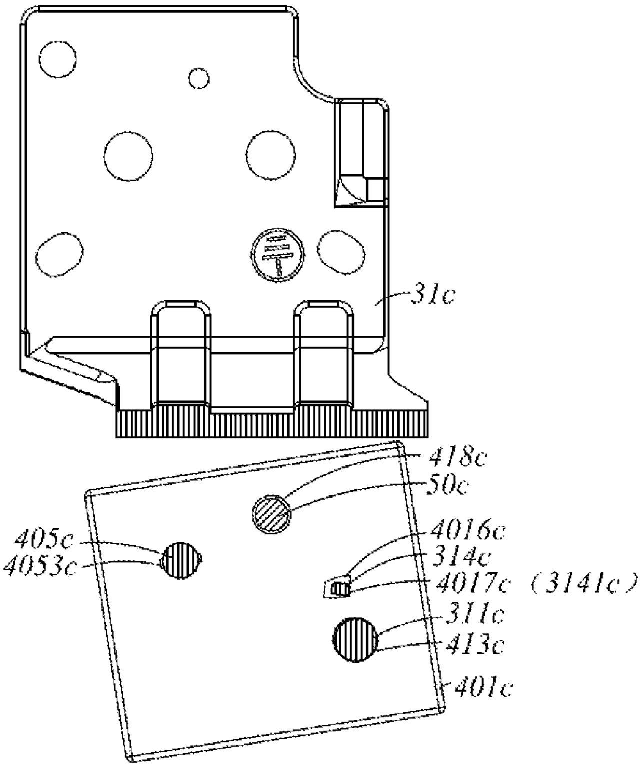
FIG. 84 is a sectional view taken along F1-F1 in FIG. 83.
Figure 85:
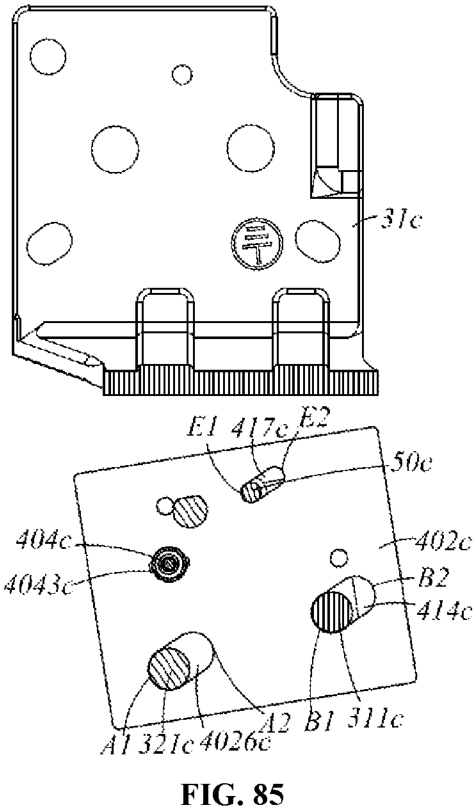
FIG. 85 is a sectional view taken along F2-F2 in FIG. 83.
Figure 86:
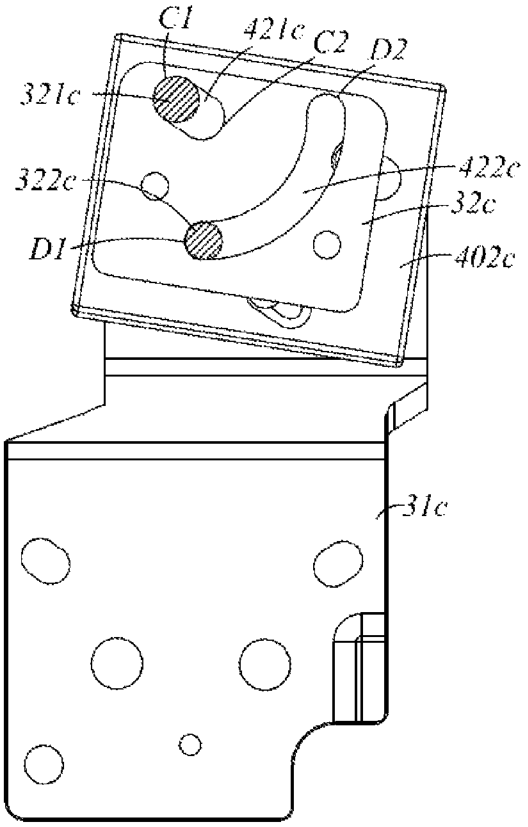
FIG. 86 is a bottom view of the hinge assembly in the fourth embodiment of the present invention at the first opening angle.
Figure 87:
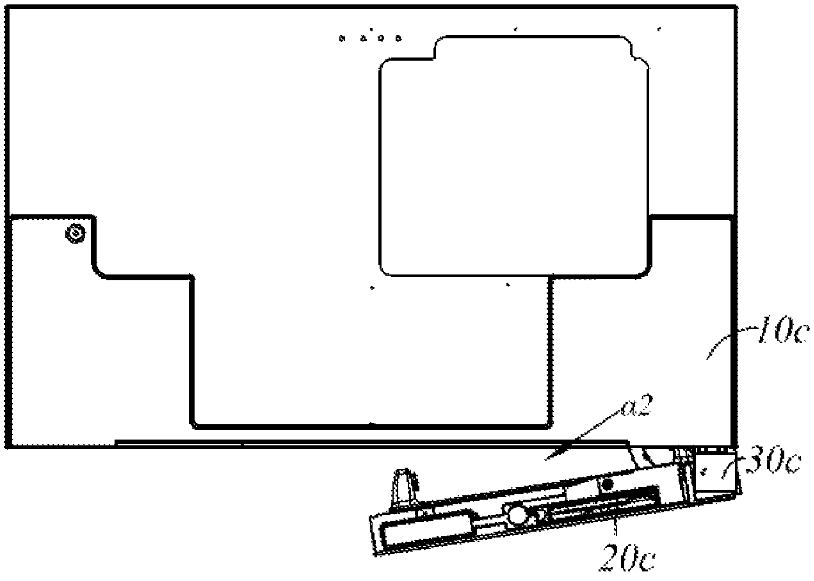
FIG. 87 is a top view of the refrigerator according to the fourth embodiment of the present invention at a second opening angle.
Figure 88:
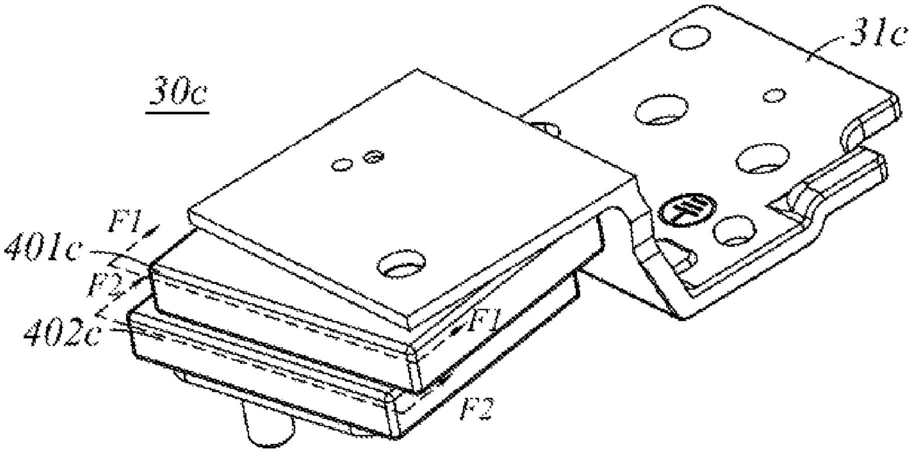
FIG. 88 is a perspective view of the hinge assembly in the fourth embodiment of the present invention at the second opening angle.
Figure 89:
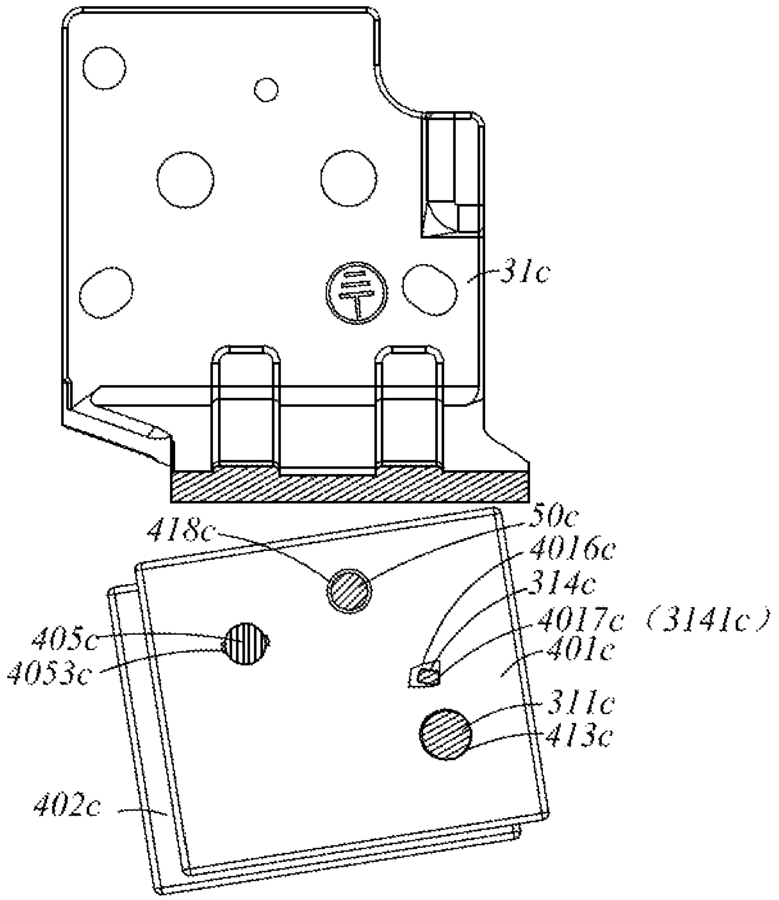
FIG. 89 is a sectional view taken along F1-F1 in FIG. 88.
Figure 90:
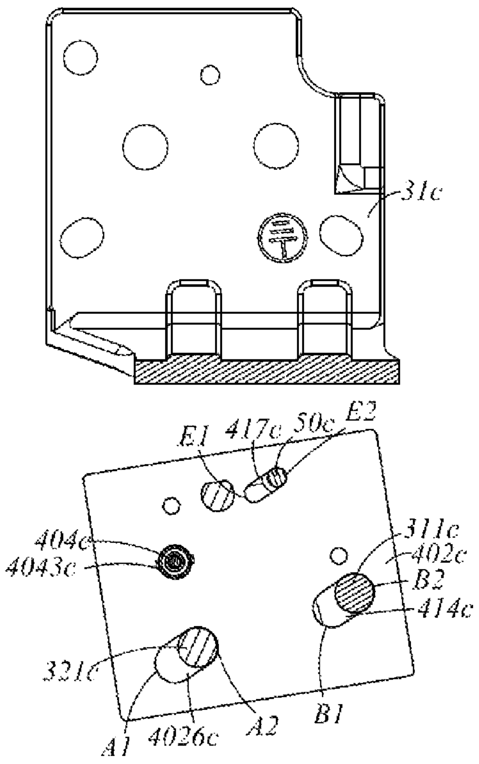
FIG. 90 is a sectional view taken along F2-F2 in FIG. 88.
Figure 91:
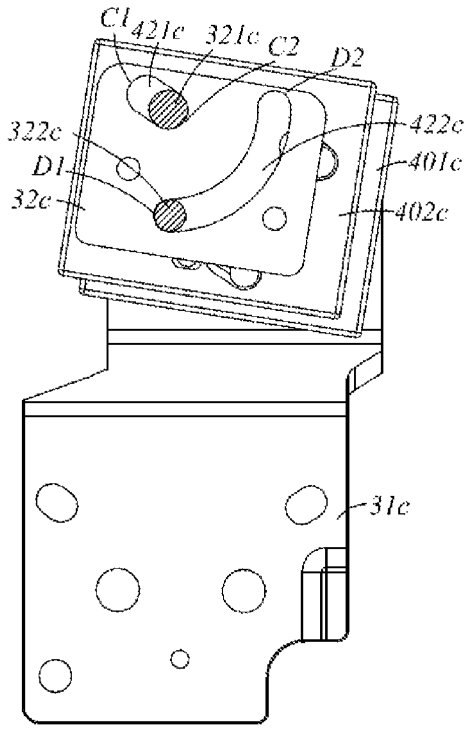
FIG. 91 is a bottom view of the hinge assembly in the fourth embodiment of the present invention at the second opening angle.
Figure 92:
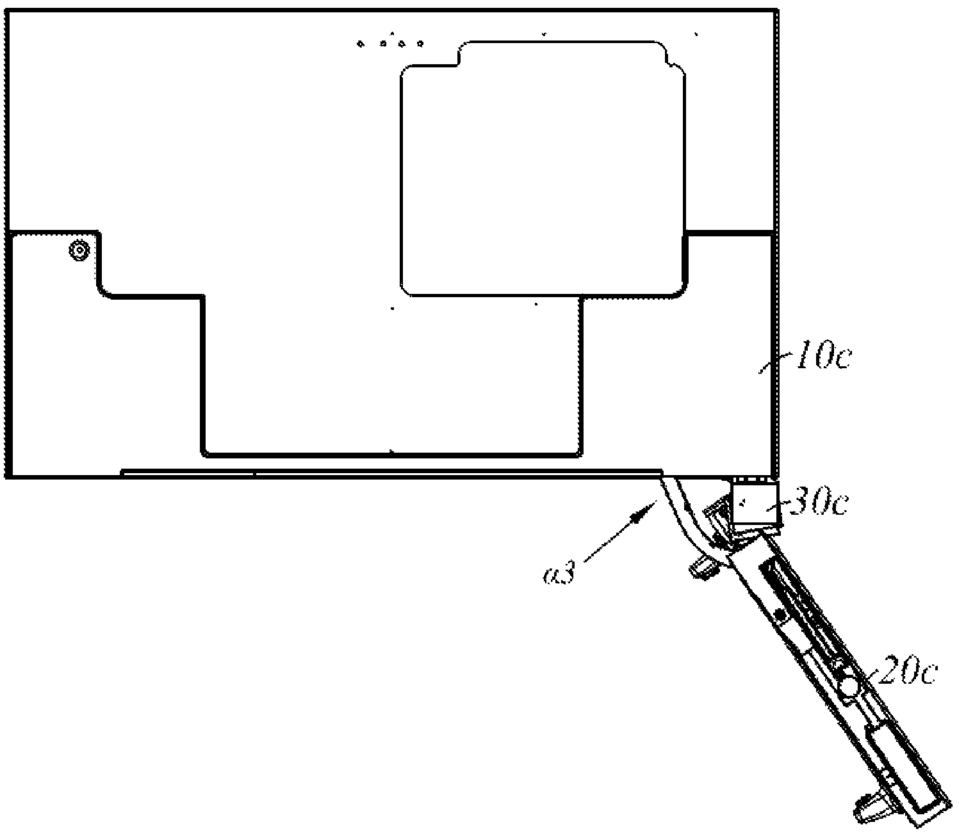
FIG. 92 is a top view of the refrigerator according to the fourth embodiment of the present invention at a maximum opening angle.
Figure 93:
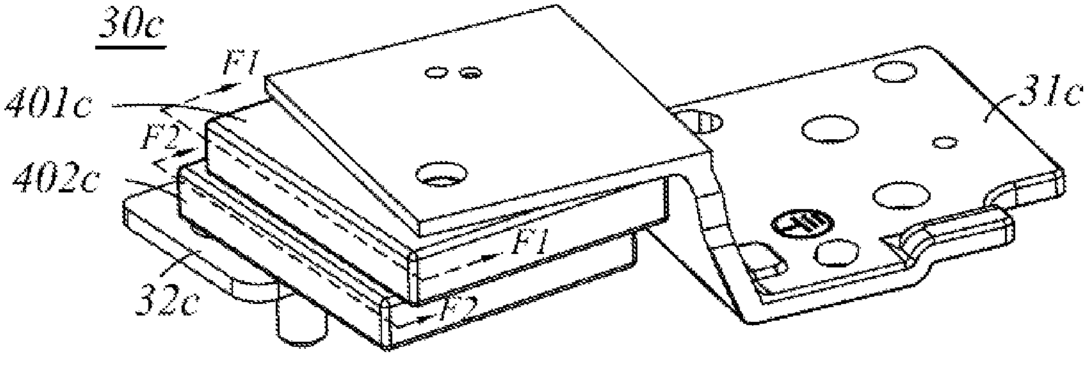
FIG. 93 is a perspective view of the hinge assembly in the fourth embodiment of the present invention at the maximum opening angle.
Figure 94:
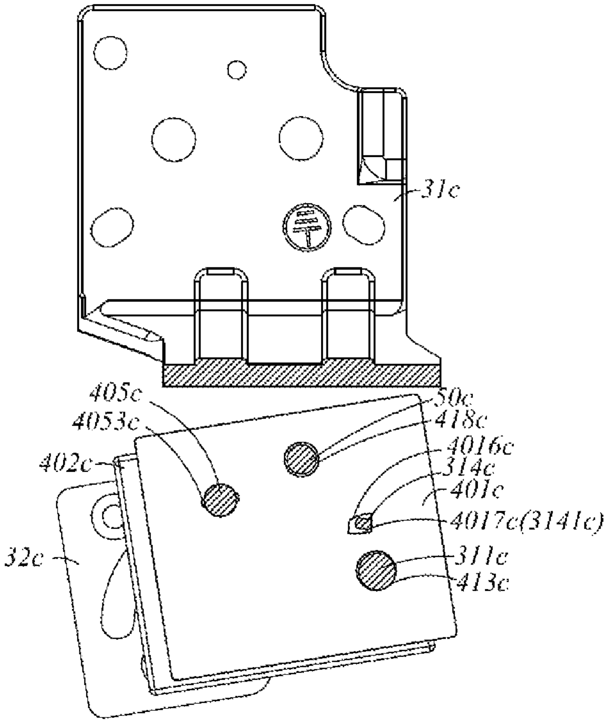
FIG. 94 is a sectional view taken along F1-F1 in FIG. 93.
Figure 95:
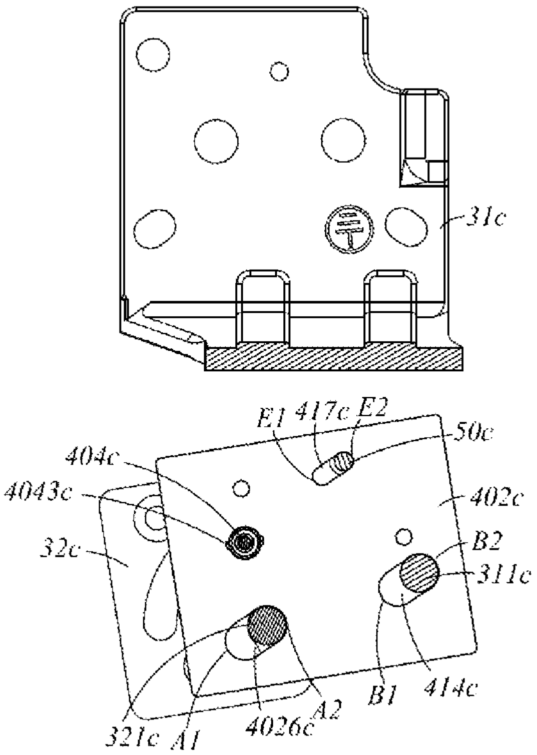
FIG. 95 is a sectional view taken along F2-F2 in FIG. 93.
Figure 96:
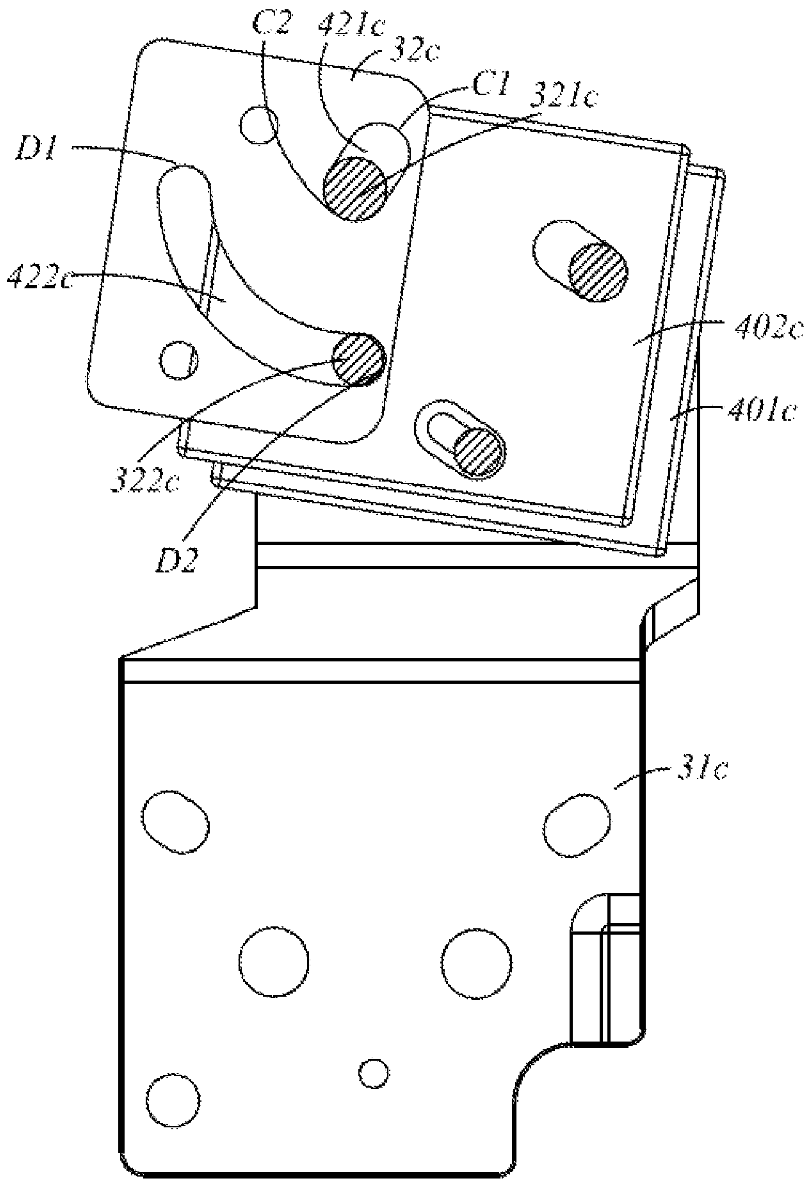
FIG. 96 is a bottom view of the hinge assembly in the fourth embodiment of the present invention at the maximum opening angle.
Figure 97:
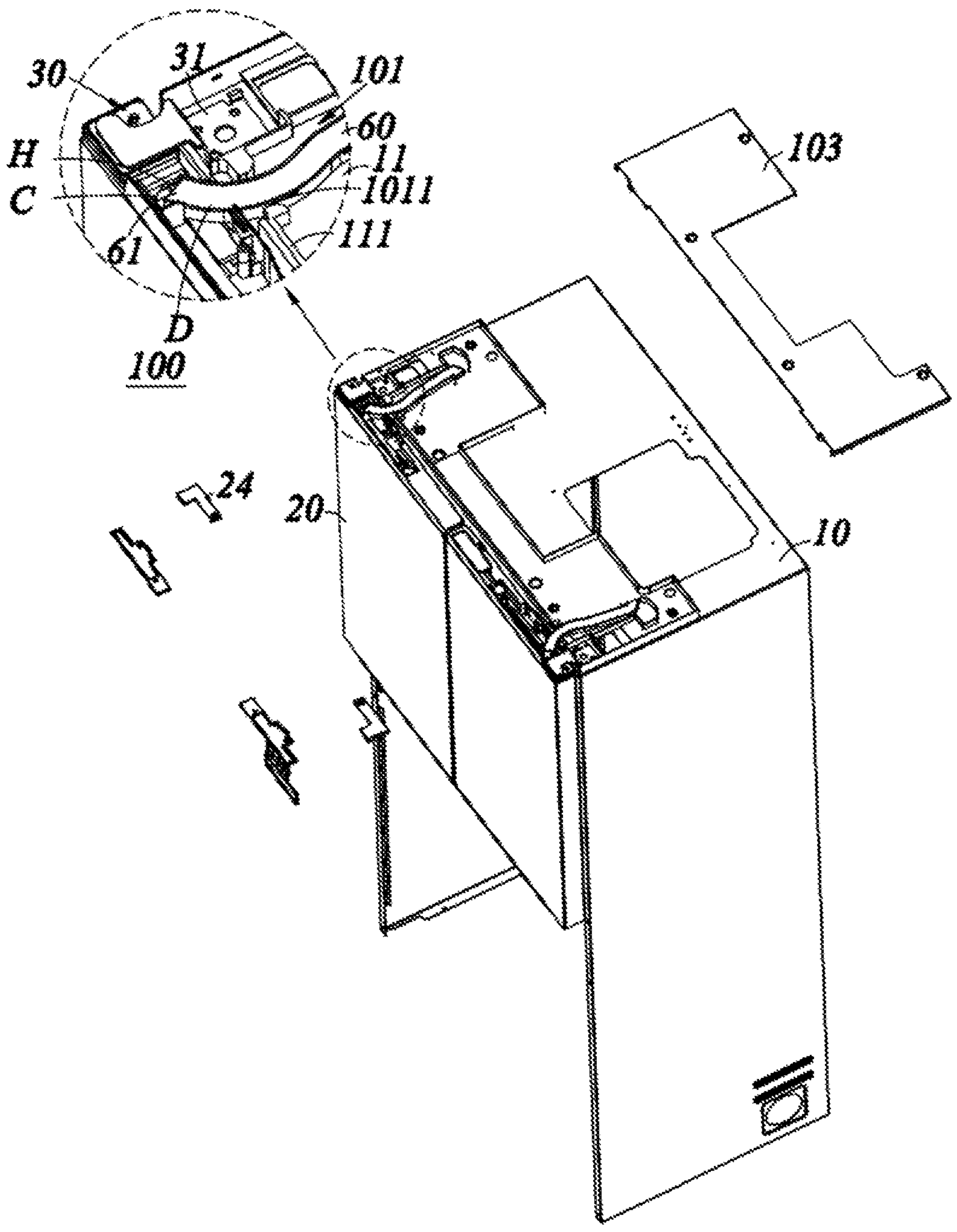
FIG. 97 is a perspective view of the refrigerator with a wiring module in an embodiment of the present invention.
Figure 98:
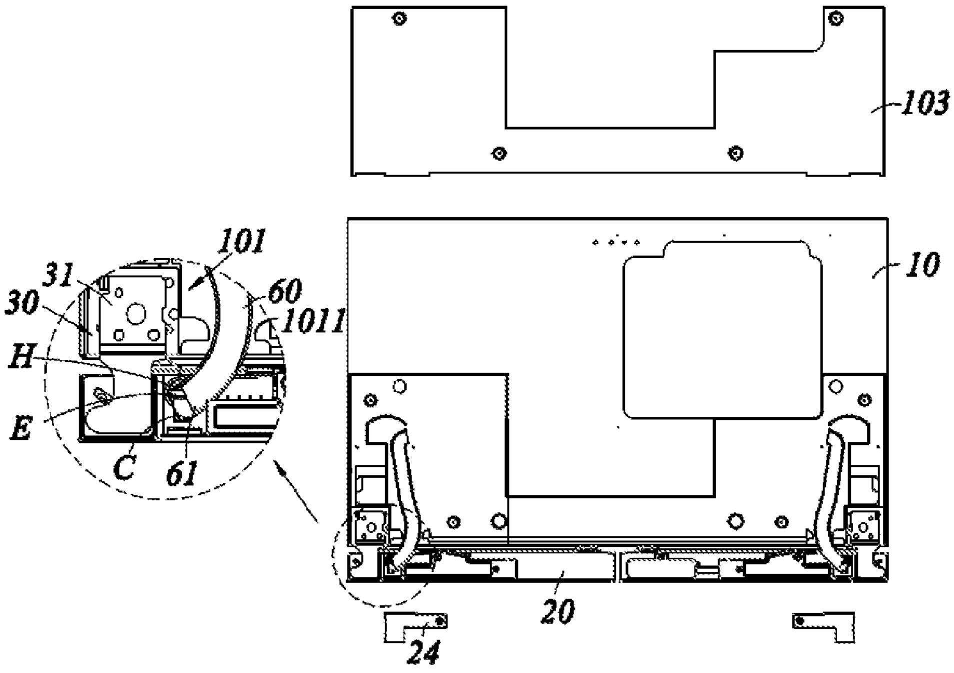
FIG. 98 is a top view of the refrigerator with a wiring module in an embodiment of the present invention.
Figure 99:
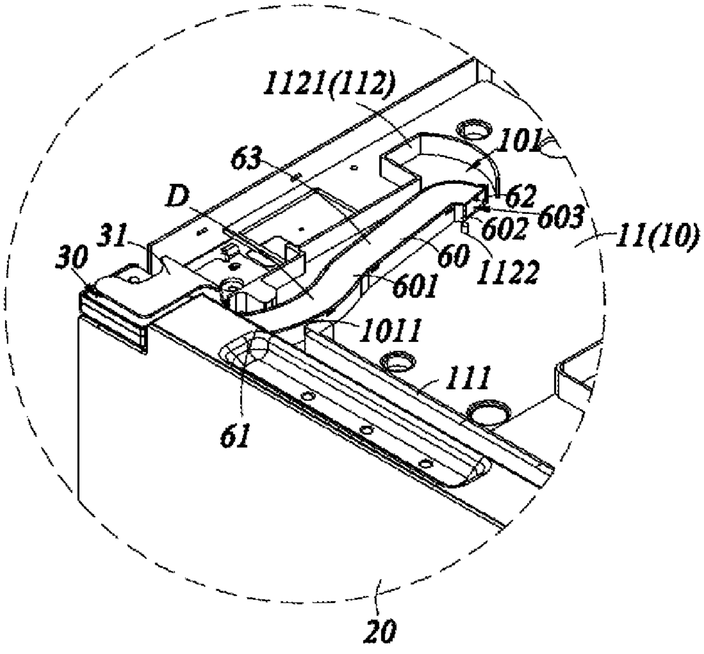
FIG. 99 is a partially enlarged perspective view of the refrigerator with the wiring module in an embodiment of the present invention.
Figure 100:
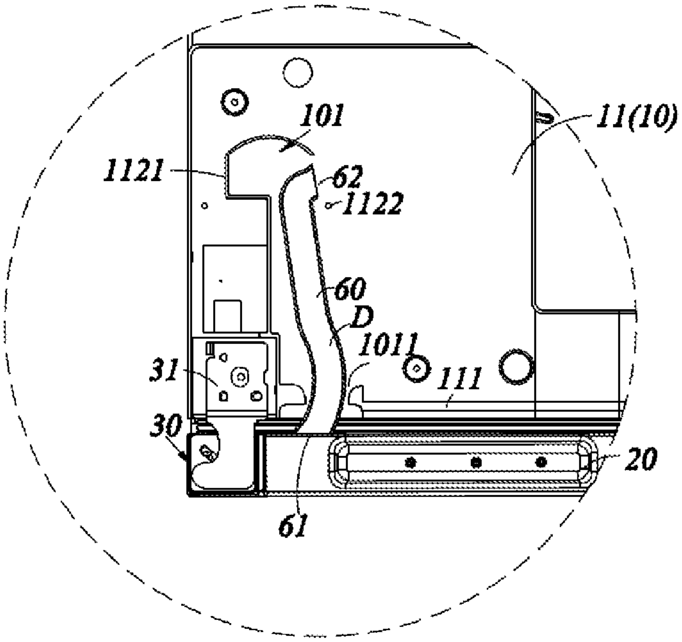
FIG. 100 is a partially enlarged top view (corresponding to the closed state of the door) of the refrigerator with the wiring module in an embodiment of the present invention.
Figure 101:
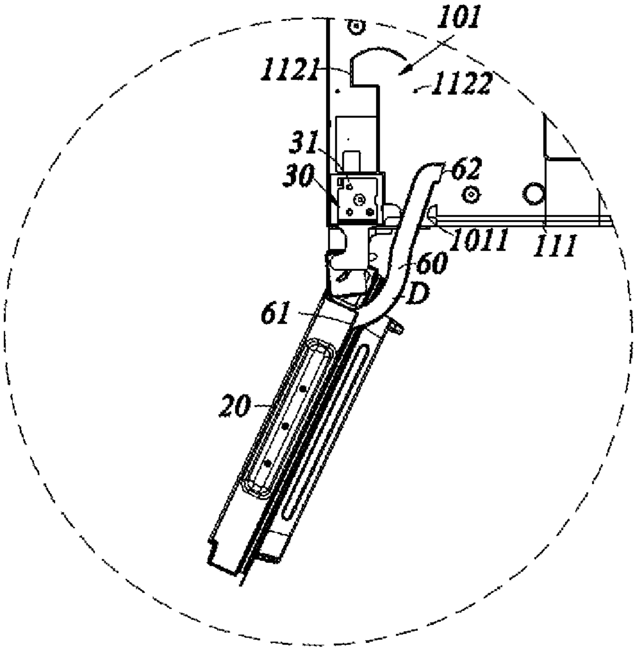
FIG. 101 is a partially enlarged top view (corresponding to an open state of the door) of the refrigerator with the wiring module in an embodiment of the present invention.

In the present embodiment, referring to FIGS. 75 and 76, the first hinge part 31*c* includes a first shaft 311*c*, and the first shaft 311*c* extends perpendicularly.

The first switching part 401*c* includes a third shaft 321*c* and a first upper groove 413*c*.

Here, the third shaft 321*c* is located on a side of the first switching part 401*c* close to the second switching part 402*c*, the third shaft 321*c* extends perpendicularly, the first upper groove 413*c* has a through hole structure, the first upper groove 413*c* is circular, and an opening size of the first upper groove 413*c* adapts to an outer diameter of the first shaft 311*c*, such that the first shaft 311*c* may only rotate in the first upper groove 413*c* without movement.

The second switching part 402*c* includes a fourth shaft 322*c* and a through hole 4026*c*.

Here, the fourth shaft 322*c* is located on a side of the second switching part 402*c* close to the second hinge part 32*c*, the fourth shaft 322*c* extends perpendicularly, the through hole 4026*c* has an oval shape, the through hole 4026*c* includes an initial position A1 and a stop position A2 which are arranged oppositely, the initial position A1 and the stop position A2 serve as two ends in the direction of the long axis of the oval shape; in addition, the second switching part 402*c* further includes a first lower groove 414*c*, the first shaft 311*c* sequentially passes through the first upper groove 413*c* and the first lower groove 414*c*, the first lower groove 414*c* has an oval shape, the first lower groove 414*c* includes a first end Bland a second end B2 which are arranged oppositely, the first end B1 and the second end B2 serve as two ends in the direction of the long axis of the oval shape, and the lower groove 414*c* is parallel to the through hole 4026*c*.

The second hinge part 32*c* includes a third groove 421*c* and a fourth groove 422*c*.

Here, the second hinge part 32*c* may be configured as a shaft sleeve fitted with the door 20*c*, the third groove 421*c* has an oval shape, the third groove 421*c* includes a start position C1 and a pivoting position C2 which are arranged oppositely, the start position C1 and the pivoting position C2 serve as two ends in the direction of the long axis of the oval shape; the fourth groove 422*c* includes a rotation start position D1 and a rotation stop position D2 which are arranged oppositely, and the fourth groove 422*c* is configured as an arc groove with a circle center serving as the pivoting position C2 of the third groove 421*c*.

In the present embodiment, with continued reference to FIGS. 75 and 76, the first hinge part 31*c* includes a first limiting portion 314*c*, the first switching part 401*c* includes a second limiting portion 4016*c*, one of the first limiting portion 314*c* and the second limiting portion 4016*c* is configured as a bump 314*c*, the other is configured as a recess 4016*c*, the bump 314*c* includes a first limiting surface 3141*c*, and the recess 4016*c* includes a second limiting surface 4017*c*.

In the present embodiment, the recess 4016*c* is located on the first switching part 401*c*, and the bump 314*c* is located on the first hinge part 314*c*.

In other embodiments, positions of the bump 314*c* and the recess 4016*c* may be interchanged, and other limiting structures may be adopted.

In addition, the first hinge part 31*c* further includes a first engaging portion 315*c* and a second engaging portion 316*c*, the first switching part 401*c* includes a third engaging portion 405*c*, both the first engaging portion 315*c* and the second engaging portion 316*c* are configured as recesses, and the third engaging portion 405*c* includes a third elastic part 4052*c* and a third boss 4051*c*.

Here, a first special-shaped groove 4053*c* is provided in a side of the first switching part 401*c* close to the first hinge part 31*c*, the third elastic part 4052*c* and the third boss 4051*c* are limited in the first special-shaped groove 4053*c*, a first latching portion 4054*c* is provided on an inner wall of the first special-shaped groove 4053*c*, and a first ridge 4055*c* fitted with the first latching portion 4054*c* is provided on an outer wall of the third boss 4051*c*, such that the third boss 4051*c* may only move vertically relative to the first special-shaped groove 4053*c* under the action of the third elastic part 4052*c*; the third elastic part 4052*c* is configured as a spring, and an outer surface of the third boss 4051*c* is substantially configured as an arc surface.

In the present embodiment, with continued reference to FIGS. 75 and 76, the first switching part 401*c* includes a fourth engaging portion 4031*c* and a fifth engaging portion 4032*c*, the second switching part 402*c* includes a sixth engaging portion 404*c*, both the fourth engaging portion 4031*c* and the fifth engaging portion 4032*c* are configured as recesses, and the sixth engaging portion 404*c* includes a sixth elastic part 4042*c* and a sixth boss 4041*c*.

Here, a second special-shaped groove 4043*c* is provided in a side of the second switching part 402*c* close to the first switching part 401*c*, the sixth elastic part 4042*c* and the sixth boss 4041*c* are limited in the second special-shaped groove 4043*c*, a second latching portion 4044*c* is provided on an inner wall of the second special-shaped groove 4043*c*, and a second ridge 4045*c* fitted with the second latching portion 4044*c* is provided on an outer wall of the sixth boss 4041*c*, such that the sixth boss 4041c may only move vertically relative to the second special-shaped groove 4043c under the action of the sixth elastic part 4042c; the sixth elastic part 4042c is configured as a spring, and an outer surface of the sixth boss 4041c is substantially configured as an arc surface.

With continued reference to FIGS. 75 and 76, the first switching part 401c and the second switching part 402c are further fitted with each other by a fifth shaft 50c, a sixth groove 418c and a fifth groove 417c, the sixth groove 418c is located on the first switching part 401c, the sixth groove 418c is matched with the fifth shaft 417c, the fifth groove 417c is located on the second switching part 402c, the fifth groove 417c includes a third end E1 and a fourth end E2 which are arranged oppositely, the fifth groove 417c has an oval shape, the third end E1 and the fourth end E2 serve as two ends in the direction of the long axis of the oval shape.

Here, the fifth shaft 50c has a structure with two larger ends and a smaller middle, the fifth shaft 50c passes through the sixth groove 418c and the fifth groove 417c in sequence, and the two larger ends of the fifth shaft 50c are located above the first switching part 401c and below the second switching part 402c respectively, such that the first switching part 401c and the second switching part 402c may move relative to each other, and the first switching part 401c and the second switching part 402c may not be separated from each other; in other embodiments, the fifth shaft 50c and the first switching part 401c may be fixed to each other.

Next, a specific operation flow of the hinge assembly 30c will be described.

With reference to FIGS. 77 to 81, when the door 20c is in the closed state, the first switching part 401c and the second switching part 402c are relatively stationary, the first shaft 311c extends to the first upper groove 413c, the third shaft 321c sequentially passes through the through hole 4026c and the third groove 421c, the third shaft 321c is located at the initial position A1 and the start position C1, and the fourth shaft 322c is located at the rotation start position D1 of the fourth groove 422c; in addition, the first shaft 311c further extends to the first lower groove 414c and is located at the first end B1, and the fifth shaft 50c is located at the third end E1 of the fifth groove 417c.

At this point, the first limiting surface 3141c of the first limiting portion 314c is apart from the second limiting surface 4017c of the second limiting portion 4016c.

The third engaging portion 405c is limited at the first engaging portion 315c; that is, the third elastic part 4052c acts on the third boss 4051c to limit the third boss 4051c at the first engaging portion 315c, and at this point, the third engaging portion 405c and the first engaging portion 315c may be used as closing parts to assist in improving a closing effect of the door 20c.

The sixth engaging portion 404c is limited at the fourth engaging portion 4031c; that is, the sixth elastic part 4042c acts on the sixth boss 4041c to limit the sixth boss at the fourth engaging portion 4031c, and at this point, the sixth engaging portion 404c and the fourth engaging portion 4031c may be fitted with each other to assist in realizing that the first switching part 401c and the second switching part 42c are relatively stationary.

The outer side surface 13c and the side wall 22c are located on a same plane, which may guarantee appearance smoothness, improve attractiveness, and facilitate a mounting process of the door 20c, but the present invention is not limited thereto.

Referring to FIGS. 82 to 86, when the door 20c is opened from the closed state to the first opening angle α1, the first switching part 401c, the second switching part 402c and the second hinge part 32c are relatively stationary and move together relative to the first hinge part 31c, and at this point, the first shaft 311c rotates in situ in the first upper groove 413c to drive the door 20c to rotate in situ relative to the cabinet 10c.

Here, when the door 20c is opened from the closed state to the first opening angle α1, the first shaft 311c is kept at the first end B1 of the first lower groove 414c, the third shaft 321c is kept at the initial position A1 and the start position C1, the fourth shaft 322c is kept at the rotation start position D1, and the fifth shaft 50c is kept at the third end E1 of the fifth groove 417c.

Specifically, when the door 20c is in the closed state, the third shaft 321c is simultaneously located at the initial position A1 and the start position C1, the fourth shaft 322c is located at the rotation start position D1, the pitch between the third shaft 321c and the fourth shaft 322c is kept constant, the third shaft 321c is located at the first switching part 401c, the fourth shaft 322c is located at the second switching part 402c, and under the common limit of the third shaft 321c and the fourth shaft 322c, the first switching part 401c and the second switching part 402c are relatively stationary; since the fourth groove 422c is configured as an arc groove with the pivoting position C2 of the third groove 421c as a circle center, when the third shaft 321c is located at the start position C1, the fourth shaft 322c does not move in the fourth groove 422c; that is, the second hinge part 32c, the first switching part 401c and the second switching part 402c are simultaneously kept relatively stationary, and when a user applies a force to the door 20c to open the door 20c, the first switching part 401c, the second switching part 402c and the second hinge part 32c are relatively stationary and move together relative to the first hinge part 31c.

In the present embodiment, the door 20c rotates in situ relative to the cabinet 10c when the door 20c is opened to the first opening angle α1, thus ensuring that the door 20c is not displaced in the first direction X or the second direction Y in this process.

It should be noted that when the door 20c is opened from the closed state to the first opening angle α1, the third shaft 321c is always located at the start position C1, and the fourth shaft 322c is always located at the rotation start position D1; that is, the switching assembly 40c limits the second hinge part 32c.

Here, when the door 20c is in the closed state, the bump 314c is located in the recess 4016c, and the first limiting surface 3141c is apart from the second limiting surface 4017c; when the door 20c is opened from the closed state to the first opening angle α1, the first hinge part 31c is fixed to the cabinet 10c, the door 20c drives the first switching part 401c, the second switching part 402c and the second hinge part 32c to move together relative to the first hinge part 31c, the bump 314c moves in the recess 4016c, and the first limiting surface 3141c and the second limiting surface 4017c gradually approach until the first limiting surface 3141c abuts against the second limiting surface 4017c; at this point, the first switching part 401c is unable to rotate relative to the first hinge part 31c; that is, the switching assembly 40c locks the first hinge part 31c, and a rotation angle of the door 20c when the first limiting surface 3141c abuts against the second limiting surface 4017c may be controlled by controlling sizes, shapes, or the like, of the bump 314c and the recess 4016c.

Meanwhile, in the opening process, the third engaging portion 405c is separated from the first engaging portion 315c, and the third engaging portion 405c and the second engaging portion 316*c* gradually approach until the third engaging portion 405*c* is limited at the second engaging portion 316*c*; specifically, a bottom surface of the first hinge part 31*c* abuts against the third boss 4051*c* to drive the third elastic part 4052*c* to be compressed, and when the third boss 4051*c* contacts the second engaging portion 316*c*, the third elastic part 4052*c* resets to drive the third boss 4051*c* to enter the second engaging portion 316*c*, such that the first switching part 401*c* may be further limited from continuously rotating relative to the first hinge part 31*c*.

It may be seen that when the door 20*c* is opened to the first opening angle α1, the third boss 4051*c* and the second engaging portion 316*c* are limited by each other, and meanwhile, the first limiting surface 3141*c* and the second limiting surface 4017*c* are limited by each other, such that the first switching part 401*c* is prevented from continuously rotating relative to the first hinge part 31*c* by dual limits; it may be understood that, at this point, the limit of the first limiting surface 3141*c* and the second limiting surface 4017*c* may also be omitted; that is, in other embodiments, the first limiting portion 314*c* and the second limiting portion 4016*c* may be omitted.

In addition, in this opening process, the sixth engaging portion 404*c* and the fourth engaging portion 4031*c* are always limited by each other, so as to assist in realizing that the first switching part 401*c* and the second switching part 42*c* are relatively stationary.

Referring to FIGS. 87 to 91, when the door 20*c* is continuously opened from the first opening angle α1 to the second opening angle α2, the first switching part 401*c* and the first hinge part 31*c* are relatively stationary, the second switching part 402*c* and the second hinge part 32*c* are relatively stationary and move together relative to the first switching part 401*c*, and the door 20*c* moves from the pivoting side P towards the accommodating chamber S.

Here, when the door 20*c* is continuously opened from the first opening angle α1 to the second opening angle α2, the fourth shaft 322*c* is maintained at the rotation start position D1, the first shaft 311*c* moves from the first end B1 to the second end B2, and the third shaft 321*c* moves from the initial position A1 to the stop position A2; meanwhile, the third shaft 321*c* moves from the start position C1 to the pivoting position C2, and the fifth shaft 50*c* moves from the third end E1 to the fourth end E2, such that the door 20*c* may move from the pivoting side P towards the accommodating chamber S.

Specifically, when the door 20*c* is opened to the first opening angle α1, the first limiting surface 3141*c* abuts against the second limiting surface 4017*c*, such that the first switching part 401*c* can no longer move relative to the first hinge part 31*c*; and/or the third engaging portion 405*c* and the second engaging portion 316*c* are limited by each other, such that the first switching part 401*c* can no longer move relative to the first hinge part 31*c*; that is, the first hinge part 31*c* and the first switching part 401*c* are relatively stationary, and at this point, when the user continuously opens the door 20*c*, such that the door 20*c* is continuously opened from the first opening angle α1 to the second opening angle α2, since the fourth groove 422*c* is configured as an arc groove with the pivoting position C2 of the third groove 421*c* as the circle center, the fourth shaft 322*c* does not move in the fourth groove 422*c* before the third shaft 321*c* moves to the pivoting position C2; that is, the second switching part 402*c* and the second hinge part 32*c* are relatively stationary, and then, the acting force of the user drives the first whole of the second switching part 402*c* and the second hinge part 32*c* to move relative to the second whole of the first switching part 401*c* and the first hinge part 31*c*; that is, the second switching part 402*c* moves relative to the first switching part 401*c*.

Here, the through hole 4026*c*, the first lower groove 414*c* and the fifth groove 417*c* in the second switching part 402*c* all have oval shapes and are parallel with one another, when the door 20*c* is continuously opened from the first opening angle α1 to the second opening angle α2, the second switching part 402*c* moves relative to the first switching part 401*c*, the first shaft 311*c* moves from the first end B1 to the second end B2 of the first lower groove 414*c*, the third shaft 321*c* moves from the initial position A1 to the stop position A2 of the through hole 4026*c*, the third shaft 321*c* also moves from the start position C1 to the pivoting position C2 of the third groove 421*c*, and the fifth shaft 50*c* moves from the third end E1 to the fourth end E2 of the fifth groove 417*c*; in other words, the second switching part 402*c* moves by a distance relative to the first switching part 401*c*, and both the second switching part 402*c* and the second hinge part 32*c* are stationary relative to the door 20*c*, which is equivalent to movement of the door 20*c* by a distance relative to the cabinet 10*c*; specifically, the door 20*c* moves from the pivoting side P towards the accommodating chamber S, so as to prevent the door 20*c* from interfering with the peripheral cupboard or wall, or the like.

Here, the side edge 23*c* moves to a side of the outer side surface 13*c* close to the accommodating chamber S; that is, at this point, the hinge assembly 30*c* drives the side edge 23*c* to move towards the side close to the accommodating chamber S, such that interference between the side edge 23*c* and the peripheral cupboard or wall, or the like, due to the side edge 23*b* protruding out of the outer side surface 13*c* may be avoided in the opening process of the door 20*c*.

It should be emphasized that, in the present embodiment, the through hole 4026*c*, the first lower groove 414*c* and the fifth groove 417*c* all have oval shapes and are parallel with one another; when the door 20*c* is continuously opened from the first opening angle α1 to the second opening angle α2, the second switching part 402*c* substantially translates relative to the first switching part 401*c* to drive the door 20*c* to translate relative to the cabinet 10*c*, but in other embodiments, the through hole 4026*c*, the first lower groove 414*c*, and the fifth groove 417*c* may have other shapes; for example, the through hole 4026*c*, the first lower groove 414*c* and the fifth groove 417*c* have arc shapes, the second switching part 402*c* rotates relative to the first switching part 401*c* to drive the door 20*c* to rotate relative to the cabinet 10*c*, and the door 20*c* moves a distance from the pivoting side P to the accommodating chamber S during the rotation.

In addition, when the door 20*c* is continuously opened from the first opening angle α1 to the second opening angle α2, the fifth engaging portion 4032*c* and the sixth engaging portion 404*c* gradually approach until the sixth engaging portion 404*c* is limited at the fifth engaging portion 4032*c*, so as to limit the relative movement between the first switching part 401*c* and the second switching part 402*c*.

Specifically, in this opening process, the second switching part 402*c* moves relative to the first switching part 401*c* to drive the sixth engaging portion 404*c* to be disengaged from the fourth engaging portion 4031*c*, and then, a bottom surface of the first switching part 401*c* close to the second switching part 402*c* abuts against the sixth boss 4041*c* to drive the sixth elastic part 4041*c* to be compressed, and when the sixth boss 4041*c* contacts the fifth engaging portion 4032*c*, the sixth elastic part 4041*c* resets to drive the sixth boss 4041*c* to enter the fifth engaging portion 4032*c*.

With reference to FIGS. 92 to 96, when the door 20_c_ is continuously opened from the second opening angle α2 to the maximum opening angle α3, the first hinge part 31_c_, the first switching part 401_c_ and the second switching part 402_c_ are relatively stationary, the second hinge part 32_c_ moves relative to the second switching part 402_c_, the third shaft 321_c_ is kept at the stop position A2 and the pivoting position C2, the fourth shaft 322_c_ moves from the rotation start position D1 to the rotation stop position D2, and the door 20_c_ continuously rotates in situ relative to the cabinet 10_c_.

Here, when the door 20_c_ is continuously opened from the second opening angle α2 to the maximum opening angle α3, the first shaft 311_c_ is kept at the second end B2 of the first lower groove 414_c_, the third shaft 321_c_ is kept at the stop position A2 and the pivoting position C2, the fifth shaft 50_c_ is kept at the fourth end E2 of the fifth groove 417_c_, and the fourth shaft 322_c_ moves from the rotation start position D1 to the rotation stop position D2, such that the door 20_c_ may continuously rotate in situ relative to the cabinet 10_c_.

Specifically, when the door 20_c_ is opened to the second opening angle α2, the first switching part 401_c_ and the second switching part 402_c_ are relatively stationary, and the first switching part 401_c_ and the first hinge part 31_c_ are relatively stationary; at this point, when the user continuously opens the door 20_c_, only the second hinge part 32_c_ may move relative to the second switching part 402_c_, and at this point, the third shaft 321_c_ is located at the pivoting position C2, the fourth shaft 322_c_ is located at the rotation start position D1 of the fourth groove 422_c_, and the fourth groove 422_c_ is configured as an arc groove with the pivoting position C2 of the third groove 421_c_ as the circle center; when the user continuously opens the door 20_c_, the third shaft 321_c_ is kept at the pivoting position C2, the fourth shaft 322_c_ moves from the rotation start position D1 to the rotation stop position D2 of the fourth groove 422_c_, and during this opening process, the door 20_c_ continuously rotates in situ relative to the cabinet 10_c_.

It may be seen that in the present embodiment, the first hinge part 31_c_ and the second hinge part 32_c_ may be effectively controlled to be switched sequentially, such that the door 20_c_ may be stably opened, and the refrigerator 100_c_ may adapt to an embedded application scenario.

It may be understood that the closing process of the door 20_c_ is a reverse operation of the opening process of the door 20_c_.

It should be noted that when the door 20_c_ is opened to the maximum opening angle α3, the first switching part 401_c_ and the second switching part 402_c_ are mutually limited by means of the sixth engaging portion 404_c_ and the fifth engaging portion 4032_c_, an acting force required for the sixth engaging portion 404_c_ to disengage from the fifth engaging portion 4032_c_ serves as a first acting force, the first switching part 401_c_ and the first hinge part 31_c_ are mutually limited by means of the third engaging portion 405_c_ and the second engaging portion 316_c_, and an acting force required for the third engaging portion 405_c_ to disengage from the second engaging portion 316_c_ serves as a second acting force; in an actual operation, the first acting force and the second acting force may be controlled by a structural arrangement, and preferably, the first acting force is smaller than the second acting force, such that in the closing process of the door 20_c_, the second switching part 402_c_ and the first switching part 401_c_ reset first, and then, the first switching part 401_c_ and the first hinge part 31_c_ reset; certainly, in other embodiments, the reset sequence in the closing process may be controlled in other ways.

In the present invention, when the door is at the first opening angle α1, the initial position A1 of the through hole 4026_c_ is apart from the outer side surface 13_c_ of the cabinet 10_c_ than the stop position A2, in other words, a fourth pitch exists between a center of the third shaft 321_c_ and the side edge 23_c_, and a sixth pitch exists between the center of the third shaft 321_c_ and the side wall 22_c_, when the door 20_c_ is continuously opened from the first opening angle α1 to the second opening angle α2, the fourth pitch and the sixth pitch are all decreased, that is, when the door 20_c_ is continuously opened from the first opening angle α1 to the second opening angle α2, the second switching part 402_c_ moves relative to the first switching part 401_c_, the third shaft 321_c_ moves in the through hole 4026_c_ and the third groove 421_c_, such that pitches between the center of the third shaft 321_c_ and the side edge 23_c_, the side wall 22_c_ are changed; here, the changes of the fourth pitch and the sixth pitch are reflected in the movement of the door 20_c_ by a distance from the pivoting side P towards the accommodating chamber S, thus avoiding the interference between the door 20_a_ and the peripheral cupboard or wall, or the like, in the opening process.

In addition, when the door 20_c_ is at the first opening angle α1, the initial position A1 of the through hole 4026_c_ is apart from a front end surface 103_c_ than the stop position A2, in other words, a fifth pitch exists between a center of the third shaft 321_c_ and the front wall 21_c_, when the door 20_c_ is continuously opened from the first opening angle α1 to the second opening angle α2, the fifth pitch is increased; here, the change of the fifth pitch is reflected in the movement of the door 20_c_ by a distance away from the front end surface 103_c_ of the cabinet 10_c_, thus, when the door 20_c_ is provided with door gaskets on the side close to the cabinet 10_c_, it can prevent the door 20_c_ from squeezing the door gaskets during opening, thus avoiding damage to the door gaskets and improving the sealing effect of the door gaskets, in other embodiments, of course, the fifth pitch may also kept unchanged.

In the present invention, the first shaft 311_c_ and the third shaft 321_c_ are staggered, and thus, the refrigerator may be suitable for the embedded cupboard or the scenario with a small space for accommodating the refrigerator 100_c_.

For other descriptions of the hinge assembly 30_c_ in the present embodiment and the working principle, reference may be made to other embodiments, which are not repeated herein.

In the present embodiment, with reference to FIGS. 97 to 101, the refrigerator 100 is configured as a refrigerator 100 with a wiring module 60.

The wiring module 60 includes a fixed end 61 and a free end 62 which are provided oppositely, the fixed end 61 is connected to the door 20, the free end 62 is movably provided at the cabinet 10, and wiring E of the cabinet 10 sequentially passes through the free end 62 and the fixed end 61 and extends to the door 20.

Here, "the free end 62 is movably provided at the cabinet 10" means that the free end 62 is not fixed to the cabinet 10, and as the door 20 is opened, the free end 62 may move relative to the cabinet 10, such that the wiring E in the wiring module 60 may also move freely as the door 20 is opened.

It should be noted that, with intellectualization and multi-functionalization of the refrigerator 100, some functional modules, such as an ice making module, a display module, or the like, are usually provided on the door 20 of the refrigerator 100, and these modules are usually required to be connected with a control module in the cabinet 10 through the wiring E; the wiring E in the present embodiment extends to the door 20 by means of the wiring module 60, which may effectively avoid a phenomenon that the wiring E is pulled in the opening and closing processes of the door 20, and may adapt to the door 20 with various motion tracks; for example, when the hinge assembly 30 drives the door 20 to move from the pivoting side P towards the accommodating chamber S, an extension track of the wiring E also changes, and the present embodiment may completely adapt to the movement of the door 20 using the design of the wiring module 60; that is, the extension track of the wiring E may be flexibly adjusted by the wiring module 60, so as to avoid a wiring jamming problem.

In the present embodiment, the refrigerator 100 further includes a limiting space 101, the limiting space 101 includes a notch 1011 provided towards the door 20, the fixed end 61 of the wiring module 60 passes through the notch 1011 to be connected to the door 20, and when the door 20 is in the opening process, the door 20 drives the wiring module 60 to move in the limiting space 101, and the free end 62 is always located in the limiting space 101.

Here, the limiting space 101 is located at a top 11 of the cabinet 10, the wiring module 60 is provided parallel to the top 11 of the cabinet 10, and the fixed end 61 is movably connected to the door 20; certainly, the limiting space 101 may be provided in other regions.

Specifically, in the present embodiment, the wiring module 60 includes a first housing 601 and a second housing 602, the second housing 602 is provided near the top 11 of the cabinet 10, the first housing 601 is apart from the top 11 of the cabinet 10 relative to the second housing 602, the first housing 601 and the second housing 602 are fitted with each other to form an accommodating cavity 603 for accommodating the wiring E, and two end openings of the accommodating cavity 603 are configured as the fixed end 61 and the free end 62.

The door 20 protrudes upwards from the top 11 of the cabinet 10, an edge of the top 11 close to the door 20 is provided with a stopper 111 protruding from the top 11, the notch 1011 is formed in the stopper 111, the refrigerator 100 includes a plurality of protrusions 112 protruding from the top 11, and the plurality of protrusions 112 enclose the limiting space 101.

Here, the first hinge part 31 is fixed at the edge of the top 11, and in order to adapt to the design of the door 20 protruding from the top 11, the first hinge part 31 of the hinge assembly 30 has a substantial Z shape, such that the first hinge part 31 may extend from the top 11 of the cabinet 10 to a top of the door 20 to be fitted with the switching assembly 40 at the top of the door 20; the plurality of protrusions 112 include a first protrusion 1121 between the first hinge part 31 and the wiring module 60 and a second protrusion 1122 spaced apart from the first protrusion 1121, the first protrusion 1121 may prevent the wiring module 60 from interfering with the first hinge part 31, a profile of the first protrusion 1121 adapts to the motion track of the wiring module 60, and the second protrusions 1122 may be configured as a plurality of convex posts to reduce an impact between the wiring module 60 and the second protrusions 1122.

The refrigerator 100 may further include a cover 103, the cover 103 is located at the top 11 and covers the limiting space 101, the first hinge part 31, or the like, the cover 103 may be fitted with the stopper 111, and a shape of the cover 103 may be determined according to specific requirements.

In addition, the fixed end 61 and the notch 1011 of the wiring module 60 are both provided close to the hinge assembly 30, and it may be understood that in the opening process of the door 20, the wiring module 60 may be exposed in an opening gap of the door 20; the fixed end 61 and the notch 1011 are provided close to the hinge assembly 30, such that on the one hand, the motion track of the wiring module 60 may be controlled reasonably, and on the other hand, the wiring module 60 may be prevented from affecting an appearance and normal use of the refrigerator 100.

The wiring module 60 is provided horizontally and extends to the door 20 through the notch 1011; the door 20 is provided with a wiring hole H, the wiring E extends from the fixed end 61 into the door 20 through the wiring hole H, a region C adjacent to the wiring hole H is pivotally connected to a region of the fixed end 61, and the door 20 includes a lid 24 covering the fixed end 61, the wiring hole H and the region C, such that the wiring module 60 may be movably connected with the door 20; when the door 20 is in the opening process, the door 20 drives the wiring module 60 to move, and the wiring module 60 may move freely according to different tracks in the limiting space 101; that is, the motion track of the wiring module 60 may be completely adapted to the motion track of the door 20, thereby avoiding the wire jamming problem.

In addition, the wiring module 60 includes an arc section D, such that the wiring E may be further prevented from being disturbed in the accommodating cavity 603.

It should be noted that, in order to avoid abrasion and sliding noise of the wiring module 60, a buffer component, a sliding component, or the like, may be provided between the second housing 602 of the wiring module 60 and the top 11 of the cabinet 10, and the specific component may be determined according to actual situations.

In the present embodiment, the notch 1011 of the limiting space 101 has a first notch width, the wiring module 60 includes a movable portion 63 located between the fixed end 61 and the free end 62, and the first notch width is greater than a maximum width of the movable portion 63.

That is, as the door 20 is opened, the movable portion 63 gradually protrudes from the limiting space 101; the first notch width is greater than the maximum width of the movable portion 63, so as to prevent the notch 1011 from limiting the protrusion of the movable portion 63 from the limiting space 101; the notch 1011 may control the motion track of the wiring module 60 to a certain extent, thereby avoiding that the wiring module 60 is separated from the limiting space 101 due to an excessively large motion amplitude.

Here, in order to further prevent the wiring module 60 from being separated from the limiting space 101, the free end 62 may be bent; that is, an included angle is formed between the free end 62 and the movable portion 63.

The above embodiments are merely used for explaining the technical solution of the present invention and not limiting. Although the present invention has been described in detail with reference to preferable embodiments, for example, when technologies in different embodiments may be used in conjunction with each other to achieve corresponding effects at the same time, the solutions thereof also fall within a protection scope of the present invention. A person skilled in the art shall understand that various modifications or equivalent substitutions may be made to the technical solution of the present invention without departing from the spirit and scope of the technical solution of the present invention.

What is claimed is:

1. An embedded refrigerator, comprising: a cabinet, a door for opening and closing the cabinet, and a hinge assembly for connecting the cabinet and the door, wherein the cabinet comprises an accommodating chamber and a pivoting side connected with the hinge assembly, the hinge assembly comprises a first hinge part, a second hinge part and a switching assembly connected with the first hinge part and the second hinge part; when the door is in an opening process, the switching assembly moves relative to the first hinge part, and the switching assembly locks the second hinge part, and then, the second hinge part moves relative to the switching assembly and the switching assembly is held in position by the first hinge part; the hinge assembly drives the door to rotate in situ relative to the cabinet, then drives the door to move from the pivoting side towards the accommodating chamber, and then drives the door to continuously rotate in situ relative to the cabinet;

the switching assembly comprises a first fitting part and a second fitting part, the first hinge part and the first fitting part move relatively by a first shaft set and a first groove set which are fitted with each other, and the second hinge part and the second fitting part move relatively by a second shaft set and a second groove set which are fitted with each other, the switching assembly comprises a first switching part having the first fitting part disposed therein and a second switching part having the second fitting part disposed therein which are fitted with each other;

the first hinge part comprises the first shaft set having a first shaft and a second shaft, the first fitting part comprises the first groove set having a first groove fitted with the first shaft and a second groove fitted with the second shaft, the second fitting part comprises the second shaft set having a third shaft and a fourth shaft, and the second hinge part comprises the second groove set having a third groove fitted with the third shaft and a fourth groove fitted with the fourth shaft the first groove comprises a first upper groove located at the first switching part and a first lower groove located at the second switching part, the first upper groove comprises a first upper free section, and the first lower groove comprises a first lower free section; the second groove comprises a second upper groove located at the first switching part and a second lower groove located at the second switching part, the second upper groove comprises a second upper free section, the second lower groove comprises a second lower free section, the third groove comprises a third free section, the fourth groove comprises a fourth free section, the first groove set comprises a locking section, and the second groove set comprises a limiting section; when the door is opened from a closed state to a first opening angle, the first switching part and the second switching part are relatively stationary, the first upper free section and the first lower free section are overlapped to form a first free section, the second upper free section and the second lower free section are overlapped to form a second free section, the first shaft is located at the first free section when the switching assembly moves, the second shaft is located at the second free section when the switching assembly moves, and the third shaft and/or the fourth shaft are/is limited at the limiting section, such that the switching assembly limits the second hinge part; when the door is continuously opened from the first opening angle to a second opening angle, the first switching part and the second switching part move relatively, such that the fourth shaft is separated from the limiting section, and the first shaft and/or the second shaft stay/stays at the locking section, such that the switching assembly is held in position by the first hinge part; when the door is continuously opened from the second opening angle to a maximum opening angle, the third shaft moves in the third free section, and the fourth shaft moves at the fourth free section.

2. The embedded refrigerator according to claim 1, wherein the door is provided with the first fitting portion, the cabinet is provided with the second fitting portion, the first fitting portion and the second fitting portion are engaged with each other when the door is in the closed state, and when the door is opened from the closed state to the first opening angle, the door rotates in situ relative to the cabinet, so as to drive the first fitting portion to be disengaged from the second fitting portion.

3. The embedded refrigerator according to claim 2, wherein the door comprises a first door and a second door, the first door and the second door are pivotally connected with the cabinet and arranged side by side in a horizontal direction, the refrigerator further comprises a vertical beam movably connected to a side of the first door close to the second door, the first fitting portion is provided at the vertical beam, and when the first door and the second door are in the closed state, the vertical beam extends to the second door; when the first door is opened from the closed state to the first opening angle, the first door rotates in situ relative to the cabinet, such that the vertical beam rotates towards a side close to the accommodating chamber, a first folding angle is formed between the first door and the vertical beam, and then, the vertical beam and the first door are kept relatively static.

4. The embedded refrigerator according to claim 1, wherein the cabinet comprises an accommodating chamber and a fixed beam dividing the accommodating chamber into a first compartment and a second compartment, and the door comprises a first door provided corresponding to the first compartment and a second door provided corresponding to the second compartment; when the first door and the second door are in the closed state, both the first door and the second door contact the fixed beam, and when the first door is opened from the closed state to the first opening angle, the first door rotates in situ relative to the cabinet, so as to separate the first door from the fixed beam.

5. The embedded refrigerator according to claim 1, wherein the first hinge part is fixed to the cabinet, the second hinge part is fixed to the door, when the door is opened from the closed state to the first opening angle, the first hinge part and the first fitting part move relatively to drive the door to rotate in situ relative to the cabinet, the first hinge part and the first fitting part then move relatively to drive the door to move from the pivoting side towards the accommodating chamber, and the second fitting part limits the second hinge part; when the door is continuously opened from the first opening angle to the second opening angle, the second hinge part is released from the limit of the second fitting part, and the first fitting part is held in position by the first hinge part; when the door is continuously opened from the second opening angle to the maximum opening angle, the second hinge part and the second fitting part move relatively to drive the door to continuously rotate in situ.

6. The embedded refrigerator according to claim 1, wherein the first hinge part is fixed to the cabinet, the second hinge part is fixed to the door, when the door is opened from the closed state to the first opening angle, the first hinge part and the first fitting part move relatively to drive the door to rotate in situ relative to the cabinet, and the second fitting part limits the second hinge part; when the door is continuously opened from the first opening angle to the second opening angle, the second hinge part is released from the limit of the second fitting part, and the first fitting part is held in position by the first hinge part; when the door is continuously opened from the second opening angle to the maximum opening angle, the second hinge part and the second fitting part move relatively to drive the door to move from the pivoting side towards the accommodating chamber, and then, the second hinge part and the second fitting part move relatively to drive the door to continuously rotate in situ.

7. The embedded refrigerator according to claim 5, wherein when the door is opened from the closed state to the first opening angle or continuously opened from the second opening angle to the maximum opening angle, the first switching part and the second switching part are relatively stationary, and when the door is continuously opened from the first opening angle to the second opening angle, the first switching part moves relative to the second switching part, such that the second hinge part is released from the limit of the second fitting part, and the first fitting part is held in position by the first hinge part.

8. The embedded refrigerator according to claim 1, wherein the locking section comprises a first upper locking section located at the first upper groove, a first lower locking section located at the first lower groove, a second upper locking section located at the second upper groove, and a second lower locking section located at the second lower groove, and the limiting section comprises a fourth limiting section located at the fourth groove; when the door is opened from the closed state to the first opening angle, the fourth shaft is limited at the fourth limiting section; when the door is continuously opened from the first opening angle to the second opening angle, the first shaft stays at the first upper locking section and the first lower locking section at the same time, the second shaft stays at the second upper locking section and the second lower locking section at the same time, and the fourth shaft is separated from the fourth limiting section.

9. The embedded refrigerator according to claim 1, wherein the first free section comprises an initial position and a stop position which are arranged oppositely, and the second free section comprises a first section and a second section which are connected; when the door is in the closed state, the first shaft is located at the initial position, and the second shaft is located at an end of the first section apart from the second section; when the door is opened from the closed state to the first opening angle, the first shaft stays in situ at the initial position, the second shaft is in the first section when the switching assembly moves around the first shaft, the second shaft is then in the second section when the switching assembly moves to relocate the first shaft from the initial position to the stop position, the door moves from the pivoting side towards the accommodating chamber; when the door is continuously opened from the second opening angle to the maximum opening angle, the third shaft rotates in situ in the third free section, and the fourth shaft moves in the fourth free section around the third shaft.

10. The embedded refrigerator according to claim 1, wherein the third free section comprises a start position and a pivoting position which are arranged oppositely, and the fourth free section comprises a moving section and a rotating section which are connected; when the door is in the closed state, the second shaft is located at an end of the second free section, and the third shaft is located at the start position; when the door is opened from the closed state to the first opening angle, the first shaft stays in situ in the first free section, and the second shaft is in the second free section when the switching assembly moves around the first shaft; when the door is continuously opened from the second opening angle to the maximum opening angle, the fourth shaft moves in the moving section to drive the third shaft to move from the start position to the pivoting position, the door moves from the pivoting side towards the accommodating chamber, the third shaft then rotates in situ at the pivoting position, and the fourth shaft moves in the rotating section around the third shaft.

11. The embedded refrigerator according to claim 1, wherein the cabinet comprises an opening and a front end surface provided around the opening, a first pitch exists between the first shaft and the front end surface, and when the door is continuously opened from the second opening angle to the maximum opening angle, a second pitch exists between the third shaft and the front end surface, and the second pitch is greater than the first pitch; the embedded refrigerator further comprises an outer side surface adjacent to the hinge assembly and on an extension section of a rotation path of the door, a third pitch exists between the first shaft and the outer side surface, and when the door is continuously opened from the second opening angle to the maximum opening angle, a fourth pitch exists between the third shaft and the outer side surface, and the fourth pitch is less than the third pitch.

12. An embedded refrigerator, comprising: a cabinet, a door for opening and closing the cabinet, and a hinge assembly for connecting the cabinet and the door, wherein the cabinet comprises an accommodating chamber and a pivoting side connected with the hinge assembly, and the hinge assembly comprises a first hinge part fixed to the cabinet, a second hinge part fixed to the door and a switching assembly connected with the first hinge part and the second hinge part; the first hinge part and the switching assembly move relatively by a first shaft and a first groove which are fitted with each other, and the first groove comprises a first free section; the second hinge part and the switching assembly move relatively by a second shaft set and a second groove set which are fitted with each other; the second shaft set comprises a third shaft and a fourth shaft, the second groove set comprises a third free section, a fourth free section and a limiting section, the third free section comprises a start position and a pivoting position which are arranged oppositely, and the fourth free section comprises a moving section and a rotating section which are connected; when the door is in a closed state, the first shaft is located at the first free section, and the fourth shaft is located at the limiting section, such that the switching assembly limits the second hinge part, and the third shaft is located at the start position; when the door is opened to a first opening angle from the closed state, the first shaft stays in situ in the first free section to drive the door to rotate in situ relative to the cabinet; when the door is continuously opened from the first opening angle to a second opening angle, the fourth shaft is separated from the limiting section, the third shaft is kept at the start position, and the switching assembly limits the first hinge part; when the door is continuously opened from the second opening angle to a maximum opening angle, the fourth shaft moves in the moving section to drive the third shaft to move from the start position to the pivoting position, the door moves from the pivoting side to the accommodating chamber, the third shaft then rotates in situ at the pivoting position, the fourth shaft moves in the rotating section around the third shaft, and the door continuously rotates in situ relative to the cabinet.

13. The embedded refrigerator according to claim 12, wherein the first hinge part comprises the first shaft, the switching assembly comprises the first groove, the third shaft and the fourth shaft, the second hinge part comprises a third groove with the third free section and a fourth groove with the fourth free section and the limiting section, and the switching assembly comprises a first switching part and a second switching part which are fitted with each other; when the door is opened from the closed state to the first opening angle or continuously opened from the second opening angle to the maximum opening angle, the first switching part and the second switching part are relatively static; when the door is continuously opened from the first opening angle to the second opening angle, the first switching part moves relative to the second switching part, such that the fourth shaft is separated from the limiting section.

14. The embedded refrigerator according to claim 13, wherein the first hinge part comprises a first limiting portion, the first switching part comprises a second limiting portion, and the first groove comprises a first upper groove located at the first switching part and a first lower groove located at the second switching part; when the door is opened from the closed state to the first opening angle, a first free section is formed by overlapped parts of the first upper groove and the first lower groove, the first shaft stays in situ in the first free section, and the second limiting portion abuts against the first limiting portion, such that the switching assembly limits the first hinge part; when the door is continuously opened from the first opening angle to the second opening angle, the first switching part moves relative to the second switching part, such that the fourth shaft is separated from the limiting section.

15. An embedded refrigerator, comprising: a cabinet, a door for opening and closing the cabinet, and a hinge assembly for connecting the cabinet and the door, wherein the cabinet comprises an accommodating chamber and a pivoting side connected with the hinge assembly, the hinge assembly comprises a first hinge part fixed to the cabinet, a second hinge part fixed to the door and a switching assembly connected with the first hinge part and the second hinge part, and the switching assembly comprises a first switching part and a second switching part which are fitted with each other; when the door is opened from a closed state to a first opening angle, the first switching part, the second switching part and the second hinge part are relatively static and move together relative to the first hinge part, and the door rotates in situ relative to the cabinet; when the door is continuously opened from the first opening angle to a second opening angle, the first switching part and the first hinge part are relatively static, the second switching part and the second hinge part are relatively static and move together relative to the first switching part, and the door moves towards the accommodating chamber from the pivoting side; when the door is continuously opened from the second opening angle to a maximum opening angle, the first hinge part, the first switching part and the second switching part are relatively static, the second hinge part moves relative to the second switching part, and the door continuously rotates in situ relative to the cabinet;

wherein the first hinge part comprises a first shaft, the first switching part comprises a third shaft and a first upper groove, the second switching part comprises a fourth shaft and a through hole, the second hinge part comprises a third groove and a fourth groove, the through hole comprises an initial position and a stop position which are arranged oppositely, the third groove comprises a start position and a pivoting position which are arranged oppositely, and the fourth groove comprises a rotation start position and a rotation stop position which are arranged oppositely; when the door is in the closed state, the first shaft extends to the first upper groove, the third shaft sequentially passes through the through hole and the third groove, the third shaft is located at the initial position and the start position, and the fourth shaft is located at the rotation start position of the fourth groove; when the door is opened from the closed state to the first opening angle, the first shaft stays in situ in the first upper groove to drive the door to rotate in situ relative to the cabinet when the door is continuously opened from the first opening angle to the second opening angle, the fourth shaft is kept at the rotation start position, the third shaft moves from the initial position to the stop position, the third shaft moves from the start position to the pivoting position at the same time, and the door moves from the pivoting side to the accommodating chamber; when the door is continuously opened to the maximum opening angle from the second opening angle, the third shaft is kept at the stop position and the pivoting position, the fourth shaft moves from the rotation start position to the rotation stop position, and the door continuously rotates in situ relative to the cabinet.

16. The embedded refrigerator according to claim 15, wherein the second switching part includes a first lower groove, the first shaft sequentially passes through the first upper groove and the first lower groove, the first lower groove includes a first end and a second end which are arranged oppositely, when the door is opened from the closed state to the first opening angle, the first shaft is kept at the first end, when the door is continuously opened from the first opening angle to the second opening angle, the first shaft is relocated from the first end to the second end when the switching assembly moves.

17. The embedded refrigerator according to claim 15, wherein the first hinge part comprises a first limiting portion, the first switching part comprises a second limiting portion, one of the first limiting portion and the second limiting portion is configured as a bump, the other is configured as a recess, the bump comprises a first limiting surface, and the recess comprises a second limiting surface; when the door is in the closed state, the first limiting surface is apart from the second limiting surface; when the door is opened from the closed state to the first opening angle, the first limiting surface and the second limiting surface gradually approach until the first limiting surface abuts against the second limiting surface; the first hinge part comprises a first engaging portion and a second engaging portion, and the first switching part comprises a third engaging portion; when the door is in the closed state, the third engaging portion is limited at the first engaging portion; when the door is opened from the closed state to the first opening angle, the third engaging portion is separated from the first engaging portion, and the third engaging portion and the second engaging portion gradually approach until the third engaging portion is limited at the second engaging portion; the first switching part comprises a fourth engaging portion and a fifth engaging portion, and the second switching part comprises a sixth engaging portion; when the door is opened from the closed state to the first opening angle, the sixth engaging portion is limited at the fourth engaging portion; when the door is continuously opened from the first opening angle to the second opening angle, the sixth engaging portion is separated from the fourth engaging portion, and the sixth engaging portion and the fifth engaging portion gradually approach until the sixth engaging portion is limited at the fifth engaging portion.

* * * * *